(12) United States Patent
Ketchum et al.

(10) Patent No.: US 8,462,817 B2
(45) Date of Patent: Jun. 11, 2013

(54) METHOD, APPARATUS, AND SYSTEM FOR MULTIPLEXING PROTOCOL DATA UNITS

(75) Inventors: John W. Ketchum, Harvard, MA (US); Jay Rodney Walton, Carlisle, MA (US); Sanjiv Nanda, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 1131 days.

(21) Appl. No.: 10/964,320

(22) Filed: Oct. 13, 2004

(65) Prior Publication Data

US 2005/0135291 A1 Jun. 23, 2005

Related U.S. Application Data

(60) Provisional application No. 60/511,750, filed on Oct. 15, 2003, provisional application No. 60/511,904, filed on Oct. 15, 2003, provisional application No. 60/513,239, filed on Oct. 21, 2003, provisional application No. 60/526,347, filed on Dec. 1, 2003, provisional application No. 60/526,356, filed on Dec. 1, 2003, provisional application No. 60/532,791, filed on Dec. 23, 2003, provisional application No. 60/545,963, filed on Feb. 18, 2004, provisional application No. 60/576,545, filed on Jun. 2, 2004, provisional application No. 60/586,841, filed on Jul. 8, 2004, provisional application No. 60/600,960, filed on Aug. 11, 2004.

(51) Int. Cl.
*H04J 3/00* (2006.01)

(52) U.S. Cl.
USPC .......................................... 370/476; 370/389

(58) Field of Classification Search
USPC ...................... 370/389, 392, 394, 395.3, 476
See application file for complete search history.

(56) References Cited

U.S. PATENT DOCUMENTS

| 4,747,100 A | 5/1988 | Roach et al. |
| 4,750,171 A | 6/1988 | Kedar et al. |

(Continued)

FOREIGN PATENT DOCUMENTS

| CN | 1263675 | 8/2000 |
| CN | 1350733 | 5/2002 |

(Continued)

OTHER PUBLICATIONS

International Search Report, PCT/US04/034257—International Search Authority—European Patent Office—Mar. 7, 2005.

(Continued)

*Primary Examiner* — Gary Mui
(74) *Attorney, Agent, or Firm* — Thien T. Nguyen; Charles E. Eggers

(57) ABSTRACT

Embodiments addressing MAC processing for efficient use of high throughput systems are disclosed. In one aspect, a protocol stack is disclosed comprising one or more of the following: an adaptation layer, a data link control layer, a physical layer, and a layer manager. In another aspect, physical layer feedback is used for adaptation layer processing. In one embodiment, physical layer feedback is used for segmentation. In another embodiment, physical layer feedback is used for multicast mapping onto one or more unicast channels. In another aspect, a data unit for transmission from a first station to a second station comprises zero or more complete sub-data units, zero or one partial sub-data units from a prior transmission, and zero or one partial sub-data units to fill the data unit. In one embodiment, a pointer may be used to indicate the location of any complete sub-data units.

39 Claims, 25 Drawing Sheets

U.S. PATENT DOCUMENTS

| | | |
|---|---|---|
| 5,081,623 A | 1/1992 | Ainscow |
| 5,133,081 A | 7/1992 | Mayo |
| 5,276,703 A | 1/1994 | Budin et al. |
| 5,280,476 A | 1/1994 | Kojima et al. |
| 5,297,144 A | 3/1994 | Gilbert et al. |
| 5,384,777 A | 1/1995 | Ahmadi et al. |
| 5,444,702 A | 8/1995 | Burnett et al. |
| 5,638,371 A | 6/1997 | Raychaudhuri et al. |
| 5,677,909 A | 10/1997 | Heide |
| 5,684,791 A | 11/1997 | Raychaudhuri et al. |
| 5,719,868 A | 2/1998 | Young |
| 5,729,542 A | 3/1998 | DuPont |
| 5,818,842 A | 10/1998 | Burwell |
| 5,923,650 A | 7/1999 | Chen et al. |
| 5,970,059 A | 10/1999 | Ahopelto et al. |
| 5,974,045 A | 10/1999 | Ohkura et al. |
| 6,002,691 A | 12/1999 | Citta et al. |
| 6,014,087 A | 1/2000 | Krishnakumar et al. |
| 6,069,886 A | 5/2000 | Ayerst et al. |
| 6,098,142 A | 8/2000 | Leggett et al. |
| 6,111,927 A | 8/2000 | Sokoler |
| 6,130,886 A | 10/2000 | Ketseoglou et al. |
| 6,252,854 B1 | 6/2001 | Hortensius et al. |
| 6,256,317 B1 | 7/2001 | Holloway et al. |
| 6,307,846 B1 | 10/2001 | Willey |
| 6,404,751 B1 | 6/2002 | Roark et al. |
| 6,433,737 B2 | 8/2002 | Katz |
| 6,438,104 B1 | 8/2002 | Fodor et al. |
| 6,452,917 B1 | 9/2002 | Leung |
| 6,456,599 B1 | 9/2002 | Elliott |
| 6,483,819 B1 | 11/2002 | Take et al. |
| 6,504,506 B1 | 1/2003 | Thomas et al. |
| 6,512,773 B1 | 1/2003 | Scott |
| 6,532,225 B1 | 3/2003 | Chang et al. |
| 6,542,490 B1 | 4/2003 | Ahmadvand et al. |
| 6,553,020 B1 | 4/2003 | Hughes et al. |
| 6,563,816 B1 | 5/2003 | Nodoushani et al. |
| 6,574,237 B1 | 6/2003 | Bullman et al. |
| 6,580,704 B1 | 6/2003 | Wellig et al. |
| 6,587,441 B1 | 7/2003 | Urban et al. |
| 6,600,754 B1 | 7/2003 | Young et al. |
| 6,609,866 B2 | 8/2003 | Huang et al. |
| 6,611,525 B1 | 8/2003 | Natanson et al. |
| 6,611,529 B1 | 8/2003 | Krishnakumar et al. |
| 6,621,805 B1 | 9/2003 | Kondylis et al. |
| 6,621,827 B1 | 9/2003 | Rezvani et al. |
| 6,625,171 B1 * | 9/2003 | Matsudo ................. 370/470 |
| 6,633,564 B1 * | 10/2003 | Steer et al. ................. 370/389 |
| 6,643,260 B1 | 11/2003 | Kloth et al. |
| 6,671,511 B1 | 12/2003 | Forssell et al. |
| 6,724,740 B1 | 4/2004 | Choi et al. |
| 6,741,635 B2 | 5/2004 | Lo et al. |
| 6,751,187 B2 | 6/2004 | Walton et al. |
| 6,760,388 B2 | 7/2004 | Ketchum et al. |
| 6,768,730 B1 | 7/2004 | Whitehill |
| 6,771,706 B2 | 8/2004 | Ling et al. |
| 6,788,702 B1 | 9/2004 | Garcia-Luna-Aceves et al. |
| 6,791,962 B2 | 9/2004 | Wentink |
| 6,791,996 B1 | 9/2004 | Watanabe et al. |
| 6,795,409 B1 | 9/2004 | Youssefmir et al. |
| 6,795,418 B2 | 9/2004 | Choi |
| 6,795,419 B2 | 9/2004 | Parantainen |
| 6,813,260 B1 | 11/2004 | Fogle |
| 6,847,626 B1 | 1/2005 | Carneal et al. |
| 6,868,133 B2 | 3/2005 | Hicks et al. |
| 6,898,441 B1 | 5/2005 | Kogiantis et al. |
| 6,907,020 B2 | 6/2005 | Periyalwar et al. |
| 6,912,225 B1 * | 6/2005 | Kohzuki et al. ............... 370/412 |
| 6,944,688 B1 | 9/2005 | Batcher |
| 6,961,311 B2 | 11/2005 | Rakotoarivelo et al. |
| 6,963,549 B1 | 11/2005 | Jayaraman et al. |
| 6,977,944 B2 | 12/2005 | Brockmann et al. |
| 7,006,848 B2 | 2/2006 | Ling et al. |
| 7,031,274 B2 | 4/2006 | Sherman |
| 7,031,287 B1 | 4/2006 | Ho et al. |
| 7,046,639 B2 | 5/2006 | Garcia-Luna-Aceves et al. |
| 7,046,654 B2 | 5/2006 | Chen |
| 7,046,690 B2 | 5/2006 | Sherman |
| 7,058,074 B2 | 6/2006 | Ho et al. |
| 7,065,144 B2 | 6/2006 | Walton et al. |
| 7,068,633 B1 | 6/2006 | Ho |
| 7,079,552 B2 | 7/2006 | Cain et al. |
| 7,082,117 B2 | 7/2006 | Billhartz |
| 7,085,281 B2 | 8/2006 | Thomas et al. |
| 7,092,737 B2 | 8/2006 | Horng et al. |
| 7,095,732 B1 | 8/2006 | Watson, Jr. |
| 7,099,300 B2 * | 8/2006 | Sugaya ..................... 370/349 |
| 7,099,671 B2 | 8/2006 | Liang |
| 7,116,652 B2 | 10/2006 | Lozano |
| 7,123,627 B2 | 10/2006 | Kowalski |
| 7,130,289 B2 | 10/2006 | Kuan et al. |
| 7,142,527 B2 | 11/2006 | Garcia-Luna-Aceves |
| 7,145,895 B2 | 12/2006 | Mueckenheim et al. |
| 7,149,245 B2 | 12/2006 | Budka et al. |
| 7,154,876 B2 | 12/2006 | Benveniste |
| 7,158,504 B2 | 1/2007 | Kadaba et al. |
| 7,158,803 B1 | 1/2007 | Elliott |
| 7,187,691 B2 | 3/2007 | Gavette |
| 7,203,192 B2 | 4/2007 | Desai et al. |
| 7,206,083 B2 | 4/2007 | Shimada |
| 7,236,459 B1 | 6/2007 | Okholm et al. |
| 7,260,073 B2 | 8/2007 | Sipola |
| 7,263,083 B2 | 8/2007 | Kisigami et al. |
| 7,266,087 B2 | 9/2007 | Wahl |
| 7,269,152 B2 | 9/2007 | Vukovic et al. |
| 7,274,707 B2 | 9/2007 | Choi et al. |
| 7,277,149 B2 | 10/2007 | Kim et al. |
| 7,277,419 B2 | 10/2007 | McGowan |
| 7,277,430 B2 * | 10/2007 | Ono et al. ..................... 370/389 |
| 7,280,513 B2 | 10/2007 | Cao et al. |
| 7,284,260 B2 | 10/2007 | Hilts et al. |
| 7,301,924 B1 | 11/2007 | Gurbuz et al. |
| 7,301,944 B1 | 11/2007 | Redmond |
| 7,313,104 B1 | 12/2007 | Kern et al. |
| 7,330,871 B2 | 2/2008 | Kandala |
| 7,333,556 B2 | 2/2008 | Maltsev et al. |
| 7,336,642 B2 | 2/2008 | Rich et al. |
| 7,342,940 B2 | 3/2008 | Park |
| 7,366,202 B2 | 4/2008 | Scherzer et al. |
| 7,372,855 B2 | 5/2008 | Kandala |
| 7,400,641 B2 | 7/2008 | Nitschke |
| 7,400,642 B2 | 7/2008 | Koo et al. |
| 7,417,974 B2 | 8/2008 | Hansen |
| 7,440,573 B2 | 10/2008 | Lor et al. |
| 7,450,550 B2 | 11/2008 | Jin |
| 7,512,070 B2 | 3/2009 | Stephens |
| 7,525,994 B2 | 4/2009 | Scholte |
| 7,564,814 B2 | 7/2009 | Abraham et al. |
| 7,570,656 B2 | 8/2009 | Raphaeli et al. |
| 7,599,340 B2 | 10/2009 | Chandra et al. |
| 7,633,946 B2 | 12/2009 | Pavon et al. |
| 7,639,657 B1 | 12/2009 | Ho et al. |
| 7,676,236 B2 | 3/2010 | Nanda et al. |
| 7,706,399 B2 | 4/2010 | Janczak |
| 7,724,721 B2 | 5/2010 | Lim et al. |
| 7,818,018 B2 | 10/2010 | Nanda et al. |
| 7,869,432 B1 | 1/2011 | Mollyn |
| 7,881,340 B2 | 2/2011 | Farrag et al. |
| 7,894,538 B2 | 2/2011 | Walton et al. |
| 2001/0024173 A1 | 9/2001 | Katz |
| 2001/0053141 A1 | 12/2001 | Periyalwar et al. |
| 2001/0053695 A1 | 12/2001 | Wallentin |
| 2002/0009999 A1 | 1/2002 | Lee et al. |
| 2002/0021698 A1 | 2/2002 | Lee et al. |
| 2002/0046257 A1 | 4/2002 | Killmer |
| 2002/0067736 A1 | 6/2002 | Garcia-Luna-Aceves et al. |
| 2002/0071413 A1 | 6/2002 | Choi |
| 2002/0071449 A1 | 6/2002 | Ho et al. |
| 2002/0093929 A1 | 7/2002 | Mangold et al. |
| 2002/0110101 A1 | 8/2002 | Gopalakrishnan et al. |
| 2002/0172186 A1 | 11/2002 | Larsson |
| 2002/0172217 A1 | 11/2002 | Kadaba et al. |
| 2002/0174219 A1 | 11/2002 | Mei et al. |
| 2002/0191703 A1 | 12/2002 | Ling et al. |
| 2003/0002605 A1 | 1/2003 | Lo et al. |
| 2003/0003880 A1 | 1/2003 | Ling et al. |
| 2003/0015611 A1 | 1/2003 | Teng |

| | | |
|---|---|---|
| 2003/0016692 A1 | 1/2003 | Thomas et al. |
| 2003/0043732 A1 | 3/2003 | Walton et al. |
| 2003/0050084 A1 | 3/2003 | Damnjanovic et al. |
| 2003/0063563 A1 | 4/2003 | Kowalski |
| 2003/0072280 A1 | 4/2003 | McFarland et al. |
| 2003/0076797 A1 | 4/2003 | Lozano |
| 2003/0103525 A1 | 6/2003 | Wahl |
| 2003/0108117 A1 | 6/2003 | Ketchum et al. |
| 2003/0125040 A1 | 7/2003 | Walton et al. |
| 2003/0128684 A1 | 7/2003 | Hirsch et al. |
| 2003/0147385 A1 | 8/2003 | Montalvo et al. |
| 2003/0162519 A1 | 8/2003 | Smith et al. |
| 2003/0169763 A1 | 9/2003 | Choi et al. |
| 2003/0174645 A1 | 9/2003 | Paratainen et al. |
| 2003/0174680 A1 | 9/2003 | Kuan et al. |
| 2003/0198312 A1 | 10/2003 | Budka et al. |
| 2003/0202574 A1 | 10/2003 | Budka et al. |
| 2003/0223365 A1 | 12/2003 | Kowalski |
| 2003/0223418 A1 | 12/2003 | Desai et al. |
| 2004/0022213 A1 | 2/2004 | Choi et al. |
| 2004/0042556 A1 | 3/2004 | Medvedev et al. |
| 2004/0047319 A1 | 3/2004 | Elg |
| 2004/0082356 A1 | 4/2004 | Walton et al. |
| 2004/0105386 A1 | 6/2004 | Sipola |
| 2004/0109433 A1 | 6/2004 | Khan |
| 2004/0120349 A1 | 6/2004 | Border et al. |
| 2004/0125778 A1 | 7/2004 | Lin et al. |
| 2004/0131019 A1 | 7/2004 | Kandala |
| 2004/0141522 A1 | 7/2004 | Texerman et al. |
| 2004/0151199 A1 | 8/2004 | Sykes et al. |
| 2004/0156345 A1 | 8/2004 | Steer et al. |
| 2004/0156367 A1 | 8/2004 | Albuquerque et al. |
| 2004/0163129 A1* | 8/2004 | Chapman et al. ............. 725/126 |
| 2004/0204104 A1 | 10/2004 | Horng et al. |
| 2004/0246934 A1 | 12/2004 | Kim |
| 2004/0252664 A1 | 12/2004 | Cao et al. |
| 2004/0258039 A1 | 12/2004 | Stephens |
| 2004/0258091 A1 | 12/2004 | Meyer et al. |
| 2004/0264504 A1 | 12/2004 | Jin |
| 2004/0266451 A1 | 12/2004 | Stolyar et al. |
| 2005/0036475 A1 | 2/2005 | Nishiyama et al. |
| 2005/0047429 A1 | 3/2005 | Koo et al. |
| 2005/0053003 A1 | 3/2005 | Cain et al. |
| 2005/0053064 A1 | 3/2005 | Wang |
| 2005/0058078 A1 | 3/2005 | Jung et al. |
| 2005/0111462 A1 | 5/2005 | Walton et al. |
| 2005/0135284 A1 | 6/2005 | Nanda et al. |
| 2005/0135295 A1 | 6/2005 | Walton et al. |
| 2005/0135318 A1 | 6/2005 | Walton et al. |
| 2005/0135403 A1 | 6/2005 | Ketchum et al. |
| 2005/0135416 A1 | 6/2005 | Ketchum et al. |
| 2005/0152314 A1 | 7/2005 | Sun et al. |
| 2005/0152465 A1 | 7/2005 | Maltsev et al. |
| 2005/0239407 A1 | 10/2005 | Foore et al. |
| 2005/0270975 A1 | 12/2005 | Meylan et al. |
| 2006/0052088 A1 | 3/2006 | Pavon et al. |
| 2006/0092871 A1 | 5/2006 | Nishibayashi et al. |
| 2006/0099956 A1 | 5/2006 | Harada et al. |
| 2006/0159123 A1 | 7/2006 | Fleury et al. |
| 2006/0164969 A1 | 7/2006 | Malik et al. |
| 2006/0165021 A1 | 7/2006 | Tian et al. |
| 2006/0165036 A1 | 7/2006 | Chandra et al. |
| 2006/0193294 A1 | 8/2006 | Jorswieck et al. |
| 2006/0227801 A1 | 10/2006 | Nanda et al. |
| 2006/0268886 A1 | 11/2006 | Sammour et al. |
| 2006/0274844 A1 | 12/2006 | Walton et al. |
| 2007/0037548 A1 | 2/2007 | Sammour et al. |
| 2007/0058543 A1 | 3/2007 | Fenart et al. |
| 2007/0058605 A1 | 3/2007 | Meylan et al. |
| 2007/0230338 A1 | 10/2007 | Shao et al. |
| 2008/0130660 A1 | 6/2008 | Ros-Giralt et al. |
| 2009/0097444 A1 | 4/2009 | Lohr et al. |
| 2009/0103558 A1 | 4/2009 | Zangi et al. |
| 2009/0116434 A1 | 5/2009 | Lohr et al. |
| 2009/0252145 A1 | 10/2009 | Meylan et al. |
| 2009/0290655 A1 | 11/2009 | Abraham et al. |
| 2009/0323646 A1 | 12/2009 | Ketchum et al. |
| 2010/0290423 A1 | 11/2010 | Hwang et al. |
| 2010/0309872 A1 | 12/2010 | Amini et al. |
| 2011/0223952 A1 | 9/2011 | Nanda et al. |

FOREIGN PATENT DOCUMENTS

| | | |
|---|---|---|
| EP | 0475682 | 5/1991 |
| EP | 0782360 A2 | 7/1997 |
| EP | 0912016 A2 | 4/1999 |
| EP | 1052855 A | 11/2000 |
| EP | 1089500 A2 | 4/2001 |
| EP | 1182900 | 2/2002 |
| EP | 1187406 A1 | 3/2002 |
| EP | 1261183 | 11/2002 |
| EP | 1317110 | 6/2003 |
| EP | 1463217 A1 | 9/2004 |
| JP | 2000174820 A | 6/2000 |
| JP | 2001024573 A | 1/2001 |
| JP | 2001160813 | 6/2001 |
| JP | 2001160843 A | 6/2001 |
| JP | 2001507907 T | 6/2001 |
| JP | 2001217768 A | 8/2001 |
| JP | 2001522211 | 11/2001 |
| JP | 200360655 | 2/2003 |
| JP | 2003078565 | 3/2003 |
| JP | 2003163669 A | 6/2003 |
| JP | 2003249939 | 9/2003 |
| JP | 2003258807 A | 9/2003 |
| JP | 2003528507 A | 9/2003 |
| JP | 2003289309 A | 10/2003 |
| JP | 2005020163 A | 1/2005 |
| JP | 2005505148 T | 2/2005 |
| JP | 2005057373 A | 3/2005 |
| JP | 2005094156 A | 4/2005 |
| KR | 2003-0036847 | 5/2003 |
| KR | 20040076979 A | 9/2004 |
| KR | 2006-0090259 | 8/2006 |
| KR | 20060090258 | 8/2006 |
| TW | 550926 B | 9/2003 |
| TW | 200304292 | 9/2003 |
| TW | 567731 B | 12/2003 |
| TW | 200401549 | 1/2004 |
| WO | WO9625811 A1 | 8/1996 |
| WO | 9905881 A | 2/1999 |
| WO | WO9957931 A1 | 11/1999 |
| WO | 0056113 | 9/2000 |
| WO | WO0052880 A2 | 9/2000 |
| WO | WO0064111 A1 | 10/2000 |
| WO | WO0119032 A1 | 3/2001 |
| WO | WO0128170 A2 | 4/2001 |
| WO | WO0171928 A2 | 9/2001 |
| WO | WO0172081 | 9/2001 |
| WO | WO0176110 A2 | 10/2001 |
| WO | WO0213440 A2 | 2/2002 |
| WO | 0228119 | 4/2002 |
| WO | 0233852 | 4/2002 |
| WO | WO0233582 | 4/2002 |
| WO | WO0235873 A2 | 5/2002 |
| WO | WO0261969 A1 | 8/2002 |
| WO | WO02065664 A2 | 8/2002 |
| WO | 02082751 | 10/2002 |
| WO | WO02078211 A2 | 10/2002 |
| WO | 02093843 | 11/2002 |
| WO | WO02100064 A2 | 12/2002 |
| WO | 03032526 | 4/2003 |
| WO | WO03034619 A1 | 4/2003 |
| WO | WO03034642 A2 | 4/2003 |
| WO | WO03039074 A1 | 5/2003 |
| WO | WO03050968 A2 | 6/2003 |
| WO | WO03107577 A2 | 12/2003 |
| WO | WO2004030287 A2 | 4/2004 |
| WO | WO2004038985 A2 | 5/2004 |
| WO | 2005039127 | 4/2005 |
| WO | 2005039133 | 4/2005 |

OTHER PUBLICATIONS

ETSI TS 125 211 v5.1.0; "Universal Mobile Telecommunications System (UMTS); Physical channels and mapping of transport channels onto physical channels (FDD)", 3GPP TS 25.211 version 5.1.0 Release 5 (Sep. 2004).
ETSI TS 125 212 v6.2.0; "Universal Mobile Telecommunications System (UMTS); Multiplexing and channel coding (FDD)". 3G TS 25.212 version 6.2.0 Release 5 (Jun. 2004).
ETSI TS 125 213 v6.0.0; "Universal Mobile Telecommunications System (UMTS); Spreading and modulation (FDD)", 3G TS 25.213 version 6.0.0 Release 5 (Dec. 2003).
ETSI TS 125 214 v6.3.0; "Universal Mobile Telecommunications System (UMTS); Physical layer procedures (FDD)", 3G TS 25.214 version 6.3.0 Release 5 (Sep. 2004).
3GPP2-C.S0002-C v1.0, "Physical Layer Standard for cdma2000 Spread Spectrum Systems", (TR 45.5), Release C, May 28, 2002.
International Report on Patentability—PCT/US04/034257—IPEA/US Nov. 21, 2005.
Written Opinion—PCT/US04/034257—International Search Authority—European Patent Office—Mar. 7, 2005.
Seung et al., : "Multi-Stage Partial PIC Receivers for Multi-Rate DS-CDMA System with Multiple Modulation", IEEE 2003, pp. 591-594.
Won-Tae et al., : "MMAC : An Efficient WMATM MAC For Multicast Communications", Global Telecommunications Conference- Globecom '99, IEEE, pp. 587-591.
"ETSI TS 125 211 v5.6.0; ""Universal Mobile Telecommunications System (UMTS); Physical channels and mapping of transport channels onto physical channels (FDD)"", 3GPP TS 25.211 version 5.6.0 Release 5 (Sep. 2004)."
"TIA/EIA/IS-856 Standard" CDMA2000 High Rate Packet Data Air Interface Specification, Nov. 2000, (the IS-856 standard).
3GPP2 TS 25.211: "Physical channels and mapping of transport channels onto physical channels (FDD)", Release 6, V.6.0.0, Dec. 2003.
3GPP2 TS 25.212: "Multiplexing and channel coding (FDD)", Release 5, V.510.0, Jun. 2005.
3GPP2 TS 25.213: "Spreading and modulation (FDD)", Release 5, V5.6.0, Jun. 2005.
3GPP2 TS 25.214: "Physical layer procedures (FDD)", Release 5, V5.11.0, Jun. 2005.
3GPP: "TIA/EIA/IS-95-B Mobile Station-Base Station Compatibility Standard for Dual-Mode Wideband Spread Spectrum Cellular System".
TR-45.5 "Physical Layer Standard for cdma2000 Spread Spectrum Systems", (the IS-2000 standard).
"A Wireless Token Ring Protocol for Ad-Hoc Networks," IEEE Aerospace Conference Proceedings, 2002. vol. 3, pp. 6-1219 to 3-1228.
3GPP TS 25.211 v5.0.0 (Mar. 2002) Technical Specification Group Radio Access Network; Physical Channels and Mapping of Transport Channels onto Physical Channels (FDD) (Release 5).
3GPP TS 25.212 v6.0.0 (Dec. 2003) Technical Specification Group Radio Access Network; Multiplexing and Channel Coding (FDD) (Release 6).
3GPP TS 25.213 v6.0.0 (Dec. 2003) Technical Specification Group Radio Access Network; Spreading and Modulation (FDD) (Release 6).
3GPP TS 25.214 v6.0.0 (Dec. 2003) Technical Specification Group Radio Access Network; Physical Layer Procedures (FDD) (Release 6).
IEEE Std. 802.11a—1999 Part 11: Wireless LAN Medium Access Control (MAC) and Physical Layer (PHY) Specifications: High-speed Physical Layer in the 5 GHZ Band.
IEEE Std. 802.11b—1999 Part 11: Wireless LAN Medium Access Control (MAC) and Physical Layer (PHY) Specifications: Higher-Speed Physical Layer Extension in the 2.4 GHz Band.
IEEE Std. 802.11e—2003 Part 11: Wireless LAN Medium Access Control (MAC) and Physical Layer (PHY) Specifications, Amendment 4: Further Higher Data Rate Extension in the 2.4 GHz Band.
IEEE Std. 802.11g—2003 Part 11: Wireless LAN Medium Access Control (MAC) and Physical Layer (PHY) Specifications, Amendment 4: Further Higher Data Rate Extension in the 2.4 GHz Band.
Mangold, et al.: "IEEE 802.11e Wireless LAN for Quality of Service," Feb. 2002, pp. 1-8, XP002251598.
Mujtaba, "TGN Sync Proposal Technical Specification," IEEE Wireless LANS, IEEE 802.11-04/0899r5, May 2005, pp. 1-134.
TIA/EIA-95-B Mobile Station-Base Station Compatibility Standard for Dual-Mode Wideband Spread Spectrum Cellular System (IS-95 Standard), Mar. 1999.
TIA/EIA/IS-856-A, "CDMA 2000 High Rate Packet Data Air Interface Specification", (Revision of TIA/EIA/IS-856), Apr. 2004.
TR-45.5 Physical Layer Standard for CDMA 2000 Spread Spectrum Systems, 3GPP2 C.S000-2D, Version 1.0, Feb. 13, 2004.
3GPP TS 25.211 Physical channels and mapping of transport channels onto physical.channels (FDD). Release 5, V5.0.0, Mar. 2002.
ETSI TS 125 213 v6.0.0; "Universal Mobile Telecommunications System (UMTS); Spreading and modulation (FDD)", 3G TS 25.213 version 6.0.0 Release 6 (Dec. 2003).
Miyashita, K. et al. "Eigenbeam Space Division Multiplexing (E-SDM) in a MIMO Channel", Technical Research Report by Electric Information Communication Academic Conference, May 17, 2002, vol. 102, No. 86, pp. 13-18, FRCS2002-53.
Partial European Search Report—EP 10010614 Search Authority—Munich Patent Office, Feb. 1, 2011.
TGn Sync Complete Proposal, IEEE 802.11-04/88803, IEEE mentor, Jul. 8, 2005.
Translation of Office Action in Japan application 2008-531288 corresponding to U.S Appl. No. 11/312,187, citing IEEE_802_11_04_888r13_TGn_Sync_Complete_year_2005, JP2005505148, JP2000174820, JP2005020163 and 302005039133 dated Jan. 25, 2011.
"MIMO-related Technology," Collection of Standard Technologies of the Japan Patent Office, May 25, 2005, 1-1-1, 1-1-3, URL, http://www.jpo.go.jp/shiryou/s_sonota/hyoujun_gijutsu/mimo/mokuji.htm.
Edfors et al, "OFDM Channel Estimation by Singular Value Decomposition," IEEE Transactions on Communications, 46(7):931-939, (Jul. 1998).
European Search Report—EP10011027—Search Authority—Munich—Apr. 20, 2012.
Fu J., et al., "The Largest Eigenvalue Characteristics for MIMO Channel with Spatial Correlation in Multipath Fading", Technical Report of the Institute of Electronics, Information and Communication Engineers, Feb. 27, 2003, vol. 102, No. 681, pp. 171-178, RCS 2002-334.
Ivrlac M. T., et al.,"Efficient Use of Fading Correlations in MIMO Systems", Vehicular Technology Conference, 2001, VTC 2001 Fall, vol. 4, pp. 2763-2767.
Sheu, Shiann-Tsong et al.: "An Improved Data Flushing MAC Protocol for IEEE 802.11 Wireless Ad Hoc Network," VTC 2002-Fall. 2002 IEEE 56TH Vehicular Technology Conference Proceedings. Vancouver, Canada, Sept. 24-28, 2002; [IEEE Vehicular Technolgy Conference], New York, NY: IEEE, US, vol. 4, (Sep. 24, 2002), pp. 2435-2439; XP010608871; ISBN: 978-0-78037467-6 the whole document.
Taiwan Search Report—TW093131484—TIPO—Sep. 18, 2011.
Taiwan Search Report—TW094118180—TIPO—Mar. 14, 2012.

* cited by examiner

METHOD, APPARATUS, AND SYSTEM FOR MULTIPLEXING PROTOCOL DATA UNITS

CLAIM OF PRIORITY UNDER 35 U.S.C. §119

The present Application for Patent claims priority to the following U.S. Provisional Patent Applications:

Provisional Application No. 60/511,750 entitled "Method and Apparatus for Providing Interoperability and Backward Compatibility in Wireless Communication Systems" filed Oct. 15, 2003;

Provisional Application No. 60/511,904 entitled "Method, Apparatus, and System for Medium Access Control in a High Performance Wireless LAN Environment" filed Oct. 15, 2003;

Provisional Application No. 60/513,239 entitled "Peer-to-Peer Connections in MIMO WLAN System" filed Oct. 21, 2003;

Provisional Application No. 60/526,347 entitled "Method, Apparatus, and System for Sub-Network Protocol Stack for Very High Speed Wireless LAN" filed Dec. 1, 2003;

Provisional Application No. 60/526,356 entitled "Method, Apparatus, and System for Multiplexing Protocol data Units in a High Performance Wireless LAN Environment" filed Dec. 1, 2003;

Provisional Application No. 60/532,791 entitled "Wireless Communications Medium Access Control (MAC) Enhancements" filed Dec. 23, 2003;

Provisional Application No. 60/545,963 entitled "Adaptive Coordination Function (ACF)" filed Feb. 18, 2004;

Provisional Application No. 60/576,545 entitled "Method and Apparatus for Robust Wireless Network" filed Jun. 2, 2004;

Provisional Application No. 60/586,841 entitled "Method and Apparatus for Distribution Communication Resources Among Multiple Users" filed Jul. 8, 2004; and Provisional Application No. 60/600,960 entitled "Method, Apparatus, and System for Wireless Communications" filed Aug. 11, 2004; all assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"Wireless LAN Protocol Stack" by Ketchum et al., having, filed concurrently herewith, assigned to the assignee hereof, and expressly incorporated by reference herein; and "Method, Apparatus, and System for Medium Access Control" by Ketchum et al., having, filed concurrently herewith, assigned to the assignee hereof, and expressly incorporated by reference herein; and "High Speed Media Access Control with Legacy System Interoperability" by Walton et al., having, filed concurrently herewith, assigned to the assignee hereof, and expressly incorporated by reference herein.

BACKGROUND

1. Field

The present invention relates generally to communications, and more specifically to a wireless LAN protocol stack.

2. Background

Wireless communication systems are widely deployed to provide various types of communication such as voice and data. A typical wireless data system, or network, provides multiple users access to one or more shared resources. A system may use a variety of multiple access techniques such as Frequency Division Multiplexing (FDM), Time Division Multiplexing (TDM), Code Division Multiplexing (CDM), and others.

Example wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

Other examples of wireless systems include Wireless Local Area Networks (WLANs) such as the IEEE 802.11 standards (i.e. 802.11 (a), (b), or (g)). Improvements over these networks may be achieved in deploying a Multiple Input Multiple Output (MIMO) WLAN comprising Orthogonal Frequency Division Multiplexing (OFDM) modulation techniques.

As wireless system designs have advanced, higher data rates have become available. Higher data rates have opened up the possibility of advanced applications, among which are voice, video, fast data transfer, and various other applications. However, various applications may have differing requirements for their respective data transfer. Many types of data may have latency and throughput requirements, or need some Quality of Service (QoS) guarantee. Without resource management, the capacity of a system may be reduced, and the system may not operate efficiently.

Medium Access Control (MAC) protocols are commonly used to allocate a shared communication resource between a number of users. MAC protocols commonly interface higher layers to the physical layer used to transmit and receive data. To benefit from an increase in data rates, a MAC protocol must be designed to utilize the shared resource efficiently.

The high performance systems being developed support multiple rates, which may vary widely based on physical link characteristics. Given the varying demands of different data application types, and the large variance of supportable data rates to different user terminals located within a system, advances in how to queue the various traffic types and how to transmit them on the often disparate various physical links need to be developed as well. There is therefore a need in the art for MAC processing for efficient use of high throughput systems.

SUMMARY

Embodiments disclosed herein address the need in the art for MAC processing for efficient use of high throughput systems. In one aspect, a protocol stack is disclosed comprising one or more of the following: an adaptation layer, a data link control layer, a physical layer, and a layer manager. A MAC sublayer Protocol Data Unit adaptable for including data from multiple flows is disclosed. Various features and aspects are detailed further below.

In another aspect, physical layer feedback is used for adaptation layer processing. In one embodiment, physical layer feedback is used for segmentation. In another embodiment, physical layer feedback is used for multicast mapping onto one or more unicast channels. In yet another embodiment, a combination of unicast, multicast, or broadcast channels may be selected to perform multicast transmission in response to physical layer feedback corresponding to the various channels.

In another aspect, a data unit for transmission from a first station to a second station comprises zero or more complete sub-data units, zero or one partial sub-data units from a prior transmission, and zero or one partial sub-data units to fill the data unit. In one embodiment, a pointer may be used to indicate the location of any complete sub-data units. A partial sub-data unit may be inserted at a pre-determined location. Partial sub-data units may be combined with previously stored partial sub-data units, or may be stored for later use. In one embodiment, a sub-data unit may be a MUX sublayer Protocol Data Unit (MUX PDU).

Various other aspects and embodiments are also presented. These aspects have the benefit of providing efficient media access control, and are advantageously used with physical layers comprising high data rates, as well as low data rates.

DETAILED DESCRIPTION

A sub-network protocol stack is disclosed herein that supports highly efficient, low latency, high throughput operation in conjunction with very high bit rate physical layers for the wireless LAN (or similar applications that use newly emerging transmission technologies). The example WLAN supports bit rates in excess of 100 Mbps (million bits per second) in bandwidths of 20 MHz.

Described along with the protocol stack is a method for multiplexing Protocol Data Units (PDUs) from multiple user data streams and sub-network control entities (MUX PDUs) into a single byte stream. The byte stream is formatted into MAC protocol data units (MAC PDUs), each of which may be transmitted in a burst that is contained within a single MAC frame. This may support a high performance wireless LAN sub-network for highly efficient, low latency, high throughput operation in conjunction with very high bit rate physical layers.

The sub-network protocol stack supports high data rate, high bandwidth physical layer transport mechanisms in general, including, but not limited to, those based on OFDM modulation, single carrier modulation techniques, systems using multiple transmit and multiple receive antennas (Multiple Input Multiple Output (MIMO) systems, including Multiple Input Single Output (MISO) systems) for very high bandwidth efficiency operation, systems using multiple transmit and receive antennas in conjunction with spatial multiplexing techniques to transmit data to or from multiple user terminals during the same time interval, and systems using code division multiple access (CDMA) techniques to allow transmissions for multiple users simultaneously.

One or more exemplary embodiments described herein are set forth in the context of a wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps. Method steps can be interchanged without departing from the scope of the present invention. The word "exemplary" is used herein to mean "serving as an example, instance, or illustration." Any embodiment described herein as "exemplary" is not necessarily to be construed as preferred or advantageous over other embodiments.

Figure 1:
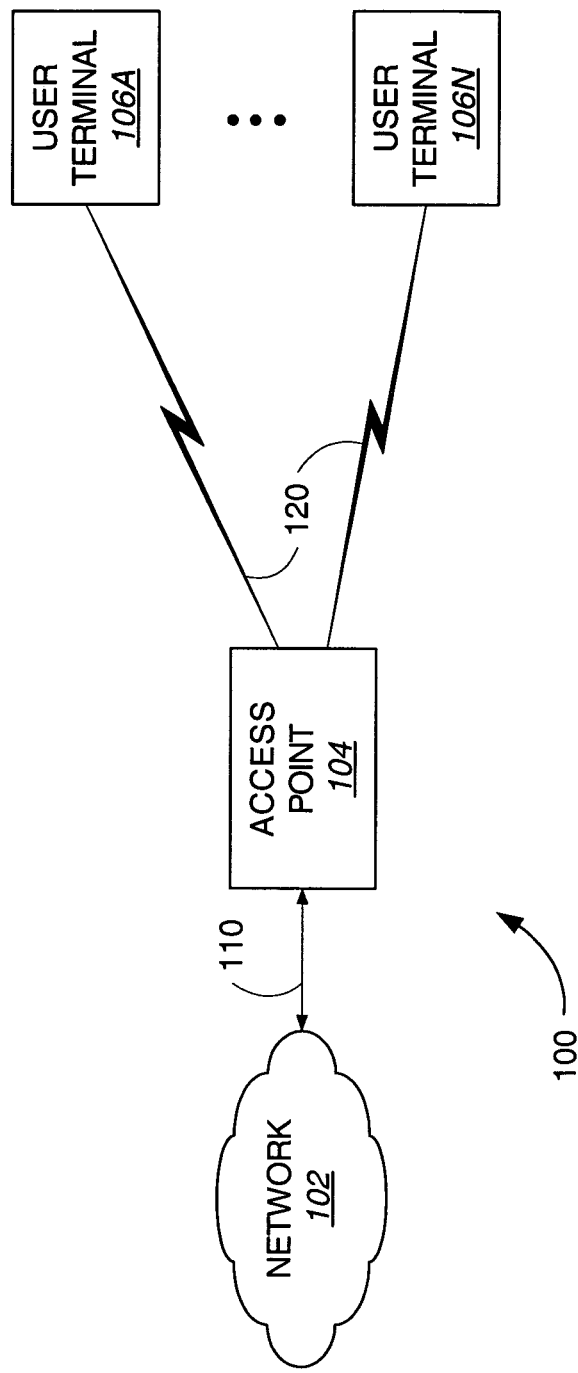
FIG. 1 is an example embodiment of a system including a high-speed WLAN.

FIG. 1 is an example embodiment of system 100, comprising an Access Point (AP) 104 connected to one or more User Terminals (UTs) 106A-N. The AP and the UTs communicate via Wireless Local Area Network (WLAN) 120. In the example embodiment, WLAN 120 is a high speed MIMO OFDM system. However, WLAN 120 may be any wireless LAN. Access point 104 communicates with any number of external devices or processes via network 102. Network 102 may be the Internet, an intranet, or any other wired, wireless, or optical network. Connection 110 carries the physical layer signals from the network to the access point 104. Devices or processes may be connected to network 102 or as UTs (or via connections therewith) on WLAN 120. Examples of devices that may be connected to either network 102 or WLAN 120 include phones, Personal Digital Assistants (PDAs), computers of various types (laptops, personal computers, workstations, terminals of any type), video devices such as cameras, camcorders, webcams, and virtually any other type of data device. Processes may include voice, video, data communications, etc. Various data streams may have varying transmission requirements, which may be accommodated by using varying Quality of Service (QoS) techniques.

System 100 is deployed with a centralized AP 104. All UTs 106 communicate with the AP in the example embodiment. In an alternate embodiment, direct peer-to-peer communication between two UTs may be accommodated, with modifications to the system, as will be apparent to those of skill in the art. For clarity of discussion, in the example embodiment, access to the physical layer transport mechanism is controlled by the AP.

Figure 24:
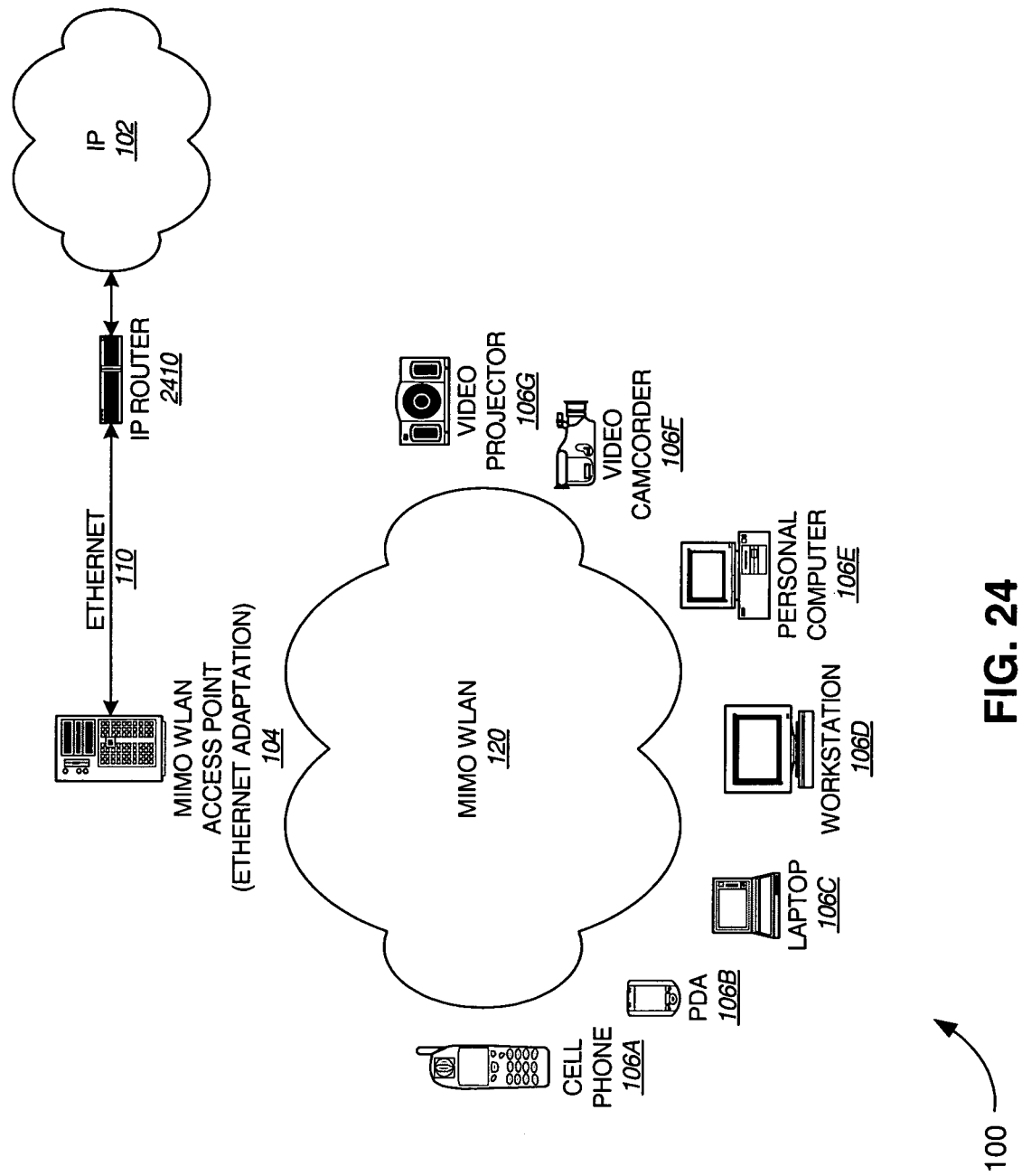
FIG. 24 illustrates an example system configured for Ethernet adaptation.

In one embodiment, AP 104 provides Ethernet adaptation, an example of which is illustrated in FIG. 24 In this case, an IP router 2410 may be deployed with the AP 104 to provide connection (via Ethernet connection 110) to network 102. Illustrative example UTs 106 are shown, for example, cell phone 106A, Personal Digital Assistant (PDA) 106B, laptop 106C, workstation 106D, personal computer 106E, video camcorder 106F, and video projector 106G. Ethernet frames may be transferred between the router and the UTs 106 over the WLAN sub-network 120 (detailed below).

Figure 26:
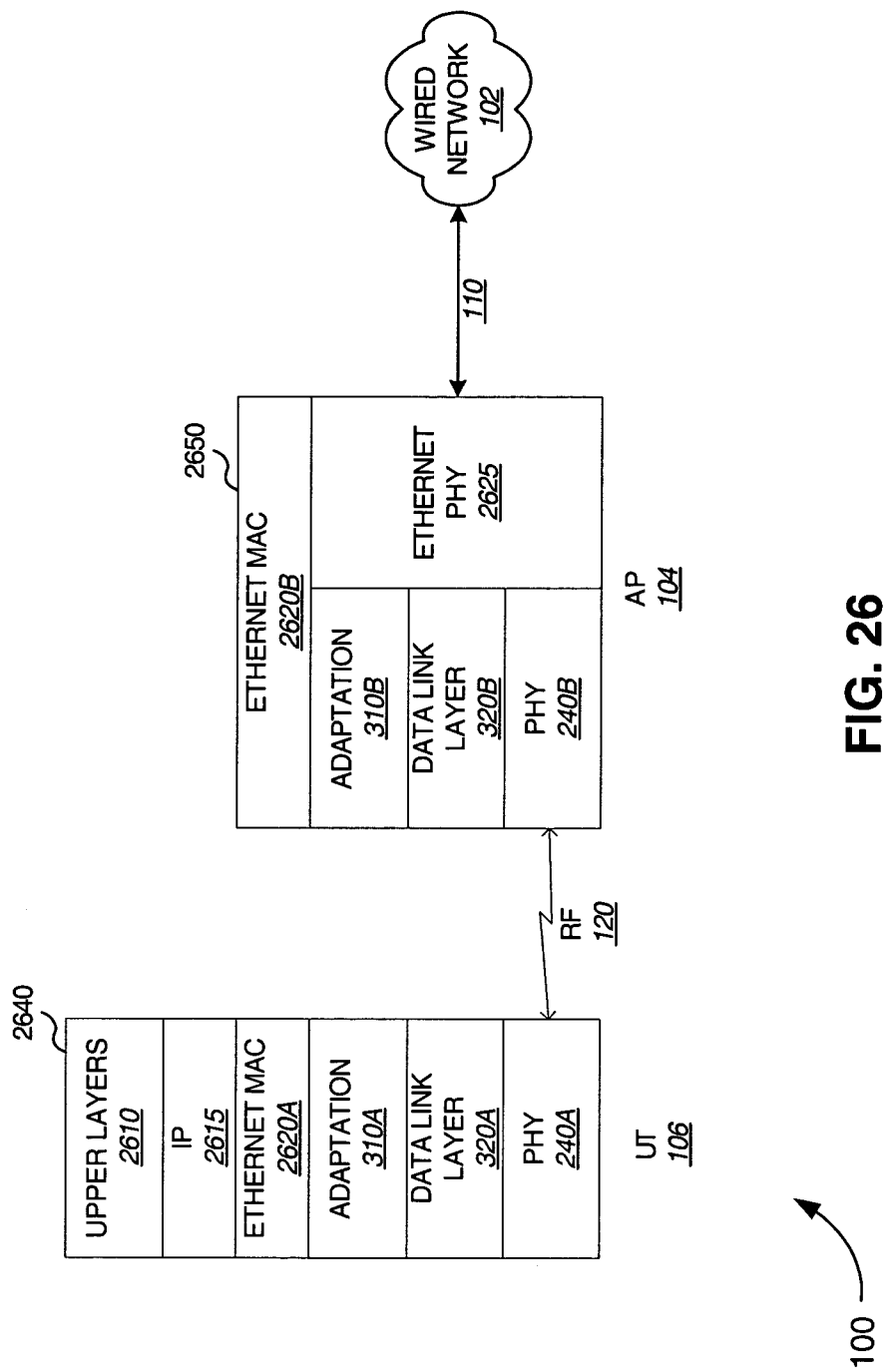
FIG. 26 illustrates example Ethernet protocol stacks.

Ethernet adaptation and connectivity are well known in the art. FIG. 26 illustrates Ethernet adaptation protocol stacks 2640 and 2650 for an example UT 106 and AP 104, respectively, as integrated with example layers detailed further below. UT protocol stack 2640 comprises upper layers 2610, IIP layer 2615, Ethernet MAC layer 2620A, adaptation layer 310A, data link layer 320A, and physical layer (PHY) 240A. AP protocol stack 2650 comprises PHY 240B (connected to UT PHY 240A via RF link 120), data link layer 320B, and adaptation layer 310B. Ethernet MAC 2620B connects adaptation layer 310B to Ethernet PHY 2625, which is connected 110 with wired network 102.

Figure 25:
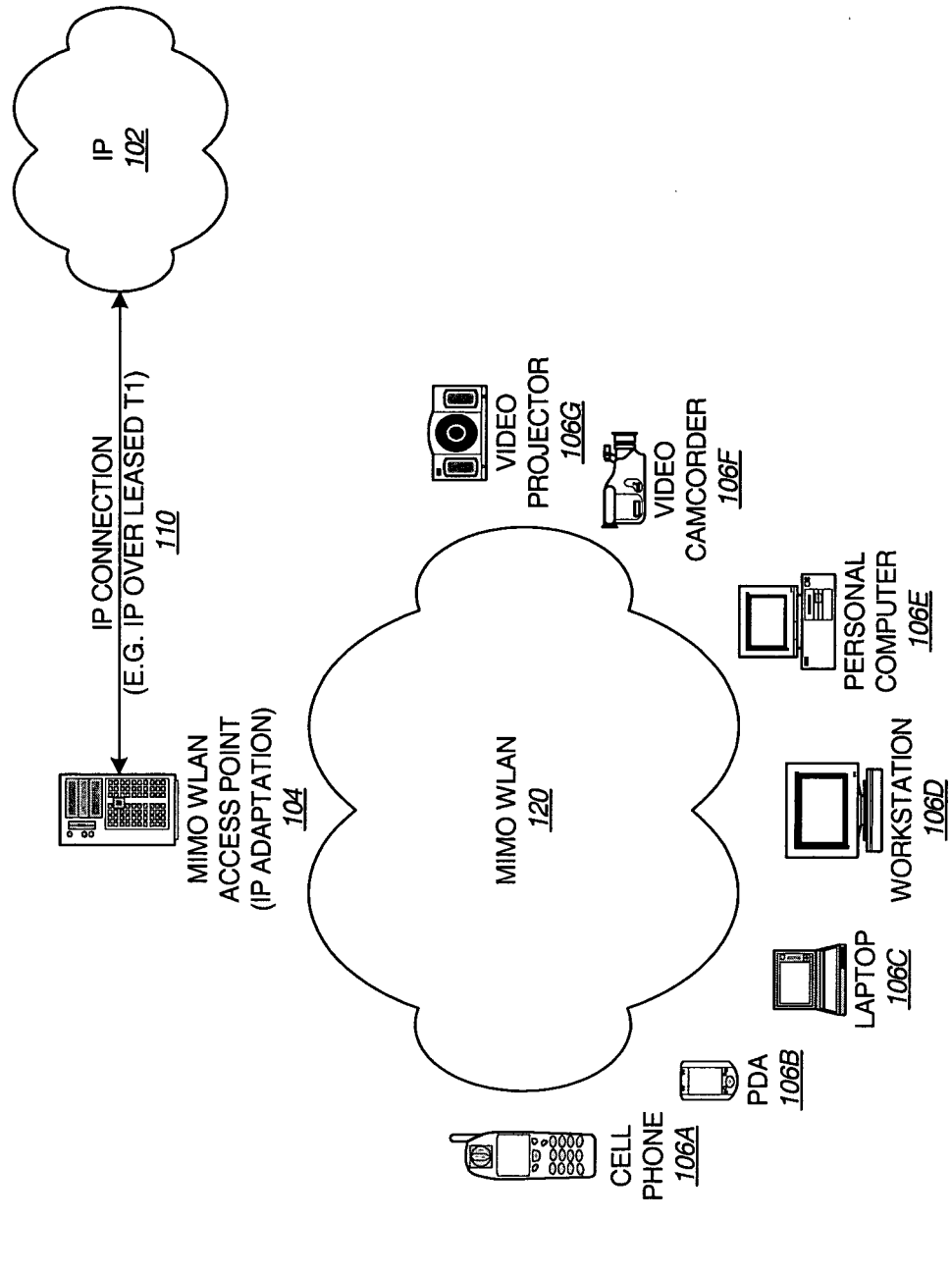
FIG. 25 illustrates an example system configured for IP adaptation.

In an alternate embodiment, AP 104 provides IP Adaptation, an example of which is illustrated in FIG. 25. In this case, the AP 104 acts as a gateway router for the set of connected UTs (as described with respect to FIG. 24). In this case, IP datagrams may be routed by the AP 104 to and from the UTs 106.

Figure 27:
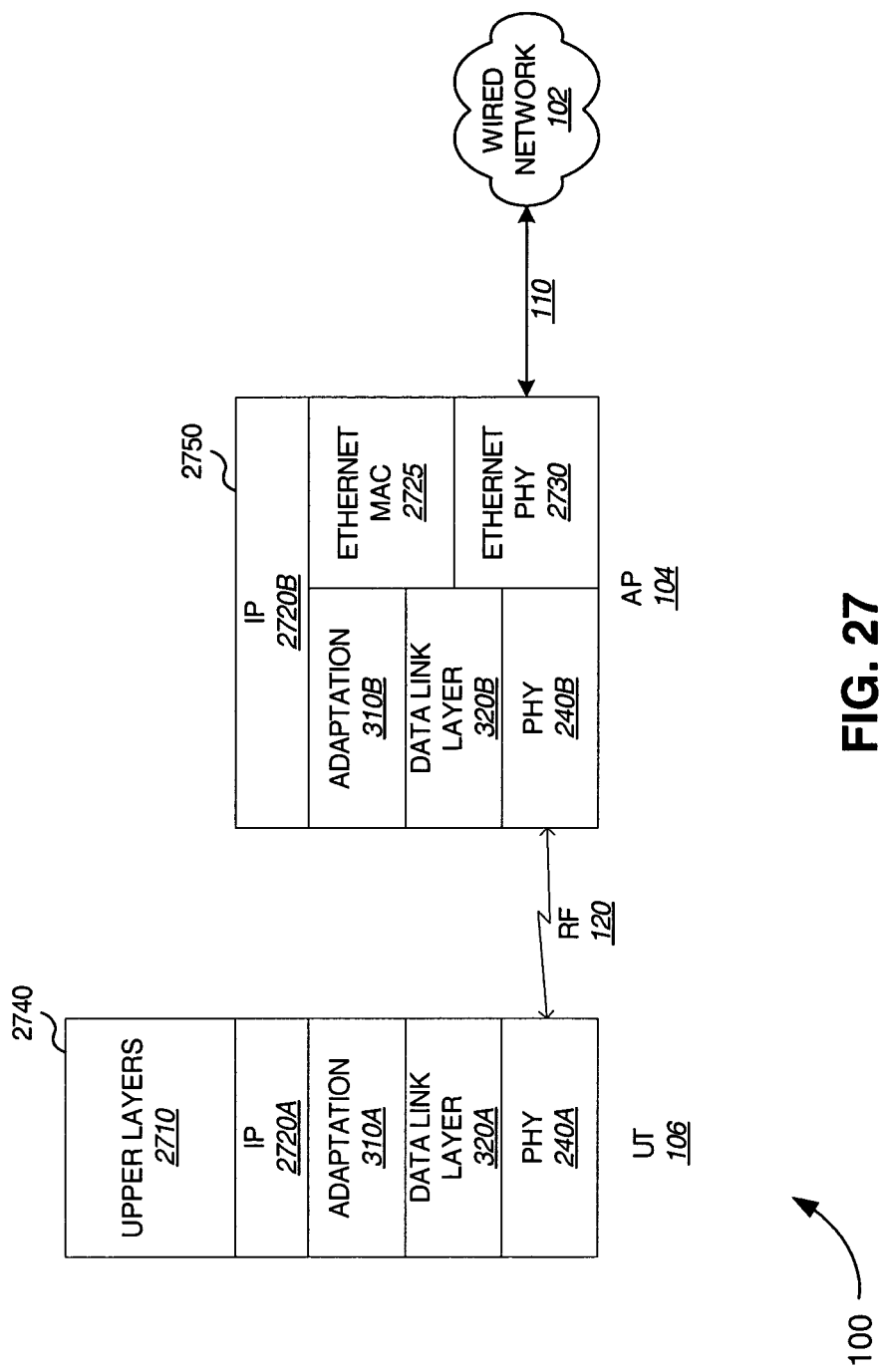
FIG. 27 illustrates example IP protocol stacks.

IP adaptation and connectivity are well known in the art. FIG. 27 illustrates IP adaptation protocol stacks 2740 and 2750 for an example UT 106 and AP 104, respectively, as integrated with example layers detailed further below. UT protocol stack 2740 comprises upper layers 2710, IP layer 2720A, adaptation layer 310A, data link layer 320A, and physical layer (PHY) 240A. AP protocol stack 2750 comprises PHY 240B (connected to UT PHY 240A via RF link 120), data link layer 320B, and adaptation layer 310B. IP layer 2720B connects adaptation layer 310B to Ethernet MAC 2725 which is connected to Ethernet PHY 2730. Ethernet PHY 2730 is connected 110 with wired network 102.

Figure 2:
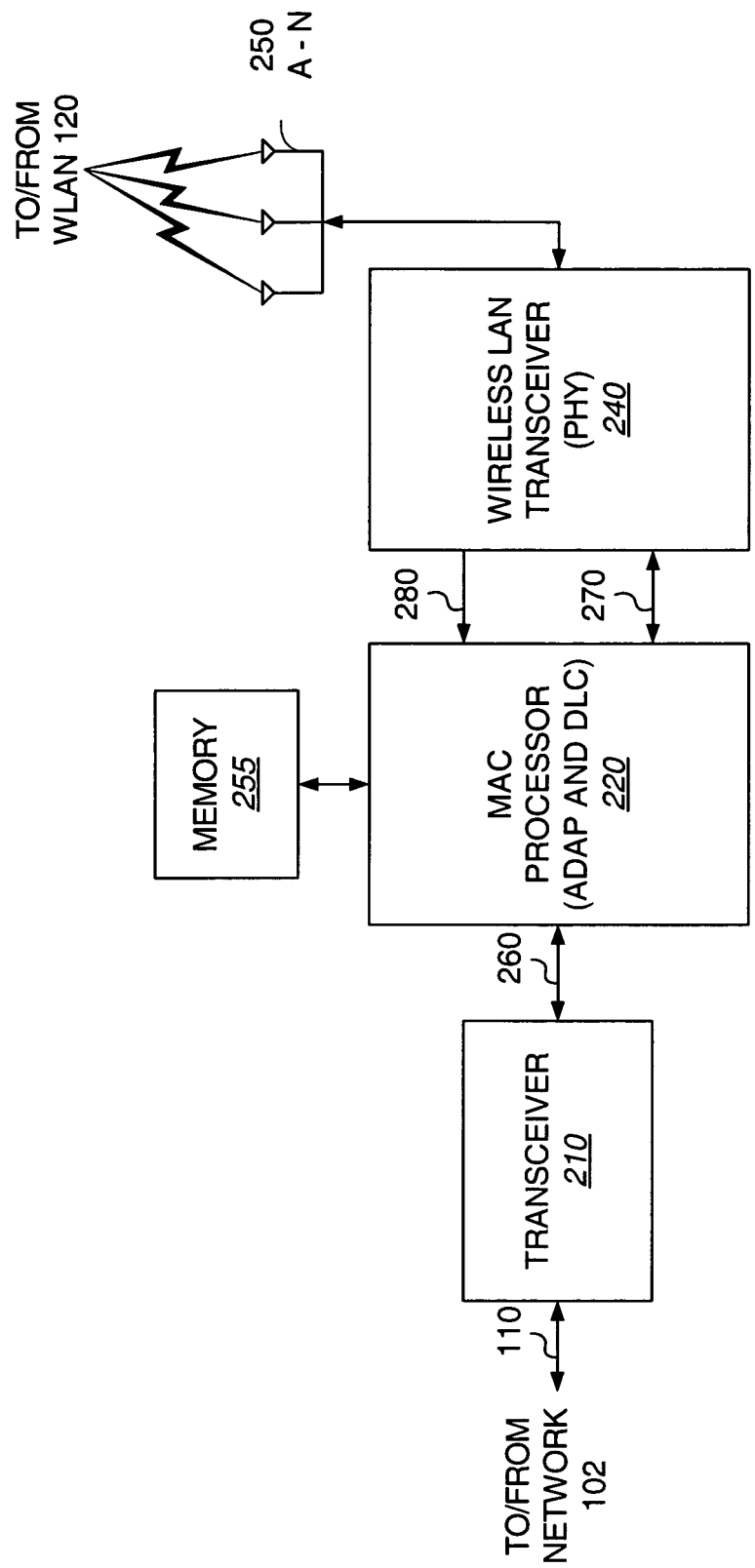
FIG. 2 depicts an example embodiment of a wireless communication device, which may be configured as an access point or user terminal.

FIG. 2 depicts an example embodiment of a wireless communication device, which may be configured as an access point 104 or user terminal 106. An access point 104 configuration is shown in FIG. 2. Transceiver 210 receives and transmits on connection 110 according to the physical layer requirements of network 102. Data from or to devices or applications connected to network 102 are delivered to MAC processor 220. These data are referred to herein as flows 260. Flows may have different characteristics and may require different processing based on the type of application associated with the flow. For example, video or voice may be characterized as low-latency flows (video generally having higher throughput requirements than voice). Many data applications are less sensitive to latency, but may have higher data integrity requirements (i.e., voice may be tolerant of some packet loss, file transfer is generally intolerant of packet loss).

MAC processor 220 receives flows 260 and processes them for transmission on the physical layer. MAC processor 220 also receives physical layer data and processes the data to form packets for outgoing flows 260. Internal control and signaling is also communicated between the AP and the UTs. MAC Protocol Data Units (MAC PDUs) are delivered to and received from wireless LAN transceiver 240 on connection 270. Conversion from flows and commands to MAC PDUs, and vice versa, is detailed below. Feedback 280 corresponding to the various MAC IDs is returned from the physical layer (PHY) 240 to MAC processor 220 for various purposes, detailed further below. Feedback 280 may comprise any physical layer information, including supportable rates for channels (including multicast as well as unicast channels), modulation format, and various other parameters.

In an example embodiment, the Adaptation layer (ADAP) and Data Link Control layer (DLC) are performed in MAC processor 220. The physical layer (PHY) is performed on wireless LAN transceiver 240. Those of skill in the art will recognize that the segmentation of the various functions may be made in any of a variety of configurations. MAC processor 220 may perform some or all of the processing for the physical layer. A wireless LAN transceiver may include a processor for performing MAC processing, or subparts thereof. Any number of processors, special purpose hardware, or combination thereof may be deployed.

MAC processor 220 may be a general-purpose microprocessor, a digital signal processor (DSP), or a special-purpose processor. MAC processor 220 may be connected with special-purpose hardware to assist in various tasks (details not shown). Various applications may be run on externally connected processors, such as an externally connected computer or over a network connection, may run on an additional processor within access point 104 (not shown), or may run on MAC processor 220 itself. MAC processor 220 is shown connected with memory 255, which may be used for storing data as well as instructions for performing the various procedures and methods described herein. Those of skill in the art will recognize that memory 255 may be comprised of one or more memory components of various types, that may be embedded in whole or in part within MAC processor 220.

In addition to storing instructions and data for performing functions described herein, memory 255 may also be used for storing data associated with various queues (detailed further below). Memory 255 may include UT proxy queues (described below).

Wireless LAN transceiver 240 may be any type of transceiver. In an example embodiment, wireless LAN transceiver 240 is an OFDM transceiver, which may be operated with a MIMO or MISO interface. OFDM, MIMO, and MISO are known to those of skill in the art. Various example OFDM, MIMO and MISO transceivers are detailed in co-pending U.S. patent application Ser. No. 10/650,295, entitled "FREQUENCY-INDEPENDENT SPATIAL-PROCESSING FOR WIDEBAND MISO AND MIMO SYSTEMS," filed Aug. 27, 2003, assigned to the assignee of the present invention.

Wireless LAN transceiver 240 is shown connected with antennas 250 A-N. Any number of antennas may be supported in various embodiments. Antennas 250 are used to transmit and receive on WLAN 120.

Wireless LAN transceiver 240 may comprise a spatial processor connected to each of the one or more antennas 250. The spatial processor may process the data for transmission independently for each antenna. Examples of the independent processing may be based on channel estimates, feedback from the UT, channel inversion, or a variety of other techniques known in the art. The processing is performed using any of a variety of spatial processing techniques. Various transceivers of this type may use beam forming, beam steering, eigen-steering, or other spatial techniques to increase throughput to and from a given user terminal. In an example embodiment, in which OFDM symbols are transmitted, the spatial processor may comprise sub-spatial processors for processing each of the OFDM subchannels, or bins.

In an example system, the AP may have N antennas, and an example UT may have M antennas. There are thus M×N paths between the antennas of the AP and the UT. A variety of spatial techniques for improving throughput using these multiple paths are known in the art. In a Space Time Transmit Diversity (STTD) system (also referred to herein as "diversity"), transmission data is formatted and encoded and sent across all the antennas as a single stream of data. With M transmit antennas and N receive antennas there may be MIN (M, N) independent channels that may be formed. Spatial multiplexing exploits these independent paths and may transmit different data on each of the independent paths, to increase the transmission rate.

Various techniques are known for learning or adapting to the characteristics of the channel between the AP and a UT. Unique pilots may be transmitted from each transmit antenna. The pilots are received at each receive antenna and measured. Channel feedback may then be returned to the transmitting device for use in transmission. Channel inversion is one technique, allowing for pre-processing and transmission, although it may be computationally intensive. Eigen decomposition may be performed, and a lookup table may be employed to determine a rate. An alternate technique, to avoid channel decomposition, is to use eigen-steering of a pilot to simplify spatial processing. Pre-distortion techniques are also known for simplification of processing at the receiver.

Thus, depending on the current channel conditions, varying data rates may be available for transmission to various user terminals throughout the system. In particular, the specific link between the AP and each UT may be higher performance than a link that may be shared by more than one UT. Examples of this are detailed further below. The wireless LAN transceiver 240 may determine the supportable rate based on whichever spatial processing is being used for the physical link between the AP and the UT. This information may be fed back on connection 280 for use in MAC processing, detailed further below.

The number of antennas may be deployed depending on the UT's data needs. For example, a high definition video display may comprise, for example, four antennas, due to its high bandwidth requirements, while a PDA may be satisfied with two. An example access point may have four antennas.

A user terminal 106 may be deployed in similar fashion to the access point 104 depicted in FIG. 2. Rather than having flows 260 connect with a LAN transceiver (although a UT may include such a transceiver, either wired or wireless), flows 260 are generally received from or delivered to one or more applications or processes operating on the UT or a device connected therewith. The higher levels connected to either AP 104 or UT 106 may be of any type. The layers described herein are illustrative only.

Protocol Stack

Figure 3:
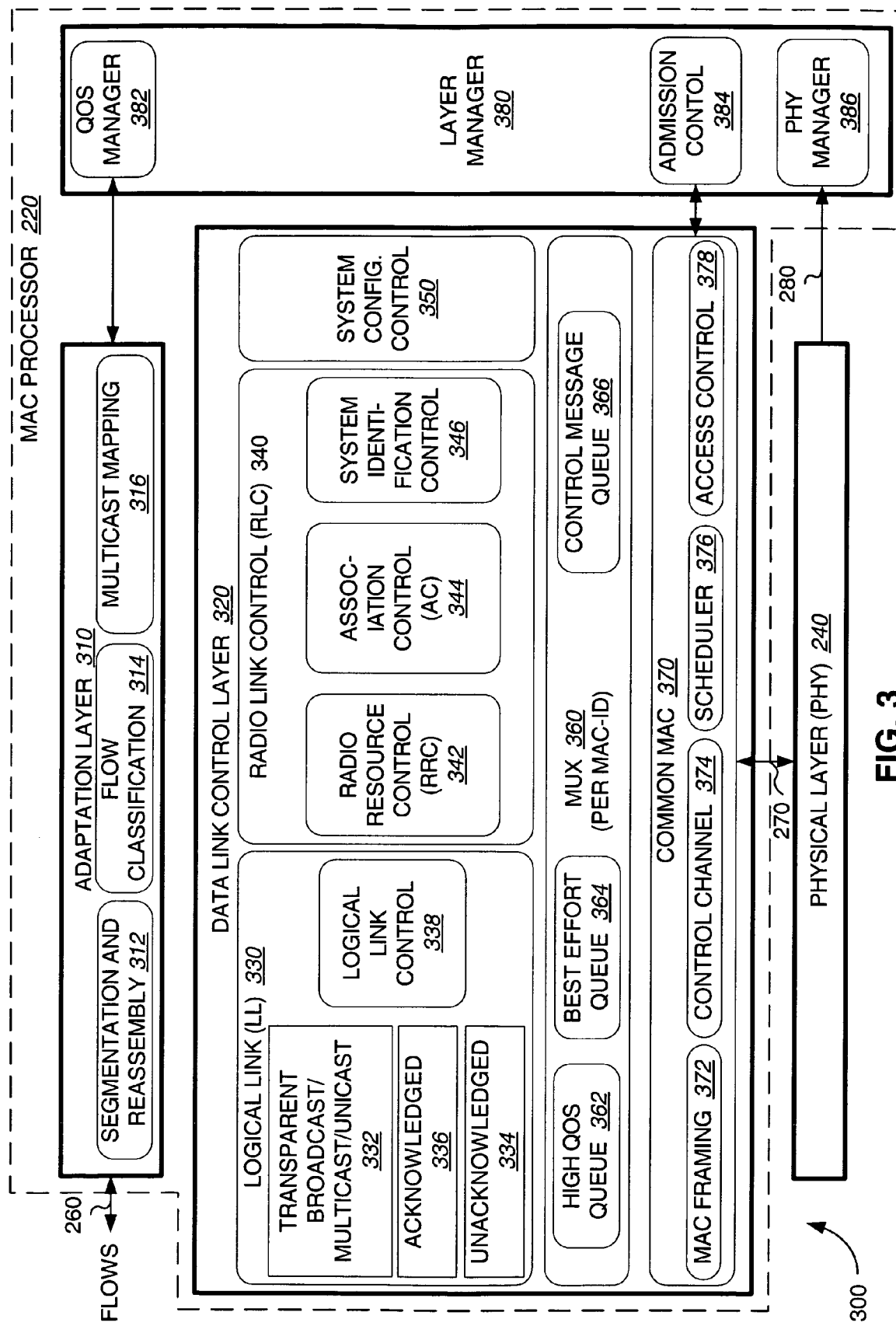
FIG. 3 depicts an example Sub-network Protocol Stack.

FIG. 3 depicts an example sub-network protocol stack 300. Sub-network protocol stack 300 may serve as the interface between a very high bit rate wireless LAN physical layer, and the network layer or MAC layer of some other network, such as an Ethernet MAC layer or a TCP/IP network layer. Various features of the protocol stack 300 may be deployed to take full advantage of a very high performance wireless LAN physical layer. The example protocol stack may be designed to provide various benefits, examples include (a) minimizing the amount of throughput overhead consumed by the protocol; (b) maximizing the efficiency of packing subnet data units into physical layer frames; (c) minimizing the contribution of latency to end-to-end round trip delay for delay-sensitive transport mechanisms such as TCP; (d) providing highly reliable, in order, delivery of subnet data units; (e) providing support for existing network layers and applications, and sufficient flexibility to accommodate future networks and applications; and (f) integrating transparently with existing network technologies.

Protocol stack 300 has several thin sublayers, several operating modes, and the facility to support interfaces to multiple external networks. FIG. 3 depicts adaptation layer 310, data link control layer 320, and physical layer 240. Layer manager 380 interconnects with each sublayer to provide communication and control for various functions, detailed below.

In FIG. 3, an example configuration of protocol stack 300 is depicted. A dashed line indicates an example configuration of components that may be deployed in a MAC processor 220, as described above. The adaptation layer 310, data link control layer 320, and layer manager 380 are included. In this configuration, a physical layer 240, as described above, receives and transmits MAC Protocol Data Units (PDUs) on connection 270. Feedback connection 280 is directed to layer manager 380 to provide physical layer information for use in various functions detailed below. This example is illustrative only. Those of skill in the art will recognize that any number of components, configured to encompass any combination of the stack functions described, including subsets thereof, may be deployed within the scope of the present invention.

Adaptation layer 310 offers an interface to higher layers. For example, the adaptation layer may interface with an IP stack (for IP adaptation), an Ethernet MAC (for Ethernet adaptation), or various other network layers. Flows 260 are received from one or more higher layers for MAC processing and transmission on the physical layer 240. Flows 260 are also received via the physical layer, processed, and reassembled for delivery to one or more higher layers.

Adaptation layer 310 comprises the following functions: segmentation and reassembly 312, flow classification 314, and multicast mapping 316. The flow classification function 314 examines the headers packets received from higher layers (from one or more flows 260), maps each packet to a user terminal or a multicast group MAC identifier (MAC ID), and classifies the packets for appropriate Quality of Service (QoS) treatment. The multicast mapping function 316 determines if multicast user data is to be transported using a multicast MAC ID (referred to as "MAC layer multicast"), or through multiple unicast MAC IDs (referred to as "adaptation layer multicast"), examples of which are detailed below. The Segmentation and Reassembly (SAR) function 312 adapts each higher layer packet to a Protocol Data Unit (PDU) size appropriate for the Logical Link (LL) mode. The SAR function 312 is performed separately for each MAC ID. The flow classification function 314 is common.

Data link control layer 320 comprises Logical Link (LL) layer 330, Radio Link Control (RLC) layer 340, system configuration control 350, MUX function 360, and common MAC function 370. Various sub blocks for each of these layers are depicted in FIG. 3, and will be described further below. The blocks shown are illustrative only. Subsets of these functions, as well as additional functions may be deployed in various alternate embodiments.

The physical layer 240 may be any type of physical layer, examples of which are detailed above. An example embodiment uses a MIMO OFDM physical layer. Example parameters of this embodiment are included in the description below.

The Layer Manager (LM) 380 interfaces to the adaptation layer 310, data link control layer 320 and the physical layer 240 to manage QoS, admission control and control of physical layer transmitter and receiver parameters. Note that feedback 280 from the physical layer may be used in performing various functions described herein. For example, supportable rates for various UTs may be used in multicast mapping 316 or segmentation and reassembly 312.

Adaptation Layer

The Flow Classification (FLCL) function 314 examines packet header fields of incoming packets to map them into flows. In an example embodiment, in which IP adaptation is performed, the following fields may be used for flow classification: (a) IP source and destination addresses; (b) IP source and destination ports; (c) IP DiffServ Code Point (DSCP); (d) Resource Reservation Protocol (RSVP) messages; and (e) Real-time Transport Control Protocol (RTCP) messages and Real-time Transport Protocol (RTP) headers. In an alternate embodiment, in which Ethernet adaptation is performed, the flow classification may use 802.1p and 802.1q header fields. It is also possible for Ethernet adaptation to use IP flow classification, although this would be a layer violation. Those of skill in the art will appreciate various other types of flow classification may alternatively be deployed.

The FLCL 314 determines if an identified flow 260 maps to an existing MAC ID, Logical Link (LL) mode and stream ID (detailed further below). If an incoming packet maps to an existing flow, the FLCL forwards the packet for further processing to the Segmentation and Reassembly (SAR) function 312. If a new MAC ID is required, a request is forwarded to the association control function 344 in the Radio Link Control (RLC) 340.

If a new flow is identified for an existing MAC ID, the QoS Manager function 382 in layer manager 380 determines the type of logical link mode required for the flow. If a new LL mode is to be initialized, the request is forwarded to the LLC function 338 corresponding to the MAC ID to handle mode negotiation. If a new stream is to be established within an existing LL mode, the request is forwarded to the LLC function 338. One embodiment for maintaining QoS queues is detailed in co-pending U.S. patent application Ser. No. 10/723,346, entitled "QUALITY OF SERVICE SCHEDULER FOR A WIRELESS NETWORK," filed Nov. 26, 2003, assigned to the assignee of the present invention.

In the examples of IP or Ethernet multicast, the multicast mapping function 316 determines if the packet is to be handled using MAC layer multicast, by mapping to a multicast MAC ID, or whether the packet is to be handled as multiple unicast transmissions, referred to herein as "Adaptation Layer Multicast." In the latter case, the multicast mapping function 316 makes multiple copies of the packet, one for each unicast MAC ID to which it is to be transmitted, and forwards the packets to the Segmentation and Reassembly (SAR) function 312. This aspect is detailed further below with respect to FIGS. 15-16.

As just described, the flow classification function 314 maps a packet to a MAC ID, LL mode and stream ID, if any. The segmentation and reassembly function 312 segments the higher layer packet (i.e., an IP datagram or an Ethernet frame) into segments suitable for transport over the logical link mode. An example embodiment of this aspect is detailed further below with respect to FIGS. 17-18. In this example, a one-byte adaptation layer header per segment is added, which permits reassembly when the segments are delivered in order to a corresponding SAR function in the receiver. The adaptation layer Protocol Data Unit (PDU) is then passed on to the data link control layer 320 for processing along with the classification parameters: MAC ID, LL mode, and stream ID.

Data Link Control Layer

Figure 4:
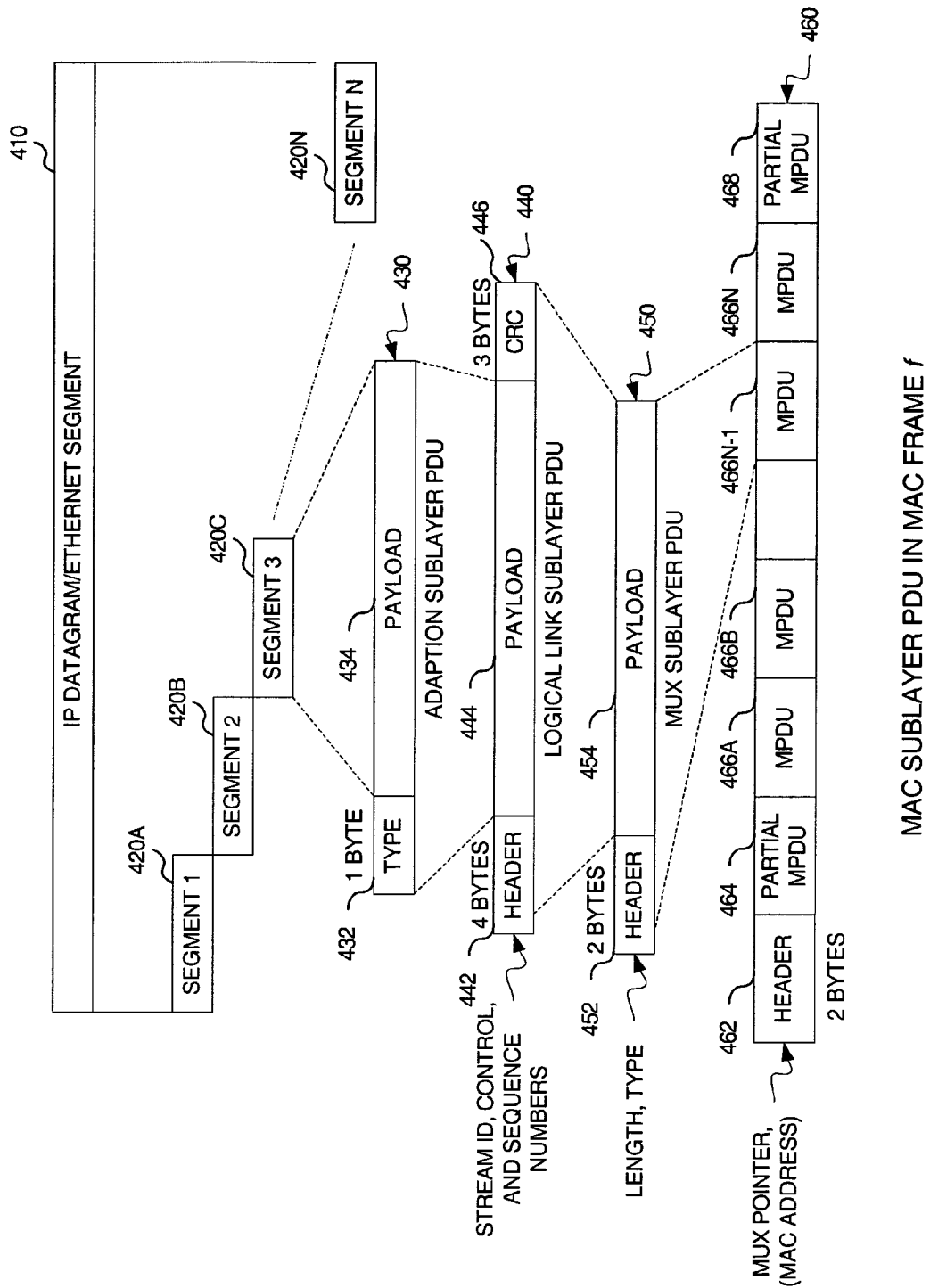
FIG. 4 illustrates a user data packet as it traverses through the layers of the protocol stack.

FIG. 4 illustrates a user data packet 410 (i.e. an IP datagram, Ethernet frame, or other packet) as it traverses through various layers. Example sizes and types of fields are described in this illustration. Those of skill in the art will recognize that various other sizes, types, and configurations are contemplated within the scope of the present invention.

As shown, the data packet 410 is segmented at the adaptation layer 310. Each adaptation sublayer PDU 430 carries one of these segments 420. In this example, data packet 410 is segmented into N segments 420A-N. An adaptation sublayer PDU 430 comprises a payload 434 containing the respective segment 420. A type field 432 (one byte in this example) is attached to the adaptation sublayer PDU 430.

At the Logical Link (LL) layer 330, a LL header 442 (4 bytes in this example) is attached to the payload 444, which comprises the adaptation layer PDU 430. Example information for LL header 442 includes a stream identifier, control information, and sequence numbers. A CRC 446 is computed over the header 442 and the payload 444, and appended to form a logical link sublayer PDU (LL PDU) 440. Logical Link Control (LLC) 338 and Radio Link Control (RLC) 340, described further below, form LLC PDUs and RLC PDUs in similar fashion. LL PDUs 440, as well as LLC PDUs and RLC PDUs, are placed in queues (i.e. high QoS queue 362, best effort queue 364, or control message queue 366) for service by MUX function 360.

The MUX function 360 attaches a MUX header 452 to each LL PDU 440. An example MUX header 452 may comprise a length and a type (the header 452 is two bytes in this example). A similar header may be formed for each control PDU (i.e. LLC and RLC PDUs). The LL PDU 440 (or LLC or RLC PDU) forms the payload 454. The header 452 and payload 454 form the MUX sublayer PDU (MPDU) 450 (MUX sublayer PDUs are also referred to herein as MUX PDUs).

Communication resources on the shared medium are allocated by the MAC protocol in a series of MAC frames. The MAC scheduler 376 determines the size of physical layer bursts allocated for one or more MAC IDs in each MAC frame, indicated as MAC frame f, where f indicates a particular MAC frame. Note that not every MAC ID with data to be transmitted will necessarily be allocated space in any particular MAC frame. Any access control or scheduling scheme may be deployed within the scope of the present invention. When an allocation is made for a MAC ID, the respective MUX function 360 for that MAC ID will form a MAC PDU 460, including one or more MUX PDUs 450 for inclusion in the MAC frame f. One or more MUX PDUs 460, for one or more allocated MAC IDs will be included in a MAC frame (i.e. MAC frame 500, detailed with respect to FIG. 5, below).

In an example embodiment, one aspect allows for a partial MPDU 450 to be transmitted, allowing for efficient packing in a MAC PDU 460. This aspect is detailed further below. In this example, the MUX function 360 maintains a count of the untransmitted bytes of any partial MPDUs 450 left over from a previous transmission, identified by partial MPDU 464. These bytes 464 will be transmitted ahead of any new PDUs 466 (i.e. LL PDUs or control PDUs) in the current frame. Header 462 (two bytes in this example) includes a MUX pointer, which points to the start of the first new MPDU (MPDU 466A in this example) to be transmitted in the current frame. Header 462 may also include a MAC address.

The MAC PDU 460 comprises the MUX pointer 462, a possible partial MUX PDU 464 at the start (left over from a previous allocation), followed by zero or more complete MUX PDUs 466A-N, and a possible partial MUX PDU 468 (from the current allocation) or other padding, to fill the allocated portion of the physical layer burst. The MAC PDU 460 is carried in the physical layer burst allocated to the MAC ID.

Common MAC. MAC Frame, and Transport Channels

Figure 5:
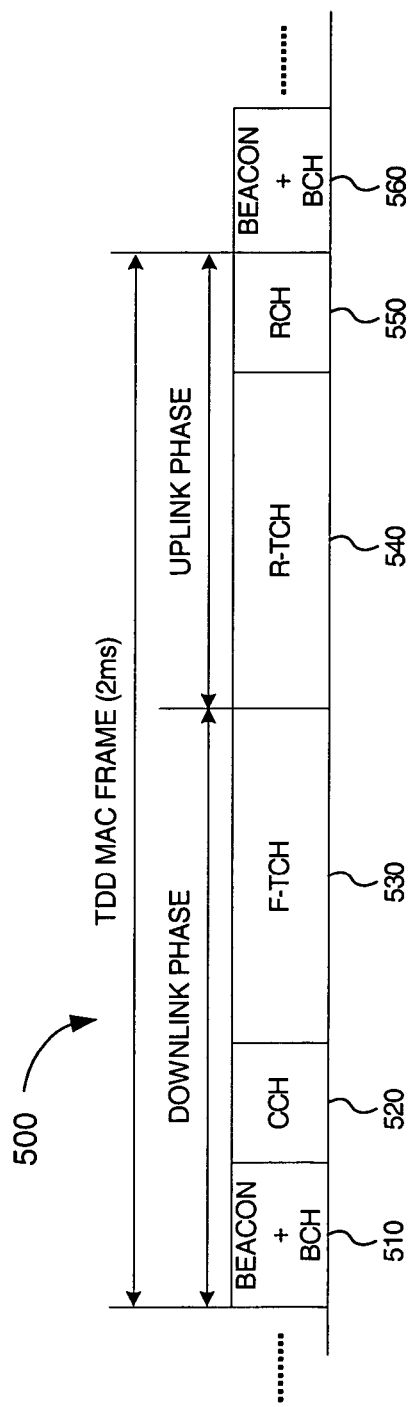
FIG. 5 illustrates an example MAC frame.

An example MAC frame 500 is illustrated in FIG. 5. The common MAC function 370 manages allocation of the MAC frame 500 among the following transport channel segments: broadcast, control, forward and reverse traffic (referred to as the downlink phase and uplink phase, respectively), and random access. MAC framing function 372 may form the frame using the various constituent components, described further below. Example functions, coding, and durations of the transport channels are described below.

In the example embodiment, a MAC frame is Time Division Duplexed (TDD) over a 2 ms time interval. MAC frame 500 is divided into five transport channel segments 510-550 that appear in the order shown. Alternate orders and differing frame sizes may be deployed in alternate embodiments. Durations of allocations on the MAC frame 500 may be quantized to some small common time interval. In an example embodiment, durations of allocations on the MAC frame are quantized in multiples of 800 ns (which is also the duration of the cyclic prefix for either the short or the long OFDM symbol, detailed further below). A short OFDM symbol is 4.0 μs or 5 times 800 ns.

The example MAC provides five transport channels within a MAC frame: (a) the Broadcast Channel (BCH) 510, which carries the Broadcast Control Channel (BCCH); (b) the Control Channel (CCH) 520, which carries the Frame Control Channel (FCCH) and the Random Access Feedback Channel (RFCH) on the forward link; (c) the Traffic Channel (TCH), which carries user data and control information, and is subdivided into (i) the Forward Traffic Channel (F-TCH) 530 on the forward link and (ii) the Reverse Traffic Channel (R-TCH) 540 on the reverse link; and (d) the Random Access Channel (RCH) 550, which carries the Access Request Channel (ARCH) (for UT access requests). A pilot beacon is transmitted as well in segment 510.

The downlink phase of frame 500 comprises segments 510-530. The uplink phase comprises segments 540-550. Segment 560 indicates the beginning of a subsequent MAC frame.

Broadcast Channel (BCH)

The Broadcast Channel (BCH) and beacon 510 is transmitted by the AP. The first portion of the BCH 510 contains common physical layer overhead, such as pilot signals, including timing and frequency acquisition pilot. In an example embodiment, the beacon consists of 2 short OFDM symbols used for frequency and timing acquisition by the UTs followed by 8 short OFDM symbols of common MIMO pilot used by the UTs to estimate the channel.

The second portion of the BCH 510 is the data portion. The BCH data portion defines the allocation of the MAC frame with respect to the transport channel segments: CCH 520, F-TCH 530, R-TCH 540 and RCH 550, and also defines the composition of the CCH with respect to subchannels. In this example, the BCH 510 defines the coverage of the wireless LAN 120, and so is transmitted in the most robust data transmission mode available. The length of the entire BCH is fixed. In an example embodiment, the BCH defines the coverage of a MIMO-WLAN, and is transmitted in Space Time Transmit Diversity (STTD) mode using rate 1/4 coded Binary Phase Shift Keying (BPSK). In this example, the length of the BCH is fixed at 10 short OFDM symbols.

Control Channel (CCH)

The Control Channel (CCH) 520, transmitted by the AP, defines the composition of the remainder of the MAC frame. Control channel function 374 of common MAC 370 generates the CCH. An example embodiment of a CCH is detailed further below. The CCH 520 is transmitted using highly robust transmission modes in multiple subchannels, each subchannel with a different data rate. The first subchannel is the most robust and is expected to be decodable by all the UTs. In an example embodiment, rate 1/4 coded BPSK is used for the first CCH sub-channel. Several other subchannels with decreasing robustness (and increasing efficiency) are also available. In an example embodiment, up to three additional sub-channels are used. Each UT attempts to decode all subchannels in order until a decoding fails. The CCH transport channel segment in each frame is of variable length, the length depending on the number of CCH messages in each subchannel. Acknowledgments for reverse link random access bursts are carried on the most robust (first) subchannel of the CCH.

The CCH contains assignments of physical layer bursts on the forward and reverse links. Assignments may be for transfer of data on the forward or reverse link. In general, a physical layer burst assignment comprises: (a) a MAC ID; (b) a value indicating the start time of the allocation within the frame (in the F-TCH or the R-TCH); (c) the length of the allocation; (d) the length of the dedicated physical layer overhead; (e) the transmission mode; and (f) the coding and modulation scheme to be used for the physical layer burst. A MAC ID identifies a single UT for unicast transmissions or a set of UTs for multicast transmissions. In the example embodiment, a unique broadcast MAC ID is also assigned for transmission to all the UTs. In an example embodiment, the physical layer overhead includes a dedicated MIMO pilot comprised of 0, 4, or 8 short OFDM symbols. In this example, the transmission mode is alternatively STTD or spatial multiplexing.

Other example types of assignments on the CCH include: an assignment on the reverse link for the transmission of a dedicated pilot from a UT, or an assignment on the reverse link for the transmission of buffer and link status information from a UT. The CCH may also define portions of the frame that are to be left unused. These unused portions of the frame may be used by UTs to make noise floor (and interference) estimates as well as to measure neighbor system beacons. An example embodiment of a control channel is detailed further below.

Random Access Channel (RCH)

The Random Access Channel (RCH) 550 is a reverse link channel on which a UT may transmit a random access burst. The variable length of the RCH is specified for each frame in the BCH. In an example embodiment, the random access bursts are transmitted using the principal eigenmode with rate 1/4 coded BPSK.

Two types of random access bursts are defined in the example embodiment. A long burst is used by UTs for initial access when the AP must detect the start of the access burst using a sliding correlator. Once a UT is registered with an AP, the two ends of the link complete a timing-adjust procedure. After the timing adjustment, the UT may transmit its random access burst synchronized with slot timing on the RCH. It may then use a short burst for random access. In an example embodiment, a long burst is 4 short OFDM symbols and a short burst is 2 short OFDM symbols.

Forward Traffic Channel (F-TCH)

The Forward Traffic Channel (F-TCH) 530 comprises one or more physical layer bursts transmitted from the AP 104. Each burst is directed to a particular MAC ID as indicated in the CCH assignment. Each burst comprises dedicated physical layer overhead, such as a pilot signal (if any) and a MAC PDU transmitted according to the transmission mode and coding and modulation scheme indicated in the CCH assignment. The F-TCH is of variable length. In an example embodiment, the dedicated physical layer overhead may include a dedicated MIMO pilot.

In an example embodiment, in the STTD mode there is one equivalent spatial diversity channel whose efficiency can vary between 12 bits (rate 1/2 coded BPSK on 48 tones) per short OFDM symbol and 1344 bits (rate 7/8 coded 256 QAM on 192 tones) per long OFDM symbol. This translates to a factor of 33 in the range of peak physical layer data rates (or 3-99 Mbps in this example).

In this example, a spatial multiplexing mode up to four parallel spatial channels may be used. Each spatial channel uses an appropriate coding and modulation scheme whose efficiency is between 12 bits per short OFDM symbol and 1344 bits per long OFDM symbol. Thus, the range of peak physical layer data rates in the spatial multiplexing mode is between 3 and 395 Mbps. Due to spatial processing constraints, not all parallel spatial channels may be able to operate at the highest efficiency, so a more practical limit on the peak physical layer data rate may be 240 Mbps, a factor of 80 between the lowest and highest rates in this example.

Reverse Traffic Channel (R-TCH)

The Reverse Traffic Channel (R-TCH) 540 comprises physical layer burst transmissions from one or more UTs 106. Each burst is transmitted by a particular UT as indicated in the CCH assignment. Each burst may comprise a dedicated pilot preamble (if any) and a MAC PDU transmitted according to the transmission mode and coding and modulation scheme indicated in the CCH assignment. The R-TCH is of variable length. In an example embodiment, as on the F-TCH, the range of data rates in the STTD mode is 3-98 Mbps and in the spatial multiplexing mode is 3-395 Mbps, with 240 Mbps being perhaps a more practical limit.

In the example embodiment, the F-TCH 530, the R-TCH 540, or both, may use spatial multiplexing or code division multiple access techniques to allow simultaneous transmission of MAC PDUs associated with different UTs. A field containing the MAC ID with which the MAC PDU is associated (i.e. the sender on the uplink, or the intended recipient on the downlink) may be included in the MAC PDU header. This may be used to resolve any addressing ambiguities that may arise when spatial multiplexing or CDMA are used. In alternate embodiments, when multiplexing is based strictly on time division techniques, the MAC ID is not required in the MAC PDU header, since the addressing information is included in the CCH message allocating a given time slot in the MAC frame to a specific MAC ID. Any combination of spatial multiplexing, code division multiplexing, time division multiplexing, and any other technique known in the art may be deployed.

Each active UT is assigned a MAC ID during initial registration. The MAC ID assignment is handled by the Association Control (AC) function 344 of the RLC 340. A unique MAC ID is allocated for broadcast transmissions on the forward link. The broadcast transmission is a part of the Forward Transport Channel (F-TCH) and is assigned using the Control Channel (CCH) through the use of the unique broadcast MAC ID. In this example, a system identification message is broadcast once every 16 frames using a broadcast MAC ID allocation. The broadcast MAC ID may also be used for user data broadcast.

A set of one or more MAC IDs may be allocated for multicast transmissions on the forward link. A multicast transmission is a part of the F-TCH and is assigned on the CCH through the use of a specific multicast MAC ID assigned to a particular multicast group. The assignment of a multicast MAC ID to a group of UTs is handled by the Association Control (AC) function 344 of the RLC 340.

Return now to the description of common MAC 370 depicted in FIG. 3. The random access control function 378 at the AP handles acknowledgments for access bursts from UTs. Along with the acknowledgment, the AP must make an immediate allocation on the R-TCH to obtain the buffer status information from the UT. This request is forwarded to the scheduler 376.

At the UT, a random access manager determines when to transmit an access burst based on the data in its MUX queues, as well as its existing allocation. When the UT has a periodic allocation due to an existing LL connection, the buffer status information may be provided using the existing R-TCH allocation.

Based on the information contained in buffer and link status messages received from the UT, the corresponding MUX function 360 at the AP updates the UT proxy. The UT proxy maintains status of the MUX function buffers at the UT, which are used by the scheduler 376 to make R-TCH allocations. The UT proxy also maintains the maximum rates at which the AP may transmit to the UT on the F-TCH.

The common MAC function 370 at the AP implements the scheduler 376 to arbitrate allocation between UTs while efficiently utilizing each MAC frame. To limit overhead, not all active UTs may be allocated a physical layer burst in each frame.

The following information may be used by the scheduler 376 for making an allocation in each MAC frame:

1. The nominal allocation to each MAC ID. It may be that only a subset of active UTs may be assigned a nominal allocation in any frame. For example, some UTs may be provided a nominal allocation only every other frame or every fourth frame, and so on. The nominal allocation is determined by the admission control function 384 in the layer manager 380. In an example embodiment, the nominal allocation is made in terms of a number of OFDM symbols.

2. Allocation for dedicated physical layer overhead such as pilot signals. The Radio Resource Control (RRC) 342 in the RLC 340 determines the required length and periodicity of the dedicated physical layer overhead. In an example embodiment, physical layer overhead includes a dedicated MIMO pilot.

3. Transmission mode and rate. This is determined by RRC 342 for R-TCH and provided to the scheduler 376. For the F-TCH, this information is obtained from the UT in the link and buffer status message and maintained at the UT Proxy.

4. Data backlog for each MAC ID. This information is available to the scheduler 376 from the MUX function 360 for each MAC ID for the forward link, and from the UT proxy for the reverse link.

In addition, the scheduler allocates the duration of the RCH and determines the duration of the CCH. Each assignment on the CCH is transmitted using one of four coding schemes (based on the channel quality to the UT). Hence, the duration of the CCH is a function of the number of assignments and the coding scheme used to transmit each assignment.

Based on the allocation determined by the scheduler, the MAC entity at the AP populates the parameters for each assignment to construct the BCH and the CCH. The BCH defines the allocation of the MAC frame in terms of the transport channel segments: CCH, F-TCH, R-TCH and RCH, and also defines the composition of the CCH in terms of subchannels (or sub-segments), as described above with respect to FIG. 5. An example CCH is detailed below.

In an example embodiment, each assignment on the CCH is transmitted in one of up to four subchannels (or sub-segments) each using a different coding and modulation scheme (based on the channel quality to the UT). Multicast and broadcast assignments are transmitted using the most robust coding scheme (first subchannel or sub-segment). The MAC entity at the UT reads the CCH to determine its allocation on the forward and reverse link for that frame.

At the transmitter, the MAC function transmits the MAC PDU associated with a particular MAC ID on the physical layer burst allocated on the F-TCH (at the AP) or the R-TCH (at the UT) to that MAC ID. At the receiver, the MAC function extracts the MAC PDU corresponding to a MAC ID based on the CCH assignment and passes it to the MUX function for that MAC ID.

MUX

The MUX function 360 is detailed further below with respect to FIGS. 19-23. At the receiver, the MUX function extracts the PDUs from the byte stream consisting of consecutive MAC PDUs and routes them to the LL, LLC, or RLC entity to which it belongs. The routing is based on the type (logical channel) field included in the MUX PDU header.

Radio Link Control (RLC)

During system initialization, the broadcast Radio Link Control (RLC) 340 function consisting of the system identification control function 346 is initialized. When a UT initially accesses the system using a MAC ID from the access pool, the RLC function assigns a new unicast MAC ID to the UT. Subsequently, if the UT joins a multicast group, it may be allocated additional multicast MAC IDs.

When a new unicast MAC ID is assigned to a UT, the RLC initializes one instance of each of the functions: Association Control (AC) 344, Radio Resource Control (RRC) 342 and Logical Link Control (LLC) 338. When a new multicast MAC ID is assigned, the RLC initializes a new AC instance and the LLC for the LL multicast mode.

In the example embodiment, a system identification parameters message is transmitted by the AP once every 16 MAC frames using the broadcast MAC ID. The system identification parameters message contains network and AP IDs as well as protocol revision numbers. In addition, it contains a list of access MAC IDs for use by UTs for initial access to the system.

The AC function 344 (a) provides UT authentication; (b) manages registration (attach/detach) functions for the UT (in the case of a multicast MAC ID, the AC function manages attach/detach to the multicast group); and (c) key exchange for encryption for LL.

One RRC instance 342 is initialized at each UT. One RRC instance per active UT is initialized at the AP. The RRC functions at the AP and UT may share forward and reverse link channel measurements (if necessary).

The RRC (a) manages calibration of the transmit and receive chains at the AP and UT (this calibration may be required for the spatial multiplexing transmission mode); (b) determines transmission mode and rate control for transmissions to a UT and provides it to the MAC scheduler 376; (c) determines the periodicity and length of the dedicated physical layer overhead, such as a dedicated pilot required on physical layer burst transmissions on the R-TCH, and on the F-TCH; (d) manages power control for transmissions to and from a UT and provides it to the PHY Manager, and (e) determines timing adjustment for R-TCH transmissions from the UT.

Logical Link (LL)

Adaptation Layer PDUs consisting of user data segments are provided to the DLC layer 320 along with the associated MAC ID, LL mode and stream ID, if any. The LL mode function 330 adds a LL header and a 3-byte CRC computed over the entire LL PDU. There are several modes supported in the example embodiment. Acknowledged 336 and unacknowledged 334 functions may be deployed. Transparent broadcast/multicast/unicast function 332 may also be deployed. The following are four LL modes for illustration (details of their formats within MUX PDUs is detailed in FIG. 23):

1. Connectionless Unacknowledged Mode (Mode 0). The LL header for this case is null. This mode may be used for transparent forwarding of adaptation layer PDUs. The LL Mode 0 may implement policing. Only the connectionless unacknowledged (transparent) mode is available for broadcast and multicast MAC IDs.

2. Connectionless Acknowledged Mode (Mode 1). This mode is used for acknowledged transmission of Adaptation Layer PDUs without the need for the overhead and delay associated with a LL Mode 3 connection establishment. The LL Mode 1 header contains a sequence number of the transmitted LL PDU or the sequence number of the PDU being acknowledged. Since the physical layer channels are expected to operate with a low probability of random LL PDU loss and with a low round-trip delay, a simple Go-Back-N ARQ scheme is used.

3. Connection-Oriented Unacknowledged Mode (Mode 2). The LL connection-oriented unacknowledged mode permits multiplexing of several flows through the use of a stream ID. The LL Mode 2 may implement policing per stream ID. The LL Mode 2 header contains the stream ID and a 12-bit sequence number.

4. Connection-Oriented Acknowledged Mode (Mode 3). The LL connection-oriented acknowledged mode permits multiplexing of several flows through the use of a stream ID. The LL Mode 3 may implement policing per stream ID. The LL Mode 3 header consists of a stream ID to identify multiple flows being transported over the reliable connection. A 12-bit sequence number identifies the LL PDU and an ACK field indicates the highest received sequence number being acknowledged. As discussed for LL Mode 1, since the physical layer channels are expected to operate with a low probability of random LL PDU loss and with a low round-trip delay, a simple Go-Back-N ARQ scheme is used. However, a selective-repeat ARQ scheme may also be used.

The Logical Link Control (LLC) function 338 manages logical link mode control. When a new LL mode is to be established, the LLC function provides mode negotiation including: (a) QoS: guaranteed rate; (b) mode set-up; (c)

mode teardown; (e) mode reset; and (f) assignment of stream IDs in LL modes 2 and 3. The mapping of an end-to-end flow to a LL mode is determined by the QoS manager function 382 in the layer manager 380. The request for initializing a new LL mode or adding a stream to an existing LL mode comes from the adaptation layer 310, as described above.

System Configuration Control 350 manages the configuration of the TDD MAC Frame, including the contents of the Beacon and BCH and the length of the RCH.

Layer Manager

The QoS manager 382 interprets network QoS protocols, including RSVP and RTCP. When QoS is based on flow classification of IP headers, the QoS manager determines which flow classifiers (i.e., IP source and destination addresses, IP source and destination ports) to use for identification of flows corresponding to different services. The QoS Manager assists the adaptation layer by mapping flows to LL modes.

The admission control function 384 receives requests from the LLC for admitting new flows with rate requirements. The admission control function maintains a database of admitted nominal allocations and a set of rules and thresholds. Based on the thresholds and rules, admission control determines if a flow may be admitted, determines the nominal allocation for the flow (in terms of the amount of transmission time allocated every m MAC frames), and provides this information to the scheduler in the common MAC.

The physical layer manager uses physical layer measurements collected at the AP and UT to control transmitter and receiver parameters at the physical layer. The remote measurements may be obtained through RRC messages.

Illustrative Procedures

Based on the layer entities just described, several procedures may be used to describe the operation of the WLAN 120. These procedures are not exhaustive, but serve to illustrate various functions and components described herein.

Figure 6:
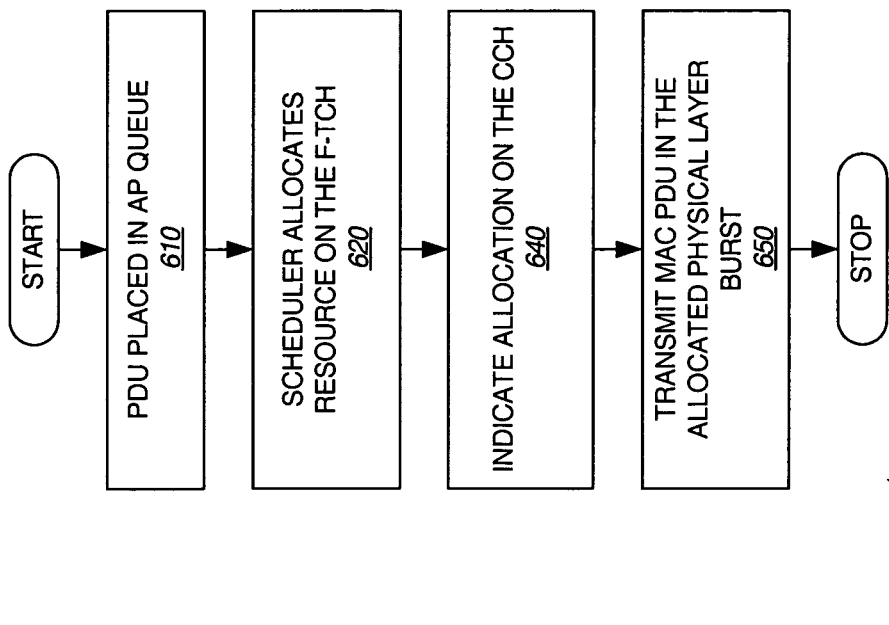
FIG. 6 depicts an example method for transmitting a forward link message transfer.

FIG. 6 depicts an example method 600 for transmitting a forward link message transfer from the AP. In block 610, the RLC function (association control, radio resource control or logical link control) at the AP places a message (RLC PDU) in the control message queue. Or the LL mode at the AP places an LL PDU in the high QoS or best effort queue.

In block 620, the scheduler allocates resource on the F-TCH for transmission of the PDUs in the three MUX queues. In block 640, the assignment is indicated on the CCH by the MAC. In block 650, the MAC at the AP transmits the message in a MAC PDU in the allocated physical layer burst.

Figure 7:
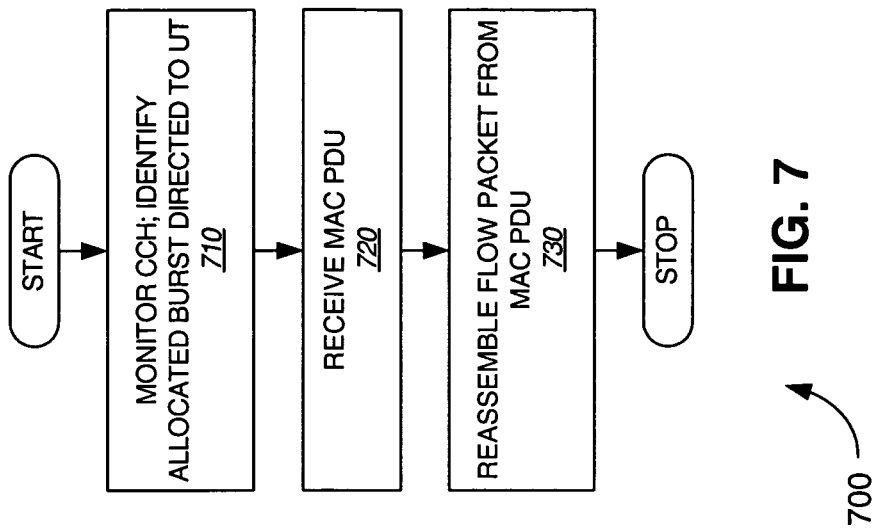
FIG. 7 depicts an example method for receiving a forward link message transfer.

FIG. 7 depicts an example method 700 for receiving a forward link message transfer at a UT. In block 710, the UT monitors the CCH. The UT identifies an allocated burst directed to the UT. In block 720, the UT retrieves the MAC PDU as identified in the CCH. In block 730, the UT reassembles the flow packet comprising segments retrieved in MAC PDUs and processed in the MAC processor.

Figure 8:
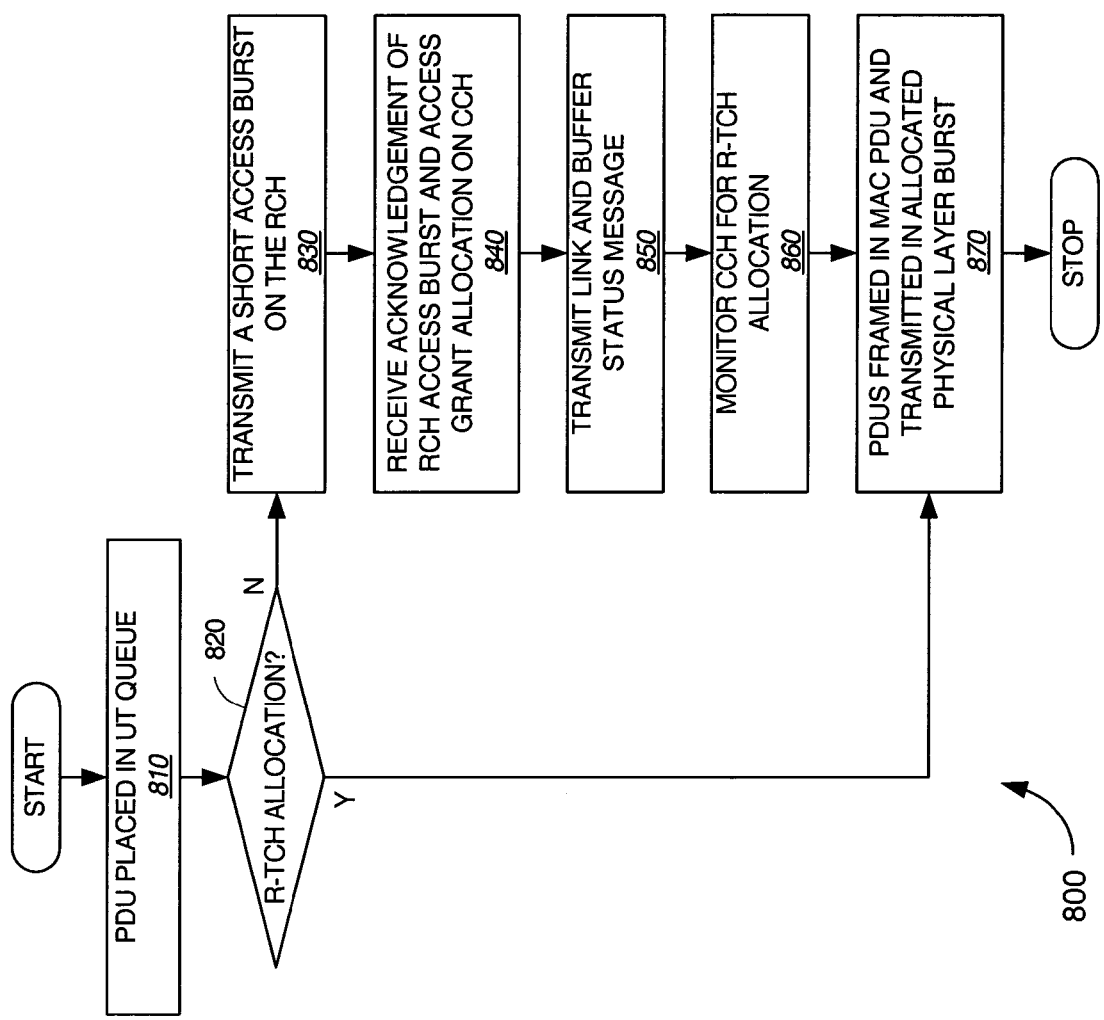
FIG. 8 depicts an example method for transmitting a reverse link message transfer.

FIG. 8 depicts an example method 800 for transmitting a reverse link message transfer from a UT. In block 810, the RLC function (association control, radio resource control or logical link control) at the UT places a message (RLC PDU) in the Control Message queue. Or the LL mode at the UT places an LL PDU in the high QoS or best effort queue. In decision block 820, if the UT has an existing R-TCH allocation, proceed to block 870. If not, proceed to block 830.

In block 830, the UT transmits a short access burst on the RCH. In block 840, the UT receives an acknowledgment of the RCH access burst and access grant allocation on the CCH. In block 850, the UT transmits a link and buffer status message to the AP. In block 860, the UT monitors the CCH for an R-TCH grant allocation. In block 870, an allocation is received (or was already present in decision block 820). The UT frames the MUX PDUs into a MAC PDU and transmits the MAC PDU in the allocated physical layer burst.

Figure 9:
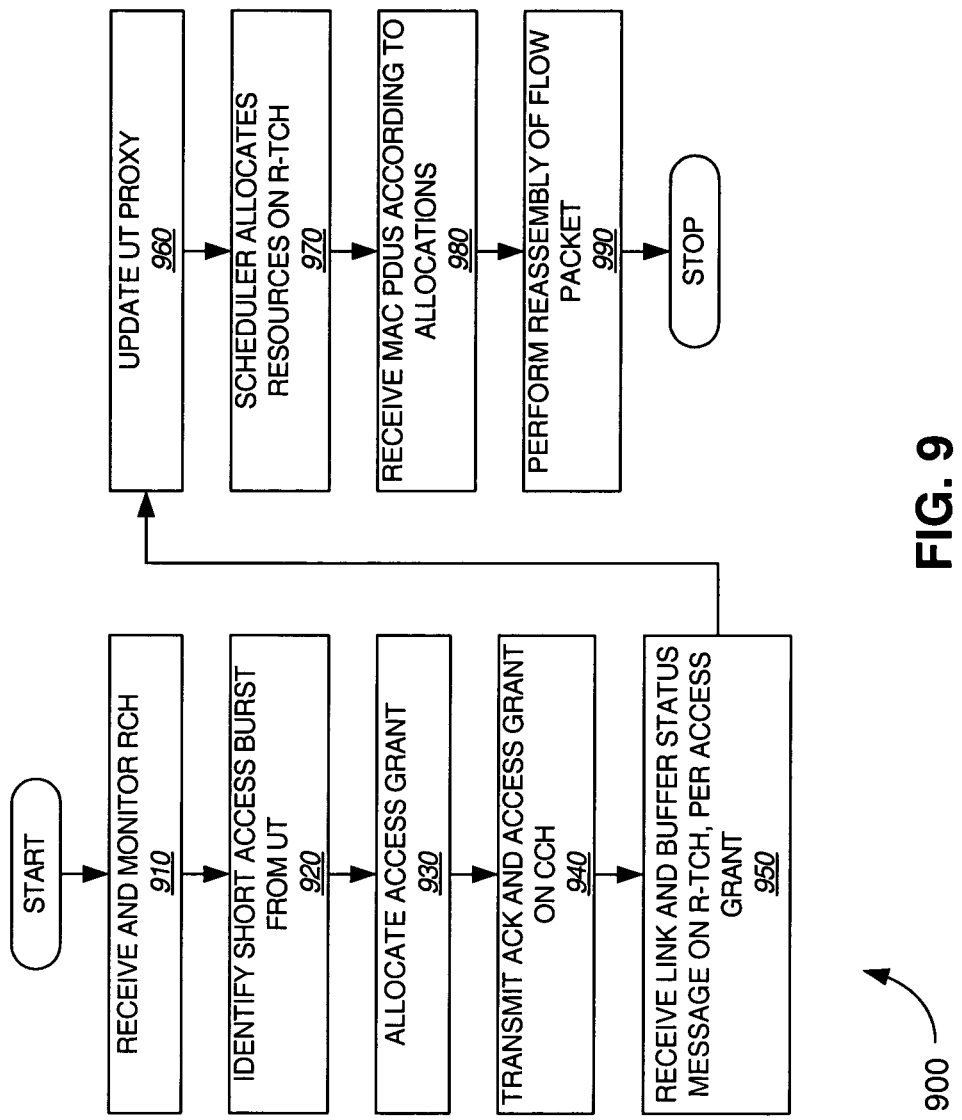
FIG. 9 depicts an example method for receiving a reverse link message transfer.

FIG. 9 depicts an example method 900 for receiving a reverse link message transfer at the AP. In block 910, the AP receives and monitors the RCH. In block 920, the AP identifies a short access burst from a UT. In block 930, the scheduler allocates an access grant. In block 940, the AP transmits the acknowledgment and the access grant on the CCH. In block 950, in response to the access grant, the AP receives the link and buffer status message on the R-TCH. In block 960, the AP updates the UT proxy with the buffer status. The scheduler has access to this information. In block 970, the scheduler allocates resources on the R-TCH. In block 980, the AP receives MAC PDUs according to allocations made. In block 990, the AP performs reassembly of a flow packet in response to one or more received MAC PDUs.

Figure 10:
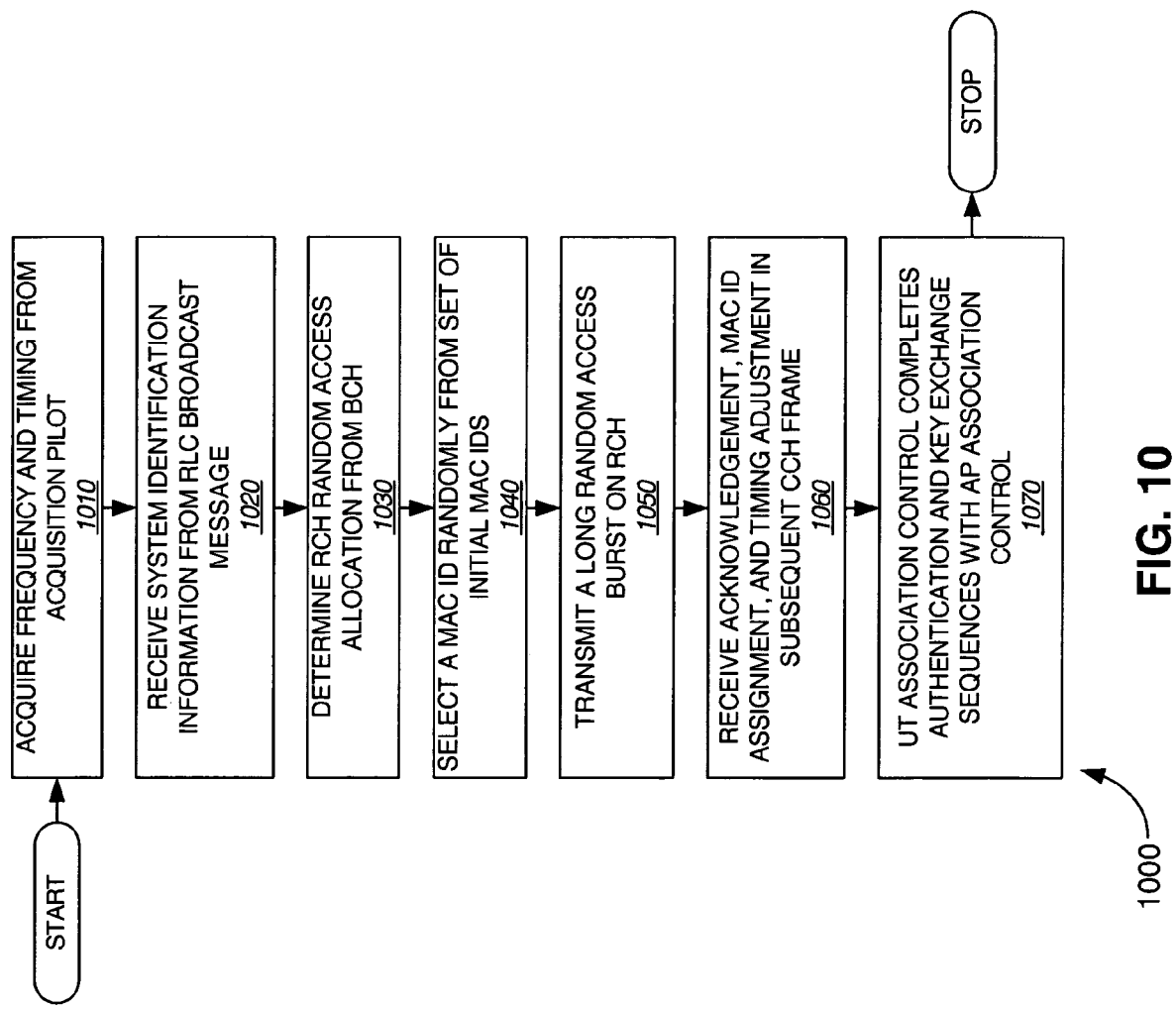
FIG. 10 depicts an example method for performing initial access and registration at a UT.

FIG. 10 depicts an example method 1000 for performing initial access and registration at a UT. In block 1010, the UT acquires frequency and timing from the frequency acquisition pilot on the BCH. In block 1020, the UT receives system identification information from the RLC broadcast message. In block 1030, the UT determines the RCH allocation for (unslotted) random access using long bursts from the BCH. In block 1040, the UT selects a MAC ID randomly from the set of initial MAC IDs. In block 1050, the UT transmits a long random access burst on the RCH using the initial MAC ID. In block 1060, the UT receives an acknowledgement, a MAC ID assignment, and a timing adjustment in the subsequent MAC frame. In block 1070, the UT association control function competes authentication and key exchange sequences with the AP association control function. Control message transmissions on the forward and reverse link follow the low-level message transfer procedures described above with respect to FIGS. 6-9.

Figure 11:
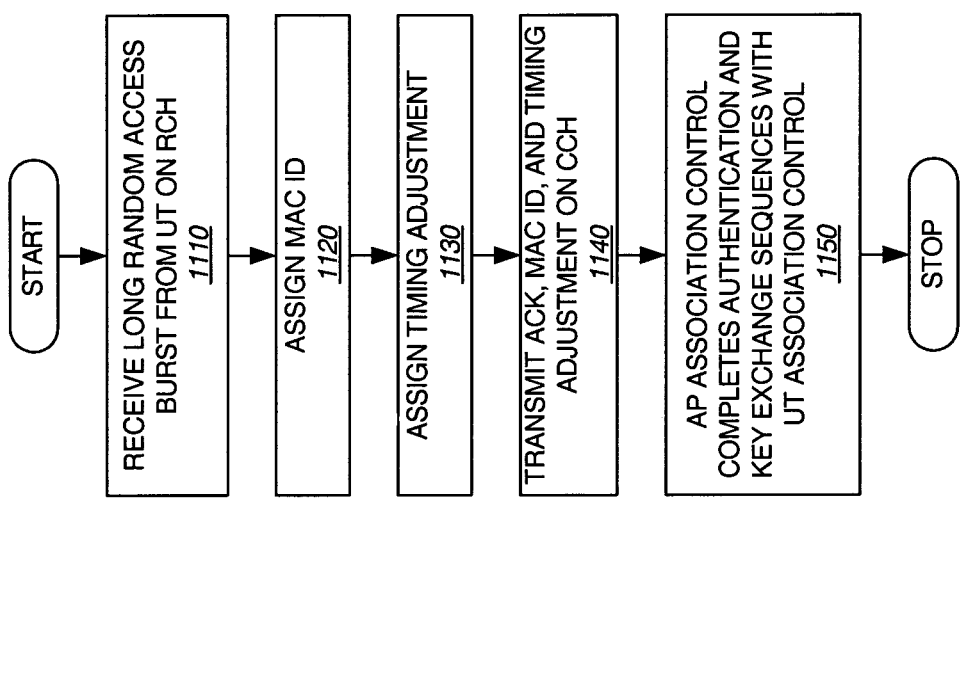
FIG. 11 depicts an example method for performing initial access and registration at the AP.

FIG. 11 depicts an example method 1100 for performing initial access and registration at the AP. In block 1110, the AP receives a long random access burst from the UT on the RCH. In block 1120, the AP assigns the UT a MAC ID. The MAC ID pool is managed by the radio link control function. In block 1130, the AP assigns the UT a timing adjustment. In block 1140, the AP transmits an acknowledgement, the MAC ID, and the timing adjustment on the CCH. In block 1150, the AP association control function competes authentication and key exchange sequences with the UT association control function. Control message transmissions on the forward and reverse link follow the low-level message transfer procedures described above with respect to FIGS. 6-9.

Figure 12:
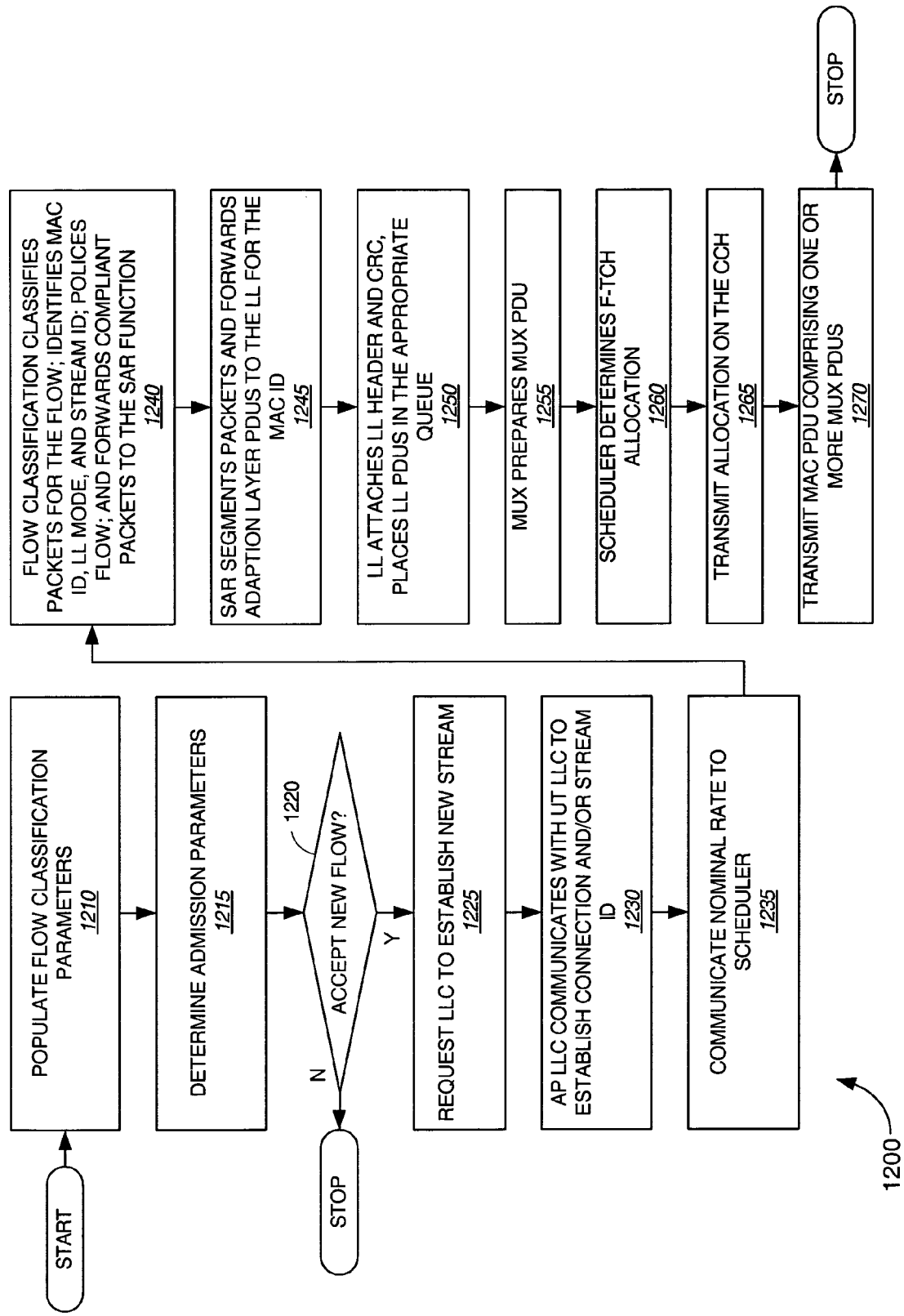
FIG. 12 depicts an example method 1200 for user data flow at the AP.

FIG. 12 depicts an example method 1200 for user data flow at the AP. In block 1210, the QoS manager in the layer manager populates the flow classification parameters in the flow classification function. A specific combination of parameters and values may indicate the arrival of a new flow. These parameters may include: IP DiffServ Code Point (DSCP) or IP source address or IP port. Ethernet parameters may include: 802.1Q VLAN ID, or the 802.1p priority indication. Specific IP port values may indicate a control protocol message (e.g., RSVP or RTCP), which is to be forwarded to the QoS manager.

In block 1215, the AP determines admission parameters. When a packet arrives at the AP adaptation layer and is determined by flow classification to be a new flow, flow classification works with the QoS manager to determine admission parameters, including QoS class (high QoS or best effort), LL mode, and nominal rate to be allocated for the flow. In decision block 1220, based on the admission parameters, admission control in the layer manager determines if the flow can be admitted. If not, the process may stop. Otherwise, proceed to block 1225.

In block 1225, flow classification requests LLC to establish a new stream. In this discussion, consider the case of a high QoS, LL mode 3 connection. In block 1230, the LLC at the AP communicates with the LLC at the UT to establish the connection (or a new stream ID if the proper connection already exists). In this example, the LLCs will attempt to establish a LL mode 3 connection (or a new stream ID if an LL mode 3 connection already exists). In block 1235, the nominal rate allocated for the flow is communicated to the scheduler. In the case of LL mode 3, a nominal allocation is made on both the forward and reverse channels.

In block 1240, flow classification classifies packets for the flow, identifies the MAC ID, LL mode and stream ID, does flow policing, and forwards compliant packets to the SAR function. In block 1245, the SAR segments packets and forwards adaptation layer PDUs to the LL function for the MAC ID along with LL mode and stream ID. In block 1250, the LL function attaches the LL header and CRC, and places LL PDUs in the appropriate queue. In this example, the LL mode 3 function attaches the LL header and CRC and places the LL PDUs in the high QoS queue of the MUX.

In block 1255, the MUX prepares the MUX PDU by attaching a MUX header identifying the LL mode and length. The MUX creates a MUX Pointer indicating the number of bytes to the start of the first new MUX PDU.

In block 1260, the scheduler determines the F-TCH (physical layer burst) allocation for the MAC ID. The scheduler knows the transmission mode (from RRC) and rate to be used (from the UT Proxy). Note that a reverse link allocation may also be included. In block 1265, the allocation is transmitted on the CCH.

In block 1270, the MAC transmits the MAC PDU. The MAC PDU consists of the MUX Pointer, followed by a possible partial MUX PDU at the start, followed by zero or more complete MUX PDUs, and finally, a possible partial MUX PDU at the end of the physical layer burst.

Figure 13:
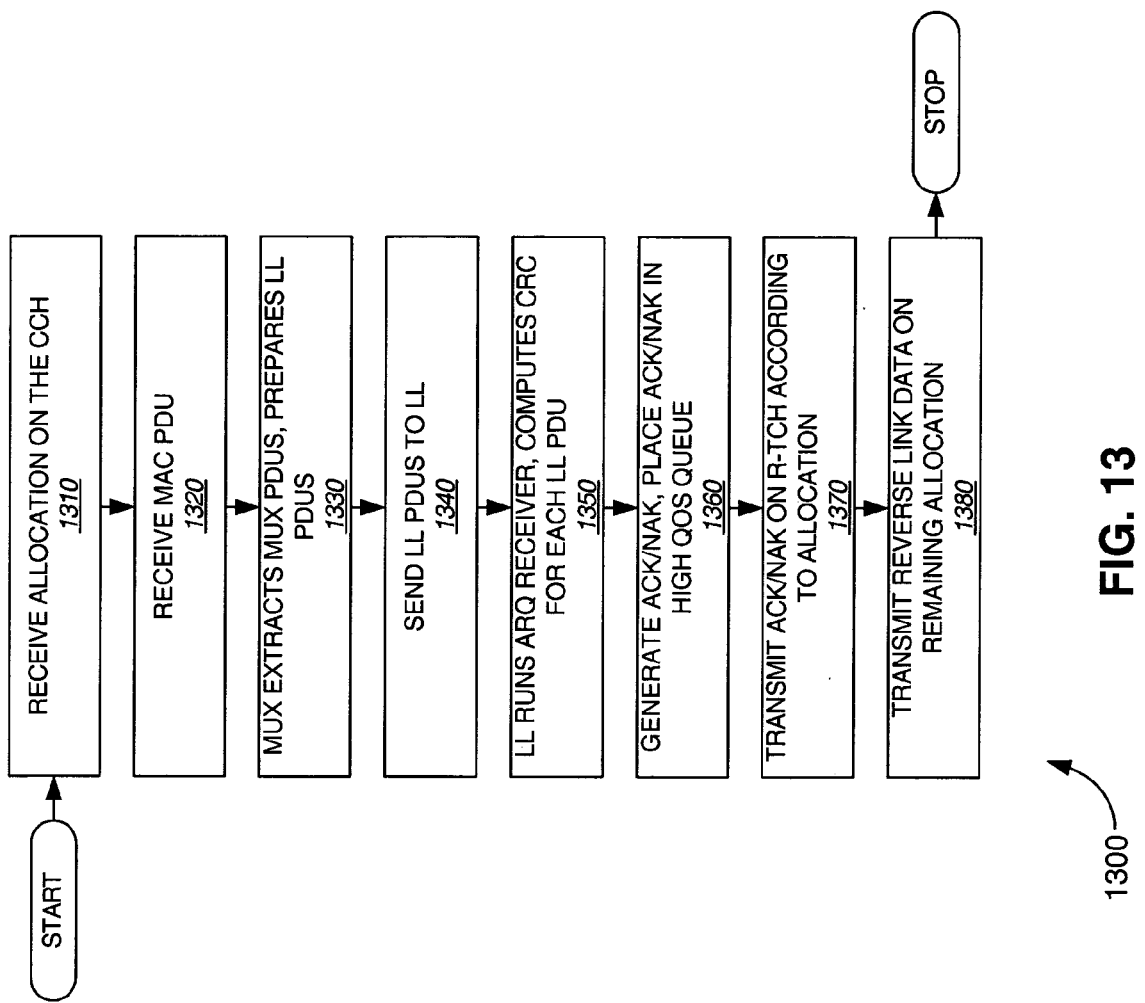
FIG. 13 depicts an example method 1300 for user data flow at the UT.

FIG. 13 depicts an example method 1300 for user data flow at the UT. In block 1310, the UT receives the allocation on the CCH. In block 1320, the UT receives the MAC PDU in accordance with the allocation. In block 1330, the MUX at the UT extracts the MUX PDUs by using the MUX pointer and the length field in the MUX header, and prepares the LL PDUs. In block 1340, based on the type field in the MUX header, MUX sends the LL PDUs to the appropriate LL function, LL mode 3 in this example. In block 1350, LL mode 3 runs the ARQ receiver and computes a CRC for each LL PDU. In block 1360, the LL Mode 3 at the UT must transmit ACK/NAK to the LL Mode 3 ARQ at the AP. The ACK/NAK is placed in the high QoS queue at the UT MUX. Note that other LL modes may not include acknowledgement, as described above.

In block 1370, the AP transmits the ACK/NAK on R-TCH according to the allocation. Recall that the scheduler allocates R-TCH resource for the MAC ID based on the nominal allocation for the reverse link. The ACK/NAK message is transmitted in a MAC PDU on the reverse link physical layer burst from the UT. In block 1380, the UT may transmit any other queued reverse link data in the remaining allocation.

Returning again to FIG. 3, as described above, flows 260 are received at an AP MAC processor 220, and respective data and signaling traverse down through the adaptation layer 310, the data link control layer 320, and the physical layer for transmission to a UT. The physical layer 240 at the UT receives the MAC PDUs and the respective data and signaling traverses up through the data link control layer 320 and adaptation layer 310 in the UT MAC processor 220, the reassembled flows for delivery to one or more higher level layers (i.e. to various processes, including data, voice, video, etc.). A similar process happens in reverse for flows originating at the UT and transmitted to the AP.

In both the AP and UT, the respective layer manager 380 may be deployed to control how information flows up and down the various MAC sublayers. Broadly stated, any type of feedback 280 from physical layer 240 may be used in layer manager 380 for performing various sublayer functions. Physical layer manager 386 interfaces the physical layer 240. The feedback is made available to any function in the layer manager; examples include an admission control function 384 and a QoS manager 382. These functions, in turn, may interact with any of the sublayer functions described above.

The principles described herein may be deployed with any physical layer specification supporting multiple transmission formats. For example, many physical layer formats allow for multiple transmission rates. The throughput for any given physical link may be determined by the power available, the interference on the channel, the supportable modulation format, and the like. Example systems include OFDM and CDMA systems, which may employ MIMO techniques. In these systems, closed loop techniques are used to determine rates and formats. The closed loop may employ various messages or signals to indicate channel measurements, supportable rates, etc. Those of skill in the art will readily adapt these and other systems to deploy the techniques described herein.

Figure 14:
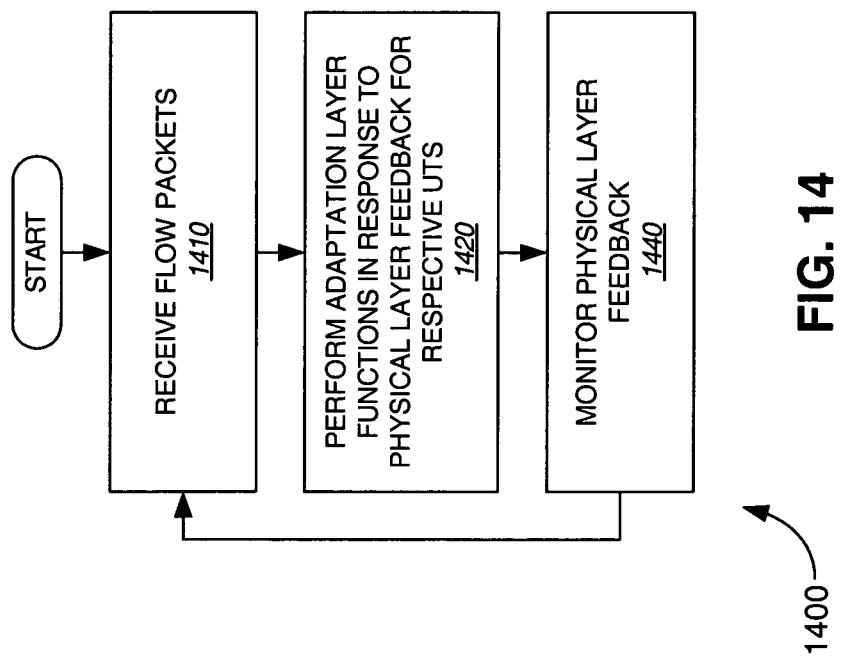
FIG. 14 depicts an example method for incorporating physical layer feedback into adaptation layer functions.

Physical layer feedback may be used in the adaptation layer 310. For example, rate information may be used in segmentation and reassembly, flow classification, and multicast mapping. FIG. 14 depicts an example method 1400 for incorporating physical layer feedback into adaptation layer functions. This method is described with respect to an access point, but is applicable in analogous fashion with a user terminal. The process starts in block 1410, where flow packets are received for transmission to one or more user terminals. In block 1420, adaptation layer functions are performed in response to physical layer feedback for the respective user terminals. To illustrate this aspect further, example multicast mapping and segmentation embodiments are detailed below. In block 1440, physical layer feedback is monitored for one or more user terminals. The process may return to block 1410 to repeat for additional received flow packets, in response to the updated physical layer feedback.

In an alternate embodiment, rate information of other physical layer feedback may be used in making admission control decisions. For example, a high QoS flow may not be given admission unless the target MAC ID physical link is capable of supporting a transmission rate of a sufficient efficiency level. This level may be adapted based upon the loading of the system, including the nominal allocations to existing flows, number of registered UTs, and the like. For example, a UT with a relatively high quality link may be more likely to be allocated a high QoS flow than a MAC ID associated with a lower quality link. When the system is lightly loaded, the threshold requirement may be reduced.

Adaptation Layer Multicast

Figure 15:
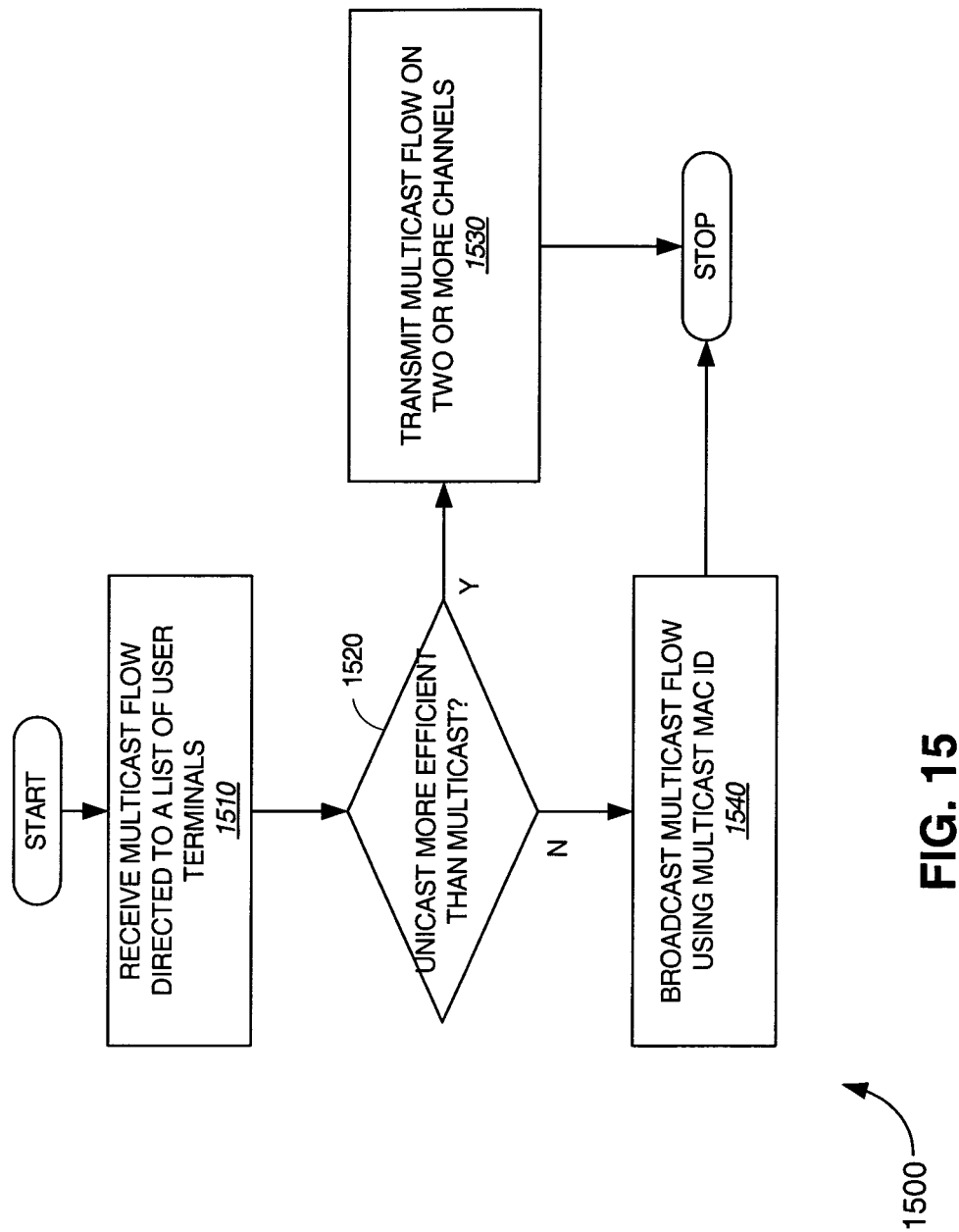
FIG. 15 depicts an example method for performing adaptation layer multicast.

FIG. 15 depicts example method 1500 for performing adaptation layer multicast. Adaptation layer multicast is an example of a method 1400 for incorporating physical layer feedback into an adaptation layer function. Recall that one method of multicast transmission, MAC layer multicast, provides a common MAC ID corresponding to a list of user terminals, the common or multicast MAC ID distinguished from any of the user terminal MAC IDs. Thus, a UT, when assigned to one or more multicast groups, will monitor the CCH for transmissions directed not only to its individual MAC ID, but also those directed to one or more multicast MAC IDs with which the UT is associated. Thus, a multicast MAC ID may be associated with one or more higher layer flows, to allow transmission of a single flow to multiple user terminals.

In adaptation layer multicast, rather than perform a single transmission for reception by all the user terminals in a multicast list, one or more additional transmissions of the multicast data may be made to one or more of the user terminals. In embodiment, adaptation layer multicast makes a unicast transmission to each user terminal in the multicast group. In an alternate embodiment, adaptation layer multicast may make one or more MAC layer multicast transmissions using one or more MAC IDs associated with subsets of the multicast groups. Unicast transmissions may be directed to user terminals not included in one of the subgroups. Any combination of the above may be deployed. In block 1510, a multicast flow directed to a list of user terminals is received. In one embodiment, a MAC ID is associated with the list of user terminals.

In decision block 1520, a determination is made whether unicast transmission is more efficient than multicast transmission (i.e. a single transmission received by multiple users) to the user terminals in the list. If so, in block 1530, the multicast flow is transmitted on two or more channels. The two or more channels may include unicast channels, other multicast channels, or a combination of both. In decision block 1520, if a multicast channel is more efficient, then the multicast data is broadcast to the members of the multicast group with a single transmission using the multicast MAC ID.

Generally, a multicast transmission must use a format suitable for transmission on the weakest physical link in the group of physical links of user terminals in the multicast group. In some systems, the fact that a better situated user terminal could benefit from a higher rate and greater throughput does not effect system throughput, since the lowest common denominator transmission must be made nonetheless to reach the user terminal with the lowest quality physical link. In other situations, however, this may not hold true. Consider, for example, the use of spatial processing in a MIMO system. The members of a multicast group may be distributed throughout the coverage area, and two or more members may have very different channel characteristics. Consider an illustrative example of a multicast group comprising two user terminals. By tailoring the transmission format for each user terminal, a high throughput may be accomplished for unicast transmission to each. However, since the two channel environments for each physical link are quite different, the transmission format suitable to reach each user terminal with a single multicast message may be lower throughput than either of the unicast channels. When the difference between the multicast channel and unicast channel throughput is great enough, the system may use fewer resources by making two independent transmissions of the multicast data than by transmitting a single message receivable by both.

Figure 16:
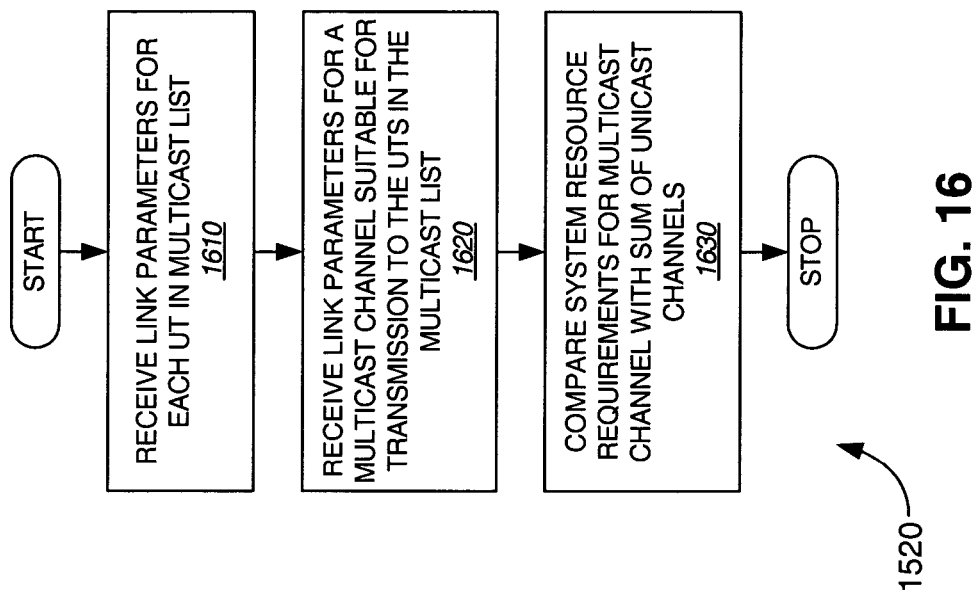
FIG. 16 illustrates an example method for determining whether to use adaptation layer multicast or MAC layer multicast.

FIG. 16 illustrates an example method suitable for deployment in decision block 1520, for determining whether to use adaptation layer multicast or MAC layer multicast. In block 1610, receive link parameters for each user terminal in the multicast list. In one embodiment, a rate parameter may be used. In block 1620, receive link parameters for a multicast channel suitable for transmission to the user terminals in the multicast list. The link parameters for the multicast channel may be different than the link parameters for any and all of the individual channels for the user terminals in the multicast group. In block 1630, compare the system resource requirements for transmission on the multicast channel (i.e., using the multicast MAC ID for a single transmission) with the system resource requirements for the sum of individual unicast transmissions. The lowest system resource requirement may be used to determine the more efficient selection.

In an alternate embodiment, block 1610 may be modified to include link parameters MAC layer multicast channels comprising subgroups of the multicast group user terminals. A combination of multicast and unicast may be compared with pure MAC layer multicast. These and other modifications will be apparent to one of ordinary skill in the art.

Physical Layer Feedback Segmentation

Figure 17:
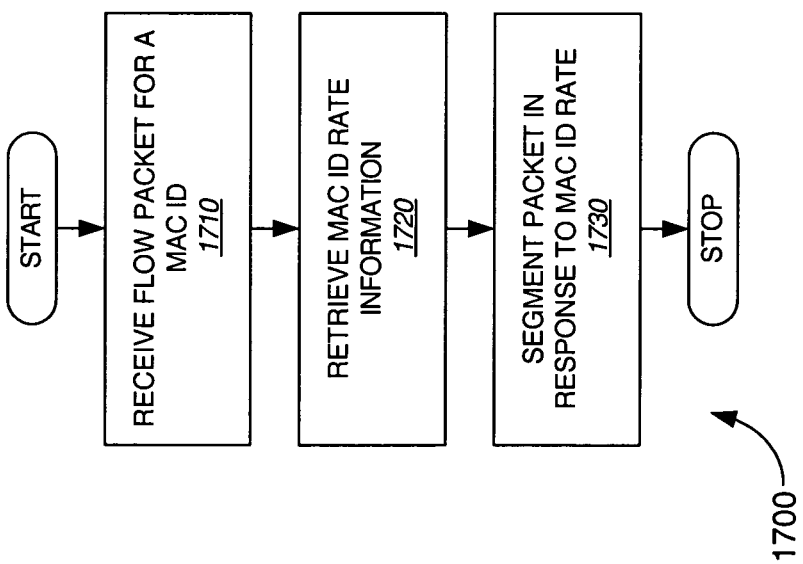
FIG. 17 depicts an example method for performing segmentation in response to physical layer feedback.

FIG. 17 depicts example method 1700 for performing segmentation in response to physical layer feedback. This serves as another example of a method 1400 for incorporating physical layer feedback into an adaptation layer function. This process may be carried out in segmentation and reassembly function 312 in adaptation layer 310, in response to physical layer feedback provided by layer manager 380.

In block 1710, a packet for a flow is received for transmission to a corresponding MAC ID. In block 1720, retrieve the transmission rate information for the respective MAC ID. In block 1730, segment the packet in response to the MAC ID rate. In an example embodiment, this segmentation produces segments 420 which are used to produce adaptation sublayer PDUs 430, as described above with respect to FIG. 4.

Figure 18:
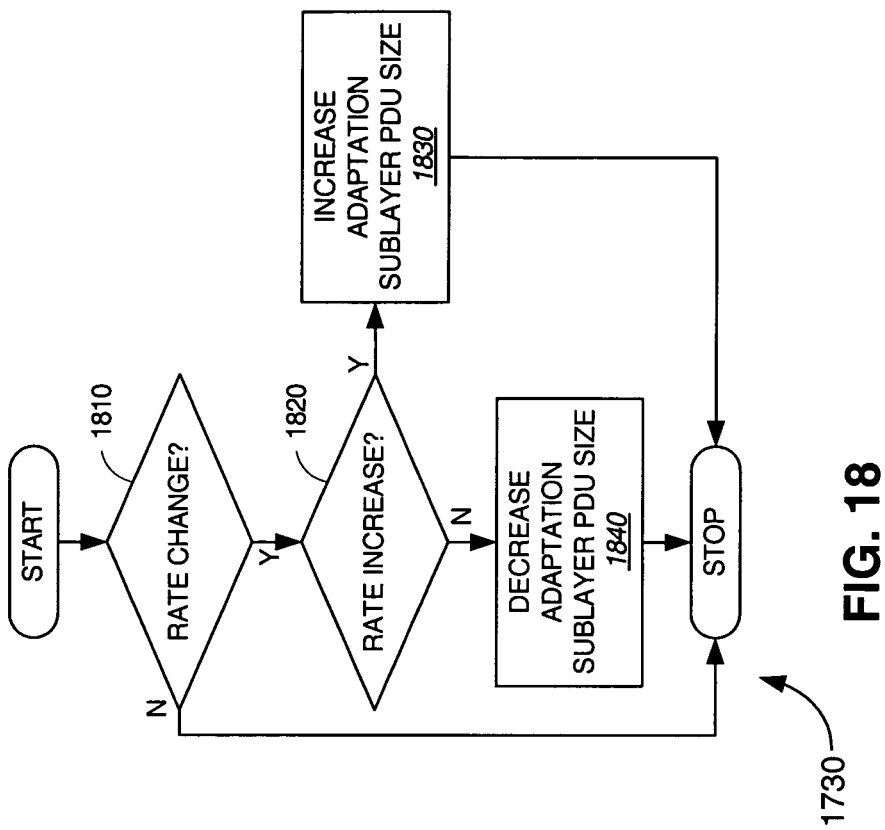
FIG. 18 illustrates segmenting in response to a transmission rate.

FIG. 18 depicts an example embodiment of a method illustrating segmenting in response to a transmission rate. This method is suitable for deployment within block 1730, just described. The process starts in decision block 1810. If there has been a rate change, proceed to decision block 1820. If there has not been a rate change, the process may stop, and the segmentation size may remain unchanged.

In decision block 1820, if the rate change was a rate increase, then there may be gains associated with increasing the segment size. For example, as shown above in FIG. 4, each segment receives layers of overhead as it traverses the protocol stack. Reducing the number of segments reduces the amount of overhead required. Furthermore, a higher rate generally indicates a higher quality channel. It may be that, while channels may change over time, even quite dramatically, on average a channel remains relatively constant for a certain segment of time. An increase in rate with a corresponding increase in segment size may allow for transmission of a segment in approximately the same amount of time as a smaller segment with a smaller rate. If this amount of time is proportionate to the time a channel tends to remain relatively stable (i.e., the supportable rate hasn't changed), then increasing the segment size may allow for increased efficiency with negative effects of the segment size increase unlikely.

Another consideration for selecting a segment size is when a change in physical layer rate has occurred. The rate change may trigger the need to change the segment size, so that the delay constraint of the service with the shortest delay constraint requirements, or the control message queue, is satisfied by non-preemptive priority in the MUX function, detailed further below with respect to FIGS. 19-23.

Various techniques for selecting segment size may be incorporated within the scope of the present invention. Returning to FIG. 18, in the example embodiment, when a rate change occurs in decision block 1820, proceed to block 1830 to increase the adaptation sublayer PDU size. In decision block 1820, if the rate change was a rate decrease, proceed to block 1840 to decrease the adaptation sublayer PDU size, according to any of the techniques just discussed.

The method of FIG. 18 serves mainly to illustrate one possible mechanism for segmentation using a relationship between physical layer rate and segmentation size. In an alternate embodiment, a table of segmentation sizes may be generated, each segmentation size associated with a rate, or range of rates. In yet another embodiment, a function may be deployed, one operand of which is a rate, and the output of the function yielding a segmentation size. Myriad other possibilities will be apparent to one of skill in the art in light of the teaching herein. Note that segmentation, as just described, may be combined with multicast mapping techniques, as described above with respect to FIGS. 14-16, as well as any other adaptation layer function performed in response to physical layer feedback.

Multiplexing

In an example high performance wireless LAN sub network, such as wireless network 120, all communications may take place between the AP 104 and one or more UTs 106. As described above, these communications may be either unicast or multicast in nature. In unicast communication, user data or control data is sent from the AP to a single UT, or from a UT to the AP. Each UT has a unique MAC ID, so all unicast communication between a UT and the AP is associated with that unique MAC ID. In multicast communication user data or control data is transmitted from the AP to multiple UTs. There is a pool of MAC IDs set aside for use as multicast addresses. There may be one or more multicast groups defined that are associated with an access point, and each of these groups is assigned a unique multicast MAC ID. Each UT may belong to one or more (or none) of these multicast groups, and will receive transmissions associated with each multicast group to which it belongs. For the purposes of multiplexing discussion, adaptation layer multicasting is considered to be unicasting. In this example, UTs do not transmit multicast data.

An access point receives user data from external networks (i.e. network 102) addressed to UTs in its coverage area and from UTs in its coverage area directed to other devices, either UTs within the coverage area, or attached through network 102. An access point may also generate control data, intended for individual or multiple UTs in the coverage area, from the Radio Link Control (RLC) function 340, Logical Link Control (LLC) function 330, as well as other entities. User data addressed to a single UT may be further segregated into multiple streams based on QoS considerations or other considerations such as the source application, as described above.

As detailed above, the access point ultimately aggregates all the data from all sources destined for a single MAC ID into a single byte stream, which is then formatted into MAC PDUs, each of which is transmitted in a single MAC frame. The access point may send MAC PDUs for one or more MAC IDs in a single MAC frame (i.e., on the forward link).

Similarly, a UT may have user data to send that may be segregated into multiple streams. UTs may also generate control information associated with the RLC 340, LLC 330, or other entities. The UT aggregates user data and control data into a single byte stream that is then formatted into MAC PDUs, each of which is sent to the AP in a single MAC frame. One or more UTs may send a MAC PDU in a single MAC frame (i.e., on the reverse link).

The MUX function 360 is implemented per MAC ID at the AP. Each UT is initially assigned one MAC ID for unicast transmissions. Additional MAC IDs may be assigned if the UT belongs to one or more multicast groups. The MUX function permits (a) consecutive physical layer burst allocations to a MAC ID to be treated as a byte stream, and (b) multiplexing of PDUs from one or more LL or RLC entities into the byte stream at the MAC.

Figure 19:
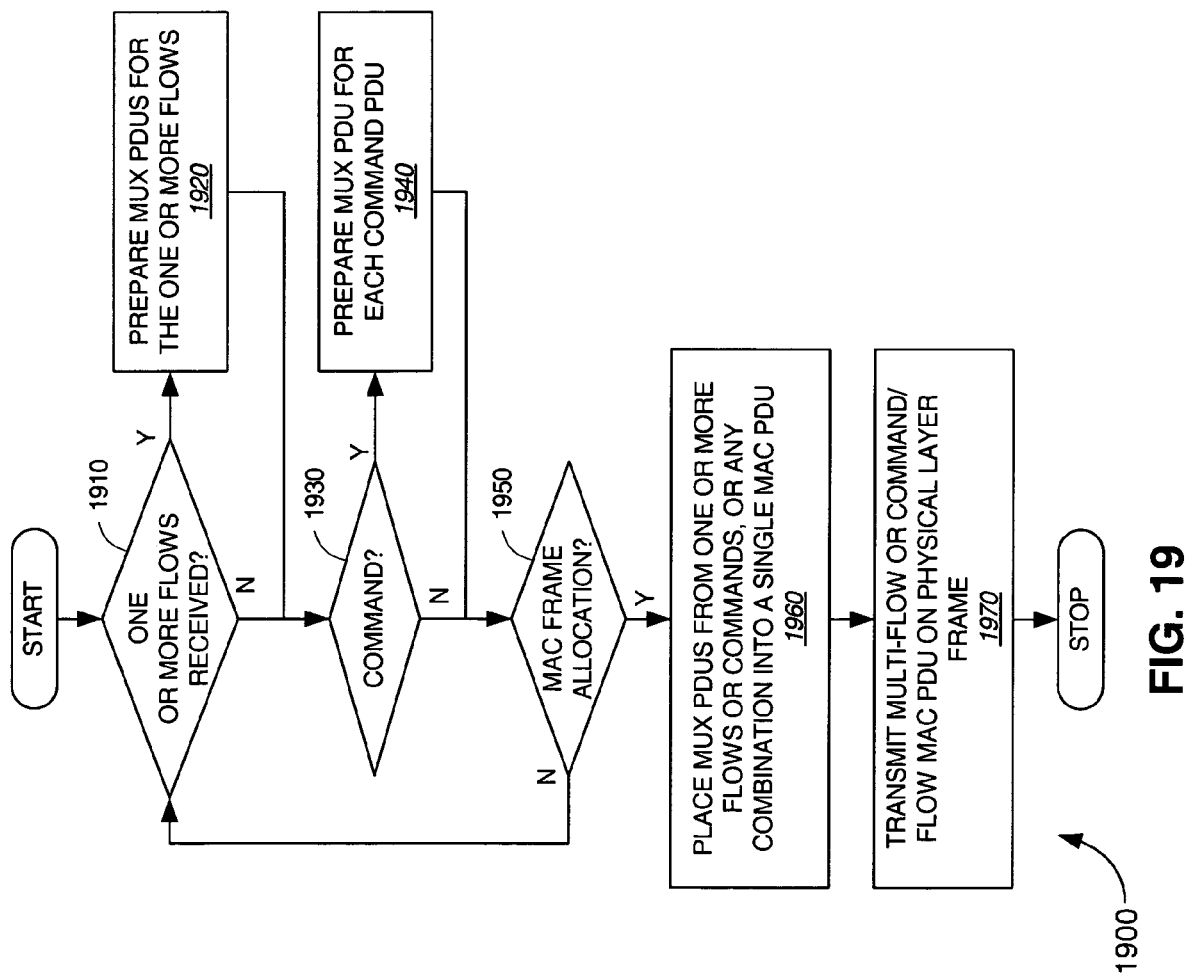
FIG. 19 depicts an example method for transmitting multiple flows and commands in a single MAC frame.

FIG. 19 depicts example method 1900 for transmitting multiple flows and commands in a single MAC frame. This method is suitable for deployment in either an access point or a user terminal. The process begins in decision block 1910. If one or more packets from one or more flows destined for a MAC ID are received, proceed to block 1920 to prepare MUX PDUs associated with the MAC ID for the respective one or more flows. In the example embodiment, the MUX PDUs are prepared according to the MAC protocol detailed above, but alternate MAC protocols may be deployed within the scope of the present invention. MUX PDUs may be placed in the appropriate queue (high QoS or best effort, in the example embodiment). If no flows for the MAC ID are received in decision block 1910, or after MUX PDUs have been prepared in block 1920, proceed to decision block 1930.

In decision block 1930, if one or more commands, from RLC 340 or LL 330, for example, are to be transmitted to the UT associated with the MAC ID, proceed to block 1940 and prepare a MUX PDU for each command PDU. If no commands are destined for the MAC ID, or once MUX PDUs have been prepared in block 1940, proceed to decision block 1950.

Decision block 1950 illustrates an iterative process for continually monitoring the flows destined for a MAC ID. Alternate embodiments may place the looping feature in any other part of the overall access point or user terminal process. In an alternate embodiment, process 1900 repeats iteratively, or is included in another iterative process. For illustration only, this process is described for a single MAC ID. It will be clear that, in an access point, multiple MAC IDs may be processed concurrently. These and other modifications will be clear to one of ordinary skill in the art.

When no commands or flows are ready for processing, in this example, the process loops back to decision block 1910 to repeat the loop. Note that, in a user terminal, a request may need to be made to the access point to initiate a MAC frame allocation, as described above. Any such technique may be deployed. The details are not included in FIG. 19. Clearly, if no commands or flows are awaiting transmission, no request will need to be made, and thus no MAC frame allocation will arrive. When a command or flow is awaiting transmission, a scheduler may make a MAC frame allocation at any time, as described above. In the example embodiment, an access point scheduler 376 makes forward link MAC frame allocations in response to MAC ID queues in UT specific MUX functions 360, and reverse link MAC frame allocations in response to requests on the RCH or UT proxy queues, as detailed above. In any event, the communication device running method 1900 awaits a MAC frame allocation in decision block 1950.

When a MAC frame allocation is made in decision block 1950, one or more MUX PDUs are placed in a single MAC PDU in block 1960. The MAC PDU may contain a partial MUX PDU remaining from a previous MAC frame, a MUX PDU from one or more flows, one or more command MUX PDUs, or any combination of these. A partial MUX PDU may be inserted into the MAC frame if any allocated space remains unused (or any type of padding may be inserted to fill the allocated MAC frame).

In block 1970, the MAC PDU is transmitted on the physical link at the position indicated by the allocation. Note that the MAC PDU may comprise MUX PDUs from any combination of one or more flow or command PDUs.

Figure 20:
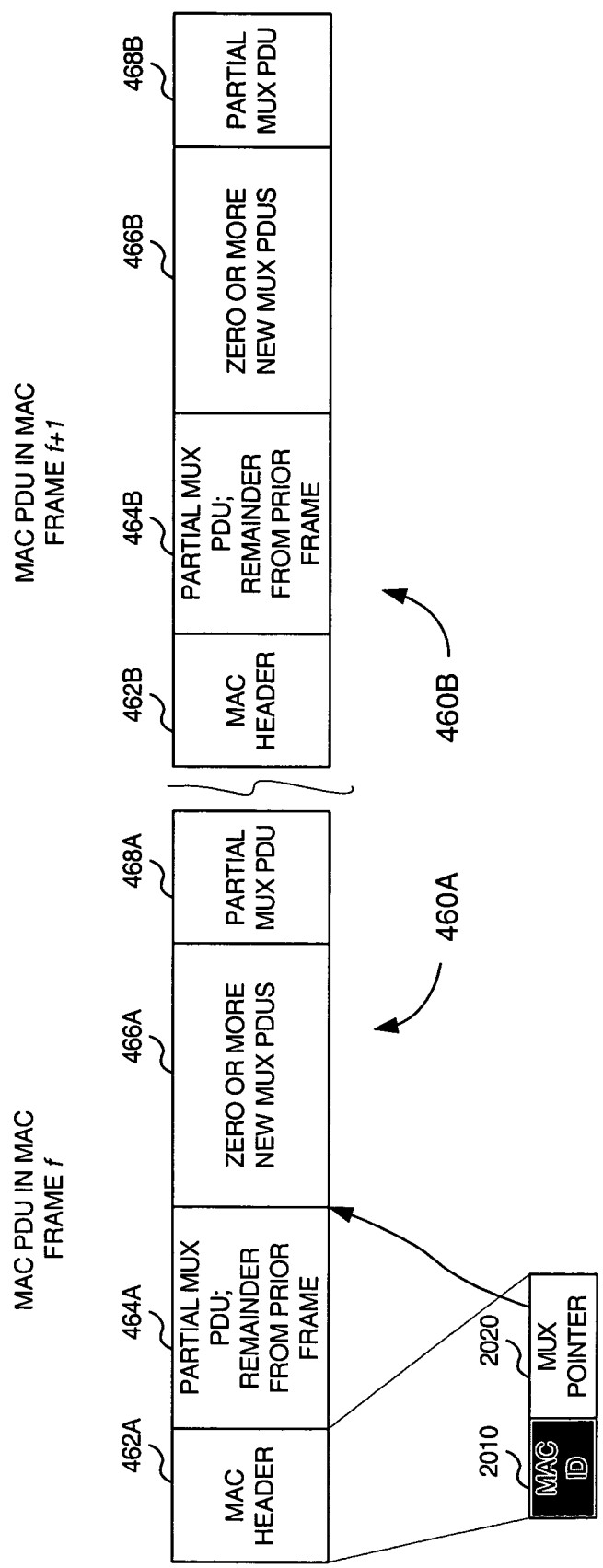
FIG. 20 illustrates sequential MAC frames, including examples of transmitting various partial MUX PDUs.

As detailed above, in the example embodiment, the MAC PDU is the transmission unit that fits in the physical layer burst assigned to a MAC ID on either the F-TCH or R-TCH. FIG. 20 illustrates an example scenario. A MAC PDU 460 comprises a MAC header 462, followed by a possible partial MUX PDU 464 at the start, followed by zero or more complete MUX PDUs 466, and finally, a possible partial MUX PDU 468 at the end of the physical layer burst. Note that the respective portion two sequential MAC frames 460A and 460B are illustrated. The subparts of the MAC frame 460A, transmitted during frame $f$, are identified with an appended "A." The subparts of the MAC frame 460B, transmitted during frame $f+1$, are identified with an appended "B." When MUX PDUs are concatenated within a MAC PDU, to utilize the allocation fully, a partial MUX PDU may be transmitted at the end of the MAC PDU, in which case the remainder of the MUX PDU is transmitted at the beginning of the MAC PDU sent in the next MAC frame. This is illustrated in FIG. 20 by the partial MUX PDU 468A transmitted in MAC FRAME 460A. The remainder of that MUX PDU 464B is transmitted during the next MAC FRAME 460B.

The MAC header consists of the MUX Pointer 2020, and possibly the MAC ID 2010 associated with the MAC PDU. The MAC ID may be required when spatial multiplexing is in use, and there may be more than one MAC PDU transmitted simultaneously. Those of skill in the art will recognize when a MAC ID 2010, shown shaded to indicate that it is optional, should be deployed.

In the example embodiment, a 2 byte MUX pointer 2020 per MAC PDU is deployed to identify the location of any MUX PDUs transmitted in the MAC FRAME (as indicated by the arrow from MUX pointer 2020 to MUX PDUs 466A in FIG. 20). The MUX pointer 2020 is used per MAC PDU. The MUX pointer points to the start of the first MUX PDU within the MAC PDU. The MUX pointer along with the length field included in each MUX PDU header allows the receiving MUX layer to extract the LL and RLC PDUs from the byte stream consisting of consecutive physical layer bursts allocated to the MAC ID. Those of skill in the art will recognize various alternate means for deploying pointers within the scope of the present invention. For example, the MAC frame may be packed in alternate orders from the example described above. A remainder partial MUX PDU may be placed at the end of the MAC frame allocation, and the pointer points to the start of the remainder, rather than the new MUX PDUs. Thus, new PDUs, if any are placed at the beginning. Any number of pointer techniques may be deployed (i.e. an index value identifying a byte, a time value, a base value plus an offset, or any of a multitude of variations that will be apparent to one of skill in the art).

In the example embodiment, the MUX pointer 2020 comprises a single 16-bit field whose value is one plus the offset from the end of the MUX pointer, in bytes, of the beginning of the first MUX PDU that starts in the frame. If the value is zero, no MUX PDU starts in the frame. If the value is one, a MUX PDU starts immediately following the MUX Pointer. If the value is n>1, the first n−1 bytes in the MAC PDU are the end of a MUX PDU that began in a previous frame. This information helps the receiver MUX (i.e. MUX function 360) recover from errors in previous frames that result in loss of sync with MUX PDU boundaries, an example of which is described below. Those of skill in the art will recognize that any number of alternate indexing techniques may be deployed.

The MUX header comprising a type (logical channel) field and a length field is attached to every LL or RLC PDU provided to the MUX. The type (logical channel) field identifies the LL or RLC entity to which the PDU belongs. The length field is used along with the MUX pointer, just described, to allow the receiving MUX layer to extract the LL and RLC PDUs from the byte stream consisting of consecutive physical layer bursts allocated to the MAC ID.

As detailed above, the MUX function 360 maintains three queues for data to be transmitted. The high QoS queue 362 may contain LL PDUs that are associated with a negotiated service that has been allocated a guaranteed rate by admission control 384. The best effort queue 364 may contain LL PDUs that are not associated with a rate guarantee. The control message queue 366 may contain RLC and LLC PDUs.

Alternate embodiments may include more than one QoS queue. However, the efficient use of the high-rate WLAN, as detailed herein, allows a single QoS queue to achieve very good QoS performance. In many cases, the efficient use of the available channel bandwidth by the MAC protocol renders additional queues, and the complexity associated therewith, unnecessary.

At the AP, the backlog in each of these queues is made available to the scheduler 376 in the common MAC function 370. The backlog in these queues at the UT is maintained at the AP in the UT proxy in the common MAC function 360. Note that UT proxy queues are not independently identified in FIG. 3, for clarity. Queues 362, 364, and 366 may be thought of as comprising both the forward link queues and the reverse link queues (i.e. UT proxy queues) for each MAC ID, whether or not the queues are deployed in shared hardware or separate components. Note further that the number and type of queues supported for the forward link and reverse link need not be identical. Neither do the UT proxy queues need to match the UT queues identically. For example, a UT may maintain a command queue in order to prioritize certain time-sensitive commands over other high QoS PDUs. At the AP, a single high QoS may be used to indicate demand for both types of UT traffic. Thus, an allocation made to the UT may be filled with the priority determined at the UT. As another example, varying QoS queues may be maintained at either the UT or AP that are not maintained at the AP or UT, respectively.

The scheduler 376 arbitrates among the competing requirements from all MAC IDs and allocates a physical layer burst on the F-TCH or the R-TCH to one or more selected MAC IDs. In response to an allocation, the corresponding MUX function 360 packs LL and RLC PDUs into the MAC PDU payload, as described above. In the example embodiment, each MUX function 360 serves PDUs from the following queues (exhaustively) in the following non-preemptive priority order: control message queue 366, high QoS queue 362, and best effort queue 364. Any partial PDU from the previous MAC PDU (even if it is from a lower priority queue) is completed first before new PDUs from higher priority queues are served. In alternative embodiments, preemption may be deployed at one or more levels, as will be apparent to one of skill in the art.

At the receiver, the MUX function extracts the PDUs from the byte stream consisting of consecutive MAC PDUs and routes them to the LL or RLC entity to which it belongs. The routing is based on the type (logical channel) field included in the MUX PDU header.

In the example embodiment, according to the design of the MUX function, once the transmission of a MUX PDU is started, it will be completed before another MUX PDU is started. Thus, if the transmission of a MUX PDU from the best effort queue is started in a MAC frame it will be completed in a subsequent MAC frame (or frames) before another MUX PDU from the control message queue or the high QoS queue is transmitted. In other words, in normal operation, the higher-class queues have non-preemptive priority.

In alternate embodiments, or in certain cases in the example embodiment, preemption may be desired. For example, if physical layer data rates have changed, it may be necessary to transmit a control message urgently, requiring preemptive priority over the best effort or high QoS MUX PDU in transmission. This is permitted. The incompletely transmitted MUX PDU will be detected and discarded by the receive MUX, detailed further below.

A preemptive event (i.e., a change in physical layer rate) may also trigger the need to change the segment size to be used for that UT. The segment size for the UT may be chosen so that the delay constraint of the service with the shortest delay constraint or the control message queue is satisfied by non-preemptive priority in the MUX function. These techniques may be combined with the techniques for segmentation described above with respect to FIGS. 17-18 above.

Figure 21:
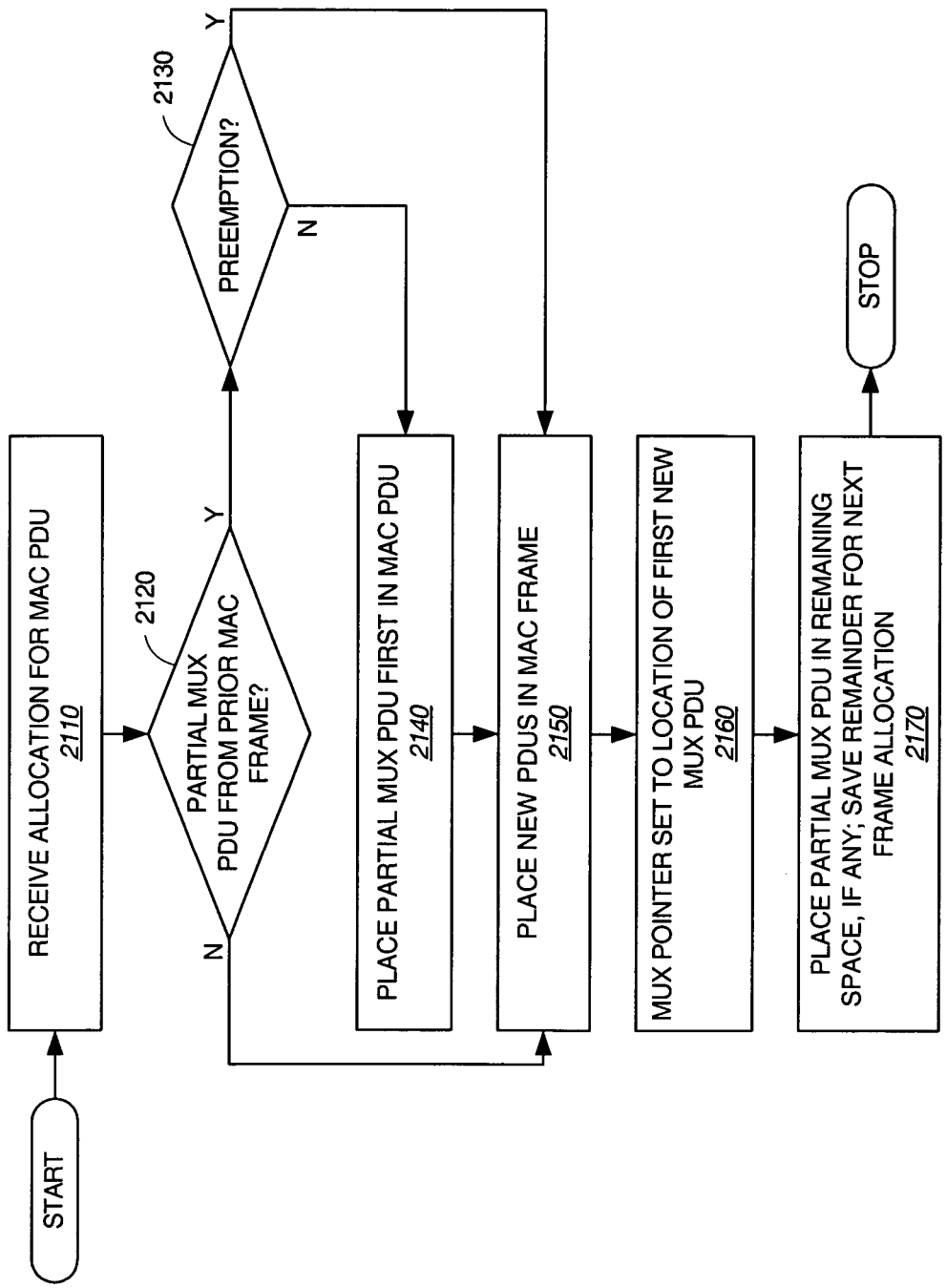
FIG. 21 illustrates an example method for preparing a MAC frame using a MUX pointer.

FIG. 21 illustrates an example method 2100 for preparing a MAC frame using a MUX pointer. This method may be deployed in either the AP or the UT. Those of skill in the art will readily adapt this illustrative example to myriad embodiments, AP or UT, in light of the teaching herein. The process begins in block 2110, where an allocation is received for a MAC PDU.

In decision block 2120, if a partial MUX PDU remains from a previous MAC frame transmission, proceed to decision block 2130. If no partial MUX PDU remains, proceed to block 2150.

In decision block 2130, if preemption is desired, the partial MUX PDU will not be transmitted. Proceed to block 2150. In the example embodiment, preemption may be used in certain cases to transfer a time-sensitive command MUX PDU. Other examples of preemption are detailed above. Any preemption condition may be used when it is desirable to forego transmitting the remainder of the MUX PDU. The receiver of the MAC frame may simply discard the prior portions of the MUX PDU. An example receiver function is detailed below. In an alternate embodiment, preemption may be defined to allow for preempted partial MUX PDUs to be transmitted at a later time. Alternate embodiments may deploy any number of preemption rules for use in decision block 2130. If preemption is not desired, proceed to block 2140.

In block 2140, place the partial MUX PDU first in the MAC PDU. If the allocation is smaller than the partial MUX PDU, the allocation may be filled with as much of the MUX PDU as desired, and the remainder may be saved for transmission in a subsequent MAC frame allocation.

In block 2150, any new MUX PDUs may be placed in the MAC PDU. The MUX function may determine the priority of placing MUX PDUs from any of the available queues. Example priority schemes have been described above, although any priority scheme may be deployed.

In block 2160, the MUX pointer is set to the location of the first new MUX PDU. In the example embodiment, a MUX pointer value of zero indicates no MUX PDU is included in the allocation. A MUX pointer value of one indicates the first byte following the MAC header is the start of the next new MUX PDU (i.e., there is no partial MUX PDU at the beginning of the MAC PDU). Other MUX pointer values indicate the appropriate boundary between a remainder partial MUX PDU and the start of any new MUX PDUs. In alternate embodiments, other special MUX pointer values may be defined, or other pointer schemes may be deployed.

In block 2170, if space remains in the allocated MAC PDU, a partial MUX PDU may be placed in the remainder. Alternatively, padding of any kind may be inserted in the remaining space. The remainder of a partially placed MUX PDU may be saved for transmission in a subsequent frame allocation.

Figure 22:
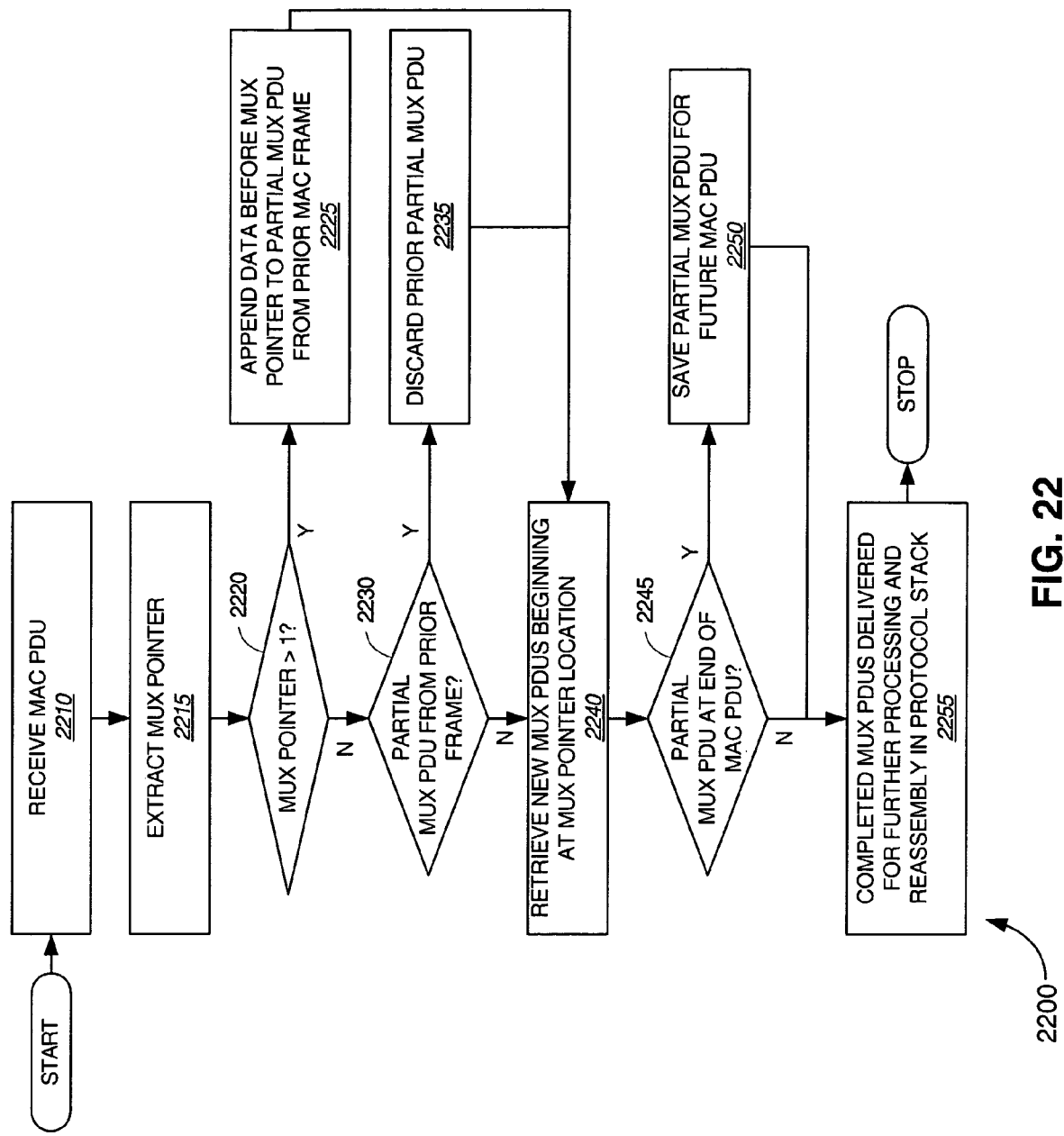
FIG. 22 illustrates an example method for receiving a MAC frame comprising a MUX pointer.

FIG. 22 illustrates an example method 2200 for receiving a MAC frame comprising a MUX pointer. This method may be deployed in either the AP or the UT. Those of skill in the art will readily adapt this illustrative example to myriad embodiments, AP or UT, in light of the teaching herein.

The process begins in block 2210, where a MAC PDU is received. In block 2215, the MUX pointer is extracted from the MAC PDU. In decision block 2220, if the MUX pointer is greater than 1, proceed to block 2225. In the example embodiment, if the MUX pointer is 0 or 1, there is no partial MUX PDU at the beginning of the MAC frame. A MUX pointer of 0 indicates there is no MUX PDU at all. In either case, proceed to decision block 2230.

In decision block 2230, if there is a partial MUX PDU stored from a previous MAC frame, proceed to block 2235 and discard the stored previous frame. The remainder of the stored frame has been preempted, in this example. Alternate embodiments may allow for subsequent transmissions of the remainder of the stored frame, in which case the prior partial MUX PDU may be saved (details not shown in the illustrative example method 2200). If no partial MUX PDU was stored, in decision block 2230, or subsequent handling the stored prior partial MUX PDU, proceed to block 2240.

In block 2240, retrieve new MUX PDUs, if any, beginning at the location indicated by the MUX pointer. Note that, in the example embodiment, a MUX pointer value of zero indicates there are no new MUX PDUs in the MAC PDU. Any new MUX PDUs, including a new partial MUX PDU may be retrieved. As described above, the length field in a MUX PDU header may be used to define the boundaries of the MUX PDUs.

In decision block 2245, if a partial MUX PDU was included in the MAC PDU, proceed to block 2250 to store the partial MUX PDU. The stored partial MUX PDU may be combined with the remainder from a future MAC PDU (unless it is later determined that the partial MUX PDU should be discarded, as described above). If, in decision block 2245, there was no new partial MUX PDU included in the MAC PDU, or if the partial MUX PDU has been stored in block 2250, proceed to block 2255.

In block 2255, any complete MUX PDUs may be delivered for further processing, including reassembly, as appropriate, in the protocol stack, as detailed above.

As described above, the MUX function allows the multiplexing of logical channels within the traffic channel segments (F-TCH and R-TCH) defined on the MAC frame. In the example embodiment, logical channels multiplexed by the MUX function are identified by a 4-bit message type field in the MUX header, examples of which are detailed in Table 1.

TABLE 1

| Logical Channel Type Fields | |
| --- | --- |
| Logical Channel | MUX Type Field (hex) |
| UDCH0 | 0x0 |
| UDCH1 | 0x1 |
| UDCH2 | 0x2 |
| UDCH3 | 0x3 |
| RBCH | 0x4 |
| DCCH | 0x5 |
| LCCH | 0x6 |
| UBCH | 0x7 |
| UMCH | 0x8 |

Figure 23:
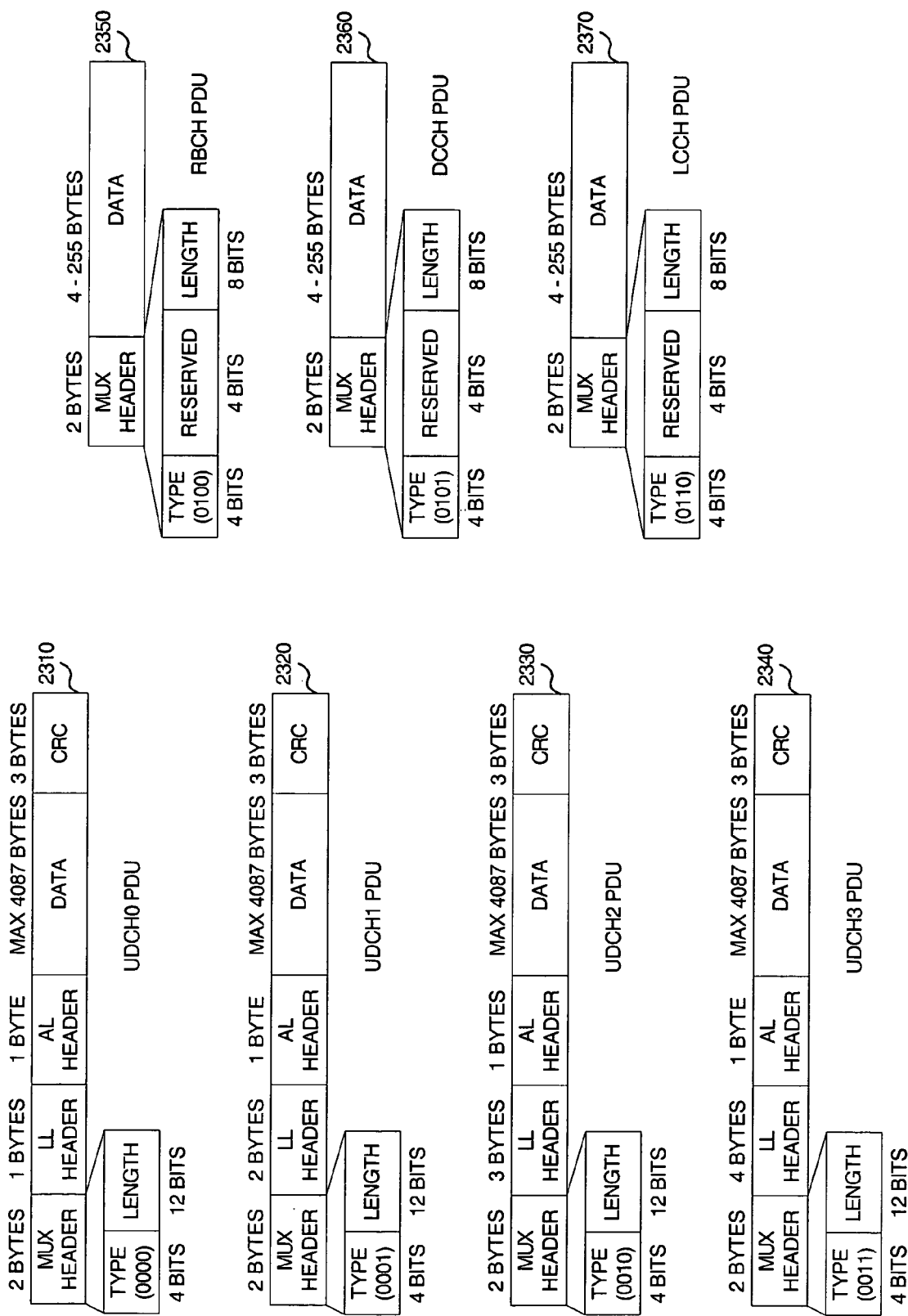
FIG. 23 illustrates example MUX PDU formats.

FIG. 23 illustrates example MUX PDUs for several of the MUX types illustrated in Table 1. User data channel PDUs, UDCH0 2310, UDCH1 2320, UDCH2 2330, UDCH3 2340, may be used to transmit and receive user data. The PDUs may be formed as detailed above with respect to FIG. 4. Each PDU comprises a MUX header with a type and length field. Following the MUX header are the LL header, a 1 byte AL header, up to 4087 bytes of data, and a 3-byte CRC. For UDCH0 2310, the LL header is 1 byte. For UDCH1 2320, the LL header is 2 bytes. For UDCH2 2330, the LL header is 3 bytes. For UDCH3 2340, the LL header is 4 bytes. The logical layer functions for processing these LL PDU types are detailed above.

Also illustrated in FIG. 23 are various control message PDUs 2350-2370. Each PDU comprises a MUX header including a type field, a reserved field, and a length field. The MUX header is followed by variable length data field that may be between 4 and 255 bytes, which contains the RLC message payload. A Radio Link Broadcast Channel (RBCH) PDU 2350, Dedicated Control Channel PDU (DCCH) PDU 2360, and a Logical Link Control Channel (LLCH) PDU 2370 are depicted in FIG. 23. The format for the User Broadcast Channel (UBCH) PDU and the User Multicast Channel (UMCH) PDU are identical to the UDCH0 PDU 2310. The Type field for UBCH is set to 0111. The Type field for UMCH is set to 1000.

Those of skill in the art will recognize that these PDUs are illustrative only. Various additional PDUs may also be supported, as well as subsets of those shown. In alternate embodiments, each of the fields shown may have alternate widths. Other PDUs may include additional fields as well.

Example Radio Link Control (RLC)

Radio Link Control 340 has been described above, and an example embodiment is detailed further in this section. A set of example RLC messages is set forth in Table 2. The example messages described are exemplary only, subsets of these messages as well as additional messages may be deployed in an alternate embodiment. The fields and sizes of the fields in each message are examples as well. Those of skill in the art will readily adapt myriad alternate message formats in light of the teaching herein.

TABLE 2

RLC Message Types

| Message Type | Message |
|---|---|
| — | RLCSystemConfigurationParameters |
| 0x00 | RLCRegChallengeACK |
| 0x01 | RLCHdwrIDReq |
| 0x02 | RLCSystemCapabilities |
| 0x04 | RLCCalibrationReqACK |
| 0x05 | RLCRLCalibrationMeasurementResult |
| 0x40 | RLCRegChallengeRej |
| 0x44 | RLCCalibrationReqRej |
| 0x80 | RLCRegChallenge |
| 0x81 | RLCHdwrIDReqACK |
| 0x82 | RLCSystemCapabilitiesACK |
| 0x84 | RLCCalibrationReq |
| 0x85 | RLCCalibrationMeasurementReq |
| 0x87 | RLCUTLinkStatus |
| 0xC5 | RLCRLCalibrationMeasurementResultNACK |

In this example, all RLC messages have a common structure, though they may be carried on one of several transport channels. The RLC PDU structure comprises an eight-bit Type field that identifies the specific RLC message, a payload of 0 to 251 bytes, and a CRC field of 3 bytes. Table 3 illustrates the use of bit positions in the type field to indicate certain classes of RLC messages. The most significant bit (MSB) indicates a forward or reverse link message, 0 or 1, respectively. When the second MSB is set, the message is a not acknowledged (NACK) or rejection message.

TABLE 3

RLC Message Type Field Bit Position Significance

| Bit position | Significance |
|---|---|
| 0xxxxxxx | Forward Link message |
| 1xxxxxxx | Reverse Link message |
| x1xxxxxx | NACK/Rej message |

During system initialization, a Broadcast RLC function consisting of the System Identification Control 346 function may be initialized. When a UT initially accesses the system using a MAC-ID from an access pool, the RLC function assigns a new unicast MAC-ID to the UT. Subsequently, if the UT joins a multicast group, it may be allocated additional multicast MAC-IDs. When a new unicast MAC-ID is assigned to a UT, the RLC initializes one instance of each of the functions: AC 344, RRC 342 and LLC 338, as described above. When a new multicast MAC-ID is assigned, the RLC initializes a new AC instance and the LLC for the LL multicast mode.

The System Identification Parameters message, shown in Table 4 is transmitted by the AP once every 16 MAC frames using the broadcast MAC-ID. The System Identification Parameters message contains network and AP IDs as well as a protocol revision number. In addition, it contains a list of access MAC-IDs for use by UTs for initial access to the system. Other example parameters are shown in Table 4.

TABLE 4

System Identification Parameters message on RBCH

| Parameter Name | Bits | Purpose |
|---|---|---|
| RLC Message Type | 8 | 0x3F |
| Net ID | 10 | Network ID |
| AP ID | 6 | Access Point ID |
| Pilot Cover Code | 4 | Walsh pilot cover code index |
| Backoff Level | 4 | Power backoff scheme employed (one of 16 possible) |
| AP Rev. Level | 4 | AP software revision level and system capabilities |
| RCH Backoff | 4 | RCH random backoff factor |
| Neighbor List | 120 | Neighboring Access Point ID and Frequency Allocation |
| Access ID pool | 4 | Pool of Access IDs |
| Message Length | 164 | |

The Association Control (AC) function provides UT authentication. The AC function manages registration (i.e. attach/detach) functions for the UT. In the case of a multicast MAC-ID, the AC function manages attach/detach of a UT to the multicast group. The AC function also manages key exchange for encryption for LL control.

The Registration Challenge Message, depicted in Table 5, is sent on the reverse link from the UT. The UT includes a 24-bit random number to allow the AP to differentiate between multiple UTs that may have accessed simultaneously and picked the same MAC-ID.

TABLE 5

Registration Challenge Message

| Parameter Name | Bits | Purpose |
|---|---|---|
| RLC Message Type | 8 | 0x80 |
| MAC ID | 10 | Temporary MAC ID assigned to UT |
| Random ID | 24 | Random challenge to differentiate access collisions |

TABLE 5-continued

Registration Challenge Message

| Parameter Name | Bits | Purpose |
| --- | --- | --- |
| Reserved | 6 | Future Use |
| CRC | 24 | Cyclic redundancy check |
| Message Length | 72 | 9 bytes |

The Registration Challenge Acknowledgement Message, depicted in Table 6, is transmitted by the AP in response to the Registration Challenge Message. The AP includes the Random ID that was transmitted by the UT. This allows collision resolution between UTs that may have picked the same MAC-ID and slot for access.

TABLE 6

Registration Challenge Acknowledgment Message

| Parameter Name | Bits | Purpose |
| --- | --- | --- |
| RLC Message Type | 8 | 0x00 |
| MAC ID | 10 | Temporary MAC ID assigned to UT |
| Random ID | 24 | Random challenge to differentiate access collisions |
| Reserved | 6 | Reserved for Future Use |
| CRC | 24 | Cyclic redundancy check |
| Message Length | 72 | 9 bytes |

The Registration Challenge Reject Message, depicted in Table 7, is sent by the AP to a UT to reject a temporary MAC ID assignment, for example, when two or more UTs randomly select the same temporary MAC ID.

TABLE 7

Registration Challenge Reject Message

| Parameter Name | Bits | Purpose |
| --- | --- | --- |
| RLC Message Type | 8 | 0x40 |
| MAC ID | 10 | Temporary MAC ID assigned to UT |
| Reserved | 6 | Future Use |
| CRC | 24 | Cyclic redundancy check |
| Message Length | 48 | 6 bytes |

The Hardware ID Request Message, depicted in Table 8, is transmitted by the AP to obtain the Hardware ID from the UT.

TABLE 8

Hardware ID Request Message

| Parameter Name | Bits | Purpose |
| --- | --- | --- |
| RLC Message Type | 8 | 0x01 |
| MAC ID | 10 | Temp MAC ID assigned to UT |
| Reserved | 6 | Future Use |
| CRC | 24 | Cyclic redundancy check |
| Message Length | 48 | 6 bytes |

The Hardware ID Request Acknowledgment Message, depicted in Table 9, is transmitted by the UT in response to the Hardware ID Request Message and includes the 48-bit Hardware ID of the UT. (In particular, the 48-bit IEEE MAC Address of the UT may be used).

TABLE 9

Hardware ID Request Acknowledgment Message

| Parameter Name | Bits | Purpose |
| --- | --- | --- |
| RLC Message Type | 8 | 0x81 |
| MAC ID | 10 | Temp MAC ID assigned to UT |
| Hardware ID | 48 | UT Hardware ID number |
| Reserved | 6 | Future Use |
| CRC | 24 | Cyclic redundancy check |
| Message Length | 96 | 12 bytes |

The System Capabilities Message, depicted in Table 10, is transmitted to a newly registered UT to indicate the AP capabilities to the UT.

TABLE 10

System Capabilities Message

| Parameter Name | Bits | Purpose |
| --- | --- | --- |
| RLC Message Type | 8 | 0x02 |
| MAC ID | 10 | Temp MAC ID assigned to UT |
| Nant | 2 | Number of AP antennas |
| Nal | 8 | Number of adaptation layers supported |
| LISTal | 8 * Nal | List of adaptation layer indices supported by AP |
| Tbd | | |
| Tbd | | |
| Reserved | 4 | Future Use |
| CRC | 24 | Cyclic redundancy check |
| Message Length | Var | Variable bytes |

The System Capabilities Acknowledgment Message, depicted in Table 11, is sent by the UT in response to the System Capabilities Message to indicate the UT capabilities to the AP.

TABLE 11

System Capabilities Acknowledgment Message

| Parameter Name | Bits | Purpose |
| --- | --- | --- |
| RLC Message Type | 8 | 0x82 |
| MAC ID | 10 | Temp MAC ID assigned to UT |
| Nant | 2 | Number of UT antennas |
| Nal | 8 | Number of adaptation layers supported |
| LISTal | 8 * Nal | List of adaptation layer indices support by AP&UT |
| Reserved | 4 | Future Use |
| CRC | 24 | Cyclic redundancy check |
| Message Length | Var | Variable bytes |

One Radio Resource Control RRC instance is initialized at each UT. One RRC instance per active UT is initialized at the AP. The RRC functions at the AP and UT may share forward and reverse link channel measurements (as necessary). The RRC manages calibration of the transmit and receive chains at the AP and UT. In this example, calibration is useful for the spatial multiplexing transmission mode.

The RRC determines transmission mode and rate control for transmissions to a UT and provides it to the MAC Scheduler. The RRC determines the periodicity and length of the dedicated MIMO pilot required on physical layer (PHY) burst transmissions on the R-TCH, and (if necessary) on the F-TCH. The RRC manages power control for transmissions in the Space Time Transmit Diversity (STTD) mode to and from a UT and provides it to the PHY Manager. The RRC determines timing adjustment for R-TCH transmissions from the UT.

The Calibration Request Message, depicted in Table 12, is transmitted by the AP to request calibration with the UT. The CalType field indicates the set of calibration tones and the number of calibration symbols per antenna that will be used for the calibration procedure.

TABLE 12

Calibration Request Message

| Parameter Name | Bits | Purpose |
| --- | --- | --- |
| RLC Message Type | 8 | 0x84 |
| MAC ID | 10 | Temp MAC ID assigned to UT |
| Nant | 2 | Number of UT antennas |
| CalType | 4 | Selects calibration procedure |
| Reserved | 8 | Future Use |
| CRC | 24 | Cyclic redundancy check |
| Message Length | 56 | 6 bytes |

The calibration type (CalType) values are illustrated in Table 13. Each CalType corresponds to a set of OFDM tones and the number of calibration symbols per antenna that are required for calibration. The Calibration Pilot Symbols use Walsh sequences to establish orthogonality across Tx antennas.

TABLE 13

Calibration Type Values

| CalType Value | Calibration Tones | No. of Cal Pilot Symbols |
| --- | --- | --- |
| 0000 | ±7, ±21 | 4 |
| 0001 | ±3, ±7, ±11, ±15, ±18, ±21, ±24, ±26 | 4 |
| 0010 | ±1, ±2, . . . , ±25, ±26 | 4 |
| 0011 | RSVD | 4 |
| 0100 | ±7, ±21 | 8 |
| 0101 | ±3, ±7, ±11, ±15, ±18, ±21, ±24, ±26 | 8 |
| 0110 | ±1, ±2, . . . , ±25, ±26 | 8 |
| 0111 | RSVD | 8 |
| 1000 | ±7, ±21 | 16 |
| 1001 | ±3, ±7, ±11, ±15, ±18, ±21, ±24, ±26 | 16 |
| 1010 | ±1, ±2, . . . , ±25, ±26 | 16 |
| 1011 | RSVD | 16 |
| 1100 | ±7, ±21 | 32 |
| 1101 | ±3, ±7, ±11, ±15, ±18, ±21, ±24, ±26 | 32 |
| 1110 | ±1, ±2, . . . , ±25, ±26 | 32 |
| 1111 | RSVD | 32 |

The Calibration Request Reject Message, depicted in Table 14, is sent by the UT to reject the Calibration Request from the AP.

TABLE 14

Calibration Request Reject Message

| Parameter Name | Bits | Purpose |
| --- | --- | --- |
| RLC Message Type | 8 | 0x44 |
| MAC ID | 10 | Temporary MAC ID assigned to UT |
| Reserved | 6 | Future Use |
| CRC | 24 | Cyclic redundancy check |
| Message Length | 48 | 6 bytes |

The Calibration Measurement Request Message, depicted in Table 15, is sent by the UT to the AP. It includes the Calibration Pilot symbols that will be used by the AP to measure the channel between the UT and the AP.

TABLE 15

Calibration Measurement Request Message

| Parameter Name | Bits | Purpose |
| --- | --- | --- |
| RLC Message Type | 8 | 0x85 |
| MAC ID | 10 | Temp MAC ID assigned to UT |
| CalType | 4 | Calibration procedure |
| Rate | 4 | Highest supportable FL rate in diversity mode |
| Reserved | 6 | Future Use |
| CRC | 24 | Cyclic redundancy check |
| Message Length | 56 | 7 bytes |

The Calibration Measurement Result Message, depicted in Table 16, is sent by the AP to provide the UT with the results of the channel measurement completed by the AP on the calibration symbols transmitted by the UT in the Calibration Request message.

In this example, each Calibration Measurement Result message carries channel response values for 4 tones for a 4×4 channel, up to 8 tones for a 2×4 channel, or up to 16 tones for a 1×4 channel. Up to 13 such messages could be required to carry all the measurement data for a 4×4 channel with 52 tones measured, so a sequence number is also employed to track the sequence of such messages. In cases where there isn't enough data to fill up the whole data field the unused portion of the data field will be set to all zeros.

TABLE 16

Calibration Measurement Result Message

| Parameter Name | Bits | Purpose |
| --- | --- | --- |
| RLC Message Type | 8 | 0x05 |
| MAC ID | 10 | Temp MAC ID assigned to UT |
| SEQ | 4 | Sequence number of message (up to 13 messages) |
| Data field | 1536 | Channel response values for 4 tones |
| Reserved | 2 | Future Use |
| CRC | 24 | Cyclic redundancy check |
| Message Length | 1584 | 198 bytes |

The Calibration Measurement Result Acknowledgement Message, depicted in Table 17, is sent to acknowledge fragments of the Calibration Measurement Result message.

TABLE 17

Calibration Measurement Result Acknowledgment Message

| Parameter Name | Bits | Purpose |
| --- | --- | --- |
| RLC Message Type | 8 | 0x04 |
| MAC ID | 10 | Temp MAC ID assigned to UT |
| SEQ | 4 | Sequence number of message acknowledged |
| Reserved | 2 | Future Use |
| CRC | 24 | Cyclic redundancy check |
| Message Length | 48 | 6 bytes |

Similarly, a Calibration Measurement Result Message may be not acknowledged, in which case a Calibration Measurement Result NACK Message, as shown in Table 18, may be transmitted on the reverse link to negatively acknowledge (NACK) fragments of the Calibration Measurement Result message.

TABLE 18

Calibration Measurement Result NACK Message

| Parameter Name | Bits | Purpose |
|---|---|---|
| RLC Message Type | 8 | 0xC5 |
| MAC ID | 10 | Temp MAC ID assigned to UT |
| MODE | 1 | NACK mode (0 = go-back-N; 1 = selective repeat) |
| SEQ | 16 | Sequence numbers of up to 4 NACKed messages |
| Reserved | 5 | Future Use |
| CRC | 24 | Cyclic redundancy check |
| Message Length | 64 | 8 bytes |

Calibration Measurement Result messages can be NACKed either on a go-back-N basis or a selective-repeat basis. The SEQ field consists of four consecutive four-bit segments, each of which represents a message sequence number. For go-back-N mode, the MODE bit is set to 0, and the first segment of the SEQ field indicates the sequence number of the first message in the sequence that needs to be repeated. In this case, the remaining 12 bits in the SEQ field are set to zero and ignored. For selective-repeat mode, the MODE bit is set to 1, and the SEQ field holds sequence numbers of up to four messages that need to be repeated. If less than four messages need to be repeated, only the segments containing non-zero values have meaning. Any all-zero segments are ignored.

The UT Link Status Message, depicted in Table 19, is sent by the AP to request a UT to provide feedback. In this example, the UT must provide feedback on buffer status (amount of backlogged data and QoS class) as well as link quality (forward link rates that can be sustained for MIMO and control channel).

TABLE 19

UT Link Status Message

| Parameter Name | Bits | Purpose |
|---|---|---|
| RLC Message Type | 8 | 0x87 |
| MAC ID | 10 | Temp MAC ID assigned to UT |
| UT_BUF_STAT | 16 | Indicates UT Radio Link buffer status |
| FL_RATE_STAT | 16 | Max supportable FL rate per mode (values tbd) |
| QOS_FLAG | 2 | Indicates RL contains high priority data |
| CCH_SUB_CHAN | 2 | Indicates preferred CCH sub-channel |
| Reserved | 2 | Future Use |
| CRC | 24 | Cyclic redundancy check |
| Message Length | 80 | 10 bytes |

UT_BUF_STAT indicates the size of the UT Radio Link buffer in four-byte increments. A value of 0xFFFF indicates buffer size of greater than or equal to 262,140 bytes. FL_RATE_STAT gives the maximum forward link rate per mode, with four bits per mode. For diversity mode, only the four most significant bits are used. The remaining twelve bits are set to 0. QOS_FLAG indicates whether RL buffer contains high priority data. QOS_FLAG values are defined in Table 20.

TABLE 20

QOS_FLAG values

| Value | Meaning |
|---|---|
| 00 | No priority data |
| 01 | Priority data |
| 10–11 | Reserved |

At the UT, the UT Link Status Message is created by RRC. At the AP it is forwarded to RRC which provides the values to the UT Proxy.

The example RRC embodiment described in this section may be deployed in conjunction with various embodiments detailed throughout this specification. Those of skill in the art will recognize that this example embodiment serves as an illustration only, and myriad alternate embodiments will be clear in light of the teaching herein. In the following section, an example embodiment of a control channel is described, suitable for deployment in conjunction with various embodiments detailed herein.

Example Control Channel (CCH)

As described above, access to the MAC frame and assignment of resources is controlled with the control channel (CCH), which assigns resources to MAC IDs on the F-TCH and R-TCH based on instructions from the scheduler. These resource grants may be a response to the known state of one or more queues at the AP associated with the particular MAC ID or the known state of one or more queues at the UT associated with the MAC ID, as reflected by information in the respective UT Proxy. Resource grants may also be a response to an access request received on an Access Request Channel (ARCH), or some other stimulus or information available to the scheduler. An example embodiment of a CCH is detailed below. This example CCH serves as an illustration of various control mechanisms that may be deployed in a high performance WLAN as described above. Alternate embodiments may include additional functionality, as well as subsets of the functions described below. The field names, field widths, parameter values, etc., described below are illustrative only. Those of skill in the art will readily adapt the principles described to myriad alternate embodiments within the scope of the present invention.

The example CCH is composed of 4 separate subchannels, each of which operates at a distinct data rate as denoted in Table 21. The terms used in Table 21 are well known in the art (SNR stands for Signal to Noise Ratio, and FER stands for Forward Error Rate, also well known in the art). The CCH uses short OFDM symbols in combination with STTD. This implies that each of the logical channels is composed of an even number of short OFDM symbols. Messages sent on the Random Access Feedback Channel (RFCH) and Frame Control Channel (FCCH) are formatted into Information Elements (IEs) and are transmitted on one of the CCH subchannels.

TABLE 21

Data Rate Structure for CCH Logical Channels

| CCH Channel | Efficiency (bps/Hz) | Code Rate | Modulation | Info bits per STTD OFDM symbol | Total SNR for 1% FER |
|---|---|---|---|---|---|
| CCH_0 | 0.25 | 0.25 | BPSK | 24 | −2.0 dB |
| CCH_1 | 0.5 | 0.5 | BPSK | 48 | 2.0 dB |
| CCH_2 | 1 | 0.5 | QPSK | 96 | 5.0 dB |
| CCH_3 | 2 | 0.5 | 16 QAM | 192 | 11.0 dB |

The BCCH indicates the presence or absence of a given CCH subchannel in the CCH_MASK parameter. The format for each CCH subchannel (where N denotes the subchannel suffix 0-3) is given in Table 22 below. The format comprises fields indicating the number of IEs, the IEs themselves, a CRC, zero padding if necessary, and tail bits. The AP makes the determination as to which subchannel to use for each IE. IE types that are user terminal (UT) specific are transmitted on the CCH subchannel that maximizes the transmission efficiency for that UT. If the AP is unable to accurately determine the rate associated with a given UT, CCH_0 may be used. Broadcast/multicast IE types are transmitted on CCH_0.

TABLE 22

CCH Subchannel Structure

| CCH_N Fields | Bits |
|---|---|
| Number of CCH_N IEs | 8 |
| CCH_N IEs | Variable |
| CRC for CCH_N | 16 |
| Zero Padding | Variable |
| Tail | 6 |

CCHs are transmitted in order of lowest to highest rate. A CRC is provided for each CCH subchannel. All UTs attempt demodulation of each transmitted CCH starting with the lowest rate CCH. A failure to correctly decode CCH_N implies that higher rate CCHs will be in decoded in error. Each CCH subchannel is capable of transmitting up to 32 IEs.

The CCH transport channel is mapped to two logical channels. The RFCH comprises acknowledgements to access attempts received on the RCH. The FCCH comprises resource allocation (i.e. physical layer frame assignments on the F-TCH and R-TCH), physical layer control functions including physical layer data rate control on the F-TCH and R-TCH, R-TCH dedicated pilot insertion, R-TCH timing, and R-TCH power control. The FCCH may also comprise an R-TCH assignment to request a buffer and link status update from a UT.

In general, in this embodiment, information sent on the CCH is time critical and will be employed by the recipient within the current MAC frame.

Table 23 lists the CCH information element types along with their respective type values. The information element formats are detailed further below. In the following tables, all offset values are given in units of 800 nanoseconds.

TABLE 23

CCH IE Type assignments

| IE Type | Information Element |
|---|---|
| 0x0 | RegistrationReqACK |
| 0x1 | FwdDivModeAssign |
| 0x2 | FwdDivModeAssignStat |
| 0x3 | FwdSpaModeAssign |
| 0x4 | FwdSpaModeAssignStat |
| 0x5 | RevDivModeAssign |
| 0x6 | RevSpaModeAssign |
| 0x7 | DivModeAssign |
| 0x8 | SpaModeAssign |
| 0x9 | LinkStatusReq |
| 0xA | CalRequestAck |
| 0xB | CalRequestRej |

The format of the Registration Request Acknowledgment IE (RFCH) (labeled RegistrationReqACK in Table 23) is shown in Table 24. The Registration Request Acknowledgment is used to respond to a Registration Request from a UT received on the RCH. The format includes an IE type, a slot ID, the Access ID that was selected by the UT and included in its Registration Request, the MAC ID being assigned to the UT, and a timing advance value.

TABLE 24

Registration Request Acknowledgment IE

| Field | Bits | Function |
|---|---|---|
| IE_TYPE | 4 | 0x0 |
| SLOT_ID | 5 | Slot ID used by UT on RCH Access |
| ACCESS_ID | 10 | Access ID Used by UT |
| MAC_ID | 10 | Temporary MAC ID assigned to UT |
| REV_TIMING_ADV | 7 | R-TCH TX Timing advance in samples |
| Total | 36 | |

The format of the F-TCH Diversity Mode Assignment IE (FCCH) (labeled FwdDivModeAssign in Table 23) is shown in Table 25. The F-TCH Diversity Mode Assignment is used to indicate a MAC PDU will be transmitted on the F-TCH, using diversity mode. Diversity is another term including STTD. The format includes an IE type, a MAC ID, an F-TCH offset identifying the location of the MAC PDU in the MAC frame, the rate used, the number of OFDM symbols in the packet, the preamble type (detailed further below), and the number of short OFDM symbols in the packet.

TABLE 25

F-TCH Diversity Mode Assignment IE

| Field | Bits | Function |
|---|---|---|
| IE_TYPE | 4 | 0x1 |
| MAC_ID | 10 | MAC ID assigned to UT |
| FWD_OFFSET | 12 | F-TCH Offset |
| FWD_RATE | 4 | Rate on F-TCH |
| FWD_PREAMBLE | 2 | F-TCH Preamble Type |
| FWD_N_LONG | 7 | Number of Long OFDM Symbols in packet |
| FWD_N_SHORT | 2 | Number of Short OFDM Symbols in packet |
| Total | 41 | |

The format of the F-TCH Diversity Mode Assignment with R-TCH Status IE (FCCH) (labeled FwdDivModeAssignStat in Table 23) is shown in Table 26. This IE is used to indicate a MAC PDU will be transmitted on the F-TCH, using diversity mode, and allocates space on the R-TCH for a response to a status request. The format includes the fields of the FwdDivModeAssign. In addition, it includes an allocation offset for the UT to report its buffer status on the R-TCH. The allocation for the Link Status message on the R-TCH specifies the R-TCH preamble type, and reverse parameters including rate, timing adjust, status message request bit and the number of long and short OFDM symbols in the link status packet.

TABLE 26

F-TCH Diversity Mode Assignment with R-TCH Status IE

| Field | Bits | Function |
|---|---|---|
| IE_TYPE | 4 | 0x2 |
| MAC_ID | 10 | MAC ID assigned to UT |
| FWD_OFFSET | 12 | F-TCH Offset |
| FWD_RATE | 4 | Rate on F-TCH |

TABLE 26-continued

F-TCH Diversity Mode Assignment with R-TCH Status IE

| Field | Bits | Function |
|---|---|---|
| FWD_N_LONG | 7 | Number of Long OFDM Symbols in packet |
| FWD_PREAMBLE | 2 | F-TCH Preamble Type |
| FWD_N_SHORT | 2 | Number of Short OFDM Symbols in packet |
| REV OFFSET | 12 | R-TCH Offset |
| REV_PREAMBLE | 2 | R-TCH Preamble Type |
| REV_RATE | 4 | Rate on R-TCH |
| REV_TIMING | 2 | R-TCH Timing Adjust |
| REV_STATUS_REQ | 1 | R-TCH Status Message Request |
| REV_N_LONG | 7 | Number of Long OFDM Symbols in Link Status packet |
| REV_N_SHORT | 2 | Number of Short OFDM Symbols in Link Status packet |
| Total | 71 | |

The FWD_PREAMBLE and REV_PREAMBLE fields give the length of the preamble to be used on the forward link and the status message sent on the reverse link, respectively. The preamble consists of the number short OFDM symbols given in Table 27 carrying steered reference for the principal eigenmode only.

TABLE 27

FWD_PREAMBLE, REV_PREAMBLE values

| Value | Meaning |
|---|---|
| 00 | No preamble |
| 01 | Four symbols |
| 10 | Eight symbols |
| 11 | Reserved |

The format of the F-TCH Spatial Multiplex Mode Assignment IE (FCCH) (labeled FwdSpaModeAssign in Table 23) is shown in Table 28. The fields for this IE are similar to those for FwdDivModeAssign, except that spatial multiplexing is used instead of diversity.

TABLE 28

F-TCH Spatial Multiplex Mode Assignment IE

| Field | Bits | Function |
|---|---|---|
| IE_TYPE | 4 | 0x3 |
| MAC_ID | 10 | MAC ID assigned to UT |
| FWD_OFFSET | 12 | F-TCH Offset |
| FWD_RATE | 16 | Rate on F-TCH spatial modes 0–3 |
| FWD_PREAMBLE | 2 | F-TCH Preamble Type |
| FWD_N_LONG | 7 | Number of Long OFDM Symbols in packet |
| FWD_N_SHORT | 2 | Number of Short OFDM Symbols in packet |
| Total | 53 | |

The format of the F-TCH Spatial Multiplex Mode Assignment with R-TCH Status IE (FCCH) (labeled FwdSpaModeAssignStat in Table 23) is shown in Table 29. The fields for this IE are similar to those for FwdDivModeAssignStat, except that spatial multiplexing is used instead of diversity.

TABLE 29

F-TCH Spatial Multiplex Mode Assignment with R-TCH Status IE

| Field | Bits | Function |
|---|---|---|
| IE_TYPE | 4 | 0x4 |
| MAC_ID | 10 | MAC ID assigned to UT |
| FWD_OFFSET | 12 | F-TCH Offset |
| FWD_RATE | 16 | Rate on F-TCH spatial modes 0–3 |
| FWD_PREAMBLE | 2 | F-TCH Preamble Type |
| FWD_N_LONG | 7 | Number of Long OFDM Symbols in packet |
| FWD_N_SHORT | 2 | Number of Short OFDM Symbols in packet |
| REV_OFFSET | 12 | R-TCH Offset |
| REV_PREAMBLE | 2 | R-TCH Preamble Type |
| REV_RATE | 4 | Rate on R-TCH |
| REV_TIMING | 2 | R-TCH TX Timing Adjust |
| REV_STATUS_REQ | 1 | R-TCH Status Message Request |
| REV_N_LONG | 7 | Number of Long OFDM Symbols in Link Status packet |
| REV_N_SHORT | 2 | Number of Short OFDM Symbols in Link Status packet |
| Total | 83 | |

The format of the R-TCH Diversity Mode Assignment IE (FCCH) (labeled RevDivModeAssign in Table 23) is shown in Table 30. This IE is used to signal an R-TCH allocation for a MAC PDU, using diversity mode. This IE includes type and MAC ID fields as before. It also includes the reverse link fields included in the status request messages detailed above (FwdDivModeAssignStat and FwdSpaModeAssignStat). It further comprises a reverse transmit power adjustment field.

TABLE 30

R-TCH Diversity Mode Assignment IE

| Field | Bits | Function |
|---|---|---|
| IE_TYPE | 4 | 0x5 |
| MAC_ID | 10 | MAC ID assigned to UT |
| REV_OFFSET | 12 | R-TCH Offset |
| REV_PREAMBLE | 2 | R-TCH Preamble Type |
| REV_RATE | 4 | Rate on R-TCH |
| REV_TIMING | 2 | R-TCH TX Timing Adjust |
| REV_STATUS_REQ | 1 | R-TCH Status Message Request |
| REV_N_LONG | 7 | Number of Long OFDM Symbols in packet |
| REV_N_SHORT | 2 | Number of Short OFDM Symbols in packet |
| REV_POWER | 2 | R-TCH TX Power Adjust |
| Total | 46 | |

The format of the R-TCH Spatial Multiplex Mode Assignment IE (FCCH) (labeled RevSpaModeAssign in Table 23) is shown in Table 31. The fields for this IE are similar to those for RevDivModeAssign, except that spatial multiplexing is used instead of diversity.

TABLE 31

R-TCH Spatial Multiplex Mode Assignment IE

| Field | Bits | Function |
|---|---|---|
| IE_TYPE | 4 | 0x6 |
| MAC_ID | 10 | MAC ID assigned to UT |
| REV_OFFSET | 12 | R-TCH Offset |
| REV_PREAMBLE | 2 | R-TCH Preamble Type |
| REV_RATE | 16 | Rate on R-TCH |
| REV_TIMING | 2 | R-TCH TX Timing Adjust |
| REV_STATUS_REQ | 1 | R-TCH Status Message Request |

TABLE 31-continued

R-TCH Spatial Multiplex Mode Assignment IE

| Field | Bits | Function |
|---|---|---|
| REV_N_LONG | 7 | Number of Long OFDM Symbols in packet |
| REV_N_SHORT | 2 | Number of Short OFDM Symbols in packet |
| REV_POWER | 2 | R-TCH TX Power Adjust |
| Total | 58 | |

The format of the TCH Div Mode Assignment IE (FCCH) (labeled DivModeAssign in Table 23) is shown in Table 32. This IE is used to allocate both forward and reverse link MAC PDUs. The fields for this IE are a combination of the fields for FwdDivModeAssign and RevDivModeAssign.

TABLE 32

TCH Div Mode Assignment IE

| Field | Bits | Function |
|---|---|---|
| IE_TYPE | 4 | 0x7 |
| MAC_ID | 10 | MAC ID assigned to UT |
| FWD_OFFSET | 12 | FCH Offset |
| FWD_PREAMBLE | 2 | F-TCH Preamble Type |
| FWD_RATE | 4 | Rate on F-TCH |
| FWD_N_LONG | 7 | Number of Long OFDM Symbols in packet |
| FWD_N_SHORT | 2 | Number of Short OFDM Symbols in packet |
| REV_OFFSET | 12 | R-TCH Offset |
| REV_PREAMBLE | 2 | R-TCH Preamble Type |
| REV_RATE | 4 | Rate on R-TCH |
| REV_TIMING | 2 | R-TCH TX Timing Adjust |
| REV_STATUS_REQ | 1 | R-TCH Status Message Request |
| REV_N_LONG | 7 | Number of Long OFDM Symbols in packet |
| REV_N_SHORT | 2 | Number of Short OFDM Symbols in packet |
| REV_POWER | 2 | R-TCH TX Power Adjust |
| Total | 73 | |

The format of the TCH Spatial Mux Mode Assignment IE (FCCH) (labeled SpaModeAssign in Table 23) is shown in Table 33. This IE is similar to DivModeAssign except that spatial multiplexing is used instead of diversity.

TABLE 33

TCH Spatial Mux Mode Assignment IE

| Field | Bits | Function |
|---|---|---|
| IE Type | 4 | 0x8 |
| MAC_ID | 10 | MAC ID assigned to UT |
| FWD_OFFSET | 12 | FCH Offset |
| FWD_RATE | 16 | Rate on F-TCH |
| FWD_PREAMBLE | 2 | F-TCH Preamble Type |
| FWD_N_LONG | 7 | Number of Long OFDM Symbols in packet |
| FWD_N_SHORT | 2 | Number of Short OFDM Symbols in packet |
| REV_OFFSET | 12 | R-TCH Offset |
| REV_PREAMBLE | 2 | R-TCH Preamble Type |
| REV_RATE | 16 | Rate on R-TCH |
| REV_TIMING | 2 | R-TCH TX Timing Adjust |
| REV_STATUS_REQ | 1 | R-TCH Status Message Request |
| REV_N_LONG | 7 | Number of Long OFDM Symbols in packet |
| REV_N_SHORT | 2 | Number of Short OFDM Symbols in packet |
| REV_POWER | 2 | R-TCH TX Power Adjust |
| Total | 97 | |

The format of the Buffer and Link Status Request IE (RFCH or FCCH) (labeled LinkStatusReq in Table 23) is shown in Table 34. This IE is used by the AP to request from a UT the current buffer status and the current state of the physical link with that UT. A reverse link allocation is made with the request to provide for the response. In addition to type and MAC ID fields, reverse link allocation fields are included, similar to reverse link allocations detailed above.

TABLE 34

R-TCH Link Status Request IE

| Field | Bits | Function |
|---|---|---|
| IE Type | 4 | 0x9 |
| MAC_ID | 10 | MAC ID assigned to UT |
| REV_OFFSET | 12 | R-TCH Offset |
| REV_PREAMBLE | 2 | R-TCH Preamble Type |
| REV_TIMING | 2 | R-TCH TX Timing Adjust |
| REV_STATUS_REQ | 1 | R-TCH Status Message Request |
| REV_N_LONG | 7 | Number of Long OFDM Symbols in Link Status packet |
| REV_N_SHORT | 2 | Number of Short OFDM Symbols in Link Status packet |
| Total | 40 | |

The format of the Calibration Request Acknowledgment iIE (FCCH) (labeled CalRequestAck in Table 23) is shown in Table 35. This IE is transmitted to acknowledge a UT request for calibration. Calibration is typically performed immediately following Registration and may be performed infrequently thereafter. Although the TDD wireless channel is symmetric, the transmit and receive chains at the AP and UT may have unequal gain and phase. Calibration is performed to eliminate this asymmetry. This IE includes a type field, a MAC ID field (containing the temporary MAC ID assigned to the UT), the number of UT antennas and an acknowledgment of the calibration type requested. The 4-bit calibration type field specifies a combination of tones to be used for calibration, and the number of training symbols to send for calibration.

TABLE 35

Calibration Request Acknowledgment IE

| Parameter Name | Bits | Purpose |
|---|---|---|
| IE Type | 4 | 0xA |
| MAC ID | 10 | Temp MAC ID assigned to UT |
| Nant | 2 | Number of UT antennas |
| CalType | 4 | Acknowledges requested calibration procedure |
| Message Length | 20 | |

The format of the Calibration Request Reject IE (FCCH) (labeled CalRequestRej in Table 23) is shown in Table 36. This IE rejects a calibration request from a UT. This IE contains type, MAC ID, and calibration request type fields, as with the CalRequestAck. In addition, a reason field is provided to specify why the calibration request is rejected.

TABLE 36

Calibration Request Reject IE

| Parameter Name | Bits | Purpose |
| --- | --- | --- |
| IE Type | 4 | 0xB |
| MAC ID | 10 | Temp MAC ID assigned to UT |
| CalType | 4 | Requested calibration procedure |
| Reason | 4 | Reason for reject calibration request. |
| Message Length | 22 | |

Reasons for a calibration request are referenced by the reason value. Reasons and their values are detailed in Table 37.

TABLE 37

Reason value meanings

| Value | Reason |
| --- | --- |
| 0000 | Calibration not required |
| 0001 | Requested procedure unsupported |
| 0010 | Calibration process time-out |
| 0011-1111 | Reserved |

The format of the Request Message (ARCH) is shown in Table 38. At initial access, the Request Message is treated as a registration request. The accessing UT randomly picks an Access ID from a set of IDs set aside for initial access and announced in the BCCH message. If the Request message is successively received, the AP acknowledges it using the Registration Request Acknowledgment IE on the RFCH and assigning a temporary MAC ID to the UT.

A registered UT uses the same message on the ARCH but uses its assigned MAC ID in the Access ID field to request service. If the Request message is successively received, the AP transmits a R-TCH Link Status Request IE to obtain information on the type and size of allocation desired by the UT.

TABLE 38

Request Message on the ARCH

| Field | Bits | Function |
| --- | --- | --- |
| Preamble | Variable | Short or Long |
| SLOT_ID | 5 | Slot ID used by UT on RCH Access |
| ACCESS_ID | 10 | Access ID Used by UT |
| Total | 15 | |

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating various sections. These headings are not intended to limit the scope of the concepts described with respect thereto. Such concepts may have applicability throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A non-transitory processor-readable memory comprising instructions, which when executed by a processor, are operable to communicate a data unit from a first station to a second station via wireless communication, by performing:
communicating a data unit, wherein the data unit comprises:
a pointer set to one of a range of pointer values, the pointer value identifying the location within the data unit of a first new sub-data unit, if any;
zero or one first partial sub-data unit;

zero or more full sub-data units, the first new sub-data unit, if any, located within the data unit in accordance with the pointer, wherein a pre-selected pointer value indicates that no new sub-data units start in the data unit and that the data unit comprises partial sub-data units; and zero or one second partial sub-data unit, wherein there is at least one full sub-data unit, or one first partial sub-data unit, or one second partial sub-data unit within the data unit.

2. The memory of claim 1, wherein the pre-selected pointer value is zero.

3. The memory of claim 1, wherein the sub-data units are multiplex sublayer Protocol Data Units (PDUs).

4. The memory of claim 1, wherein a first sub-data unit comprises a portion of data from a first data flow and a second sub-data unit comprises a portion of data from a second data flow.

5. An apparatus comprising:
a control processor for forming a data unit comprising:
a pointer set to one of a range of pointer values, the pointer value identifying the location within the data unit of a first new sub-data unit, if any;
zero or one first partial sub-data unit;
zero or more full sub-data units, the first new sub-data unit, if any, located within the data unit in accordance with the pointer, wherein a pre-selected pointer value indicates that no new sub-data units start in the data unit and that the data unit comprises partial sub-data units; and
zero or one second partial sub-data unit, wherein there is at least one full sub-data unit, or one first partial sub-data unit, or one second partial sub-data unit within the data unit; and
a transmitter for transmitting the data unit to a remote station via wireless communication.

6. An apparatus comprising:
a receiver for receiving a data unit via wireless communication, the data unit comprising:
a pointer set to one of a range of pointer values, the pointer value identifying the location within the data unit of a first new sub-data unit, if any;
zero or one first partial sub-data unit;
zero or more full sub-data units, the first new sub-data unit, if any, located within the data unit in accordance with the pointer, wherein a pre-selected pointer value indicates that no new sub-data units start in the data unit and that the data unit comprises partial sub-data units; and
zero or one second partial sub-data unit, wherein there is at least one full sub-data unit, or one first partial sub-data unit, or one second partial sub-data unit within the data unit; and
a control processor for:
extracting one or more full sub-data units from the data unit at the location identified by the pointer value, when present;
extracting the first partial sub-data unit from a pre-determined location in the data unit, when present; and
extracting the second partial sub-data unit, when present.

7. The apparatus of claim 6, wherein the control processor further combines the extracted first partial sub-data unit with a stored partial sub-data unit to form a full sub-data unit.

8. The apparatus of claim 6, wherein the control processor further stores the extracted second partial sub-data unit for combination with a subsequently received partial sub-data unit.

9. A wireless communication system comprising:
a control processor for forming a data unit comprising:
a pointer set to one of a range of pointer values, the pointer value identifying the location within the data unit of a first new sub-data unit, if any;
zero or one first partial sub-data unit;
zero or more full sub-data units, the first new sub-data unit, if any, located within the data unit in accordance with the pointer, wherein a pre-selected pointer value indicates that no new sub-data units start in the data unit and that the data unit comprises partial sub-data units; and
zero or one second partial sub-data unit, wherein there is at least one full sub-data unit, or one first partial sub-data unit, or one second partial sub-data unit within the data unit; and
a transmitter for transmitting the data unit to a remote station via wireless communication.

10. A method for generating data stored in a memory to provide media access control, wherein the memory comprises instructions, which when executed by a processor, are operable to:
insert a pointer into a data unit received or transmitted via wireless communication, wherein the pointer identifies a location within the data unit of a first new sub-data unit, if any; and
insert zero or more full sub-data units into the data unit, the first new sub-data unit, if any, inserted at a location in accordance with the pointer, wherein a pre-selected pointer value indicates that no new sub-data units start in the data unit and that the data unit comprises one or more partial sub-data units, wherein there is at least one full sub-data unit or at least one partial sub-data unit within the data unit.

11. The method of claim 10, further comprising inserting a partial sub-data unit in the data unit prior to any full sub-data units in the data unit.

12. The method of claim 11, wherein the partial sub-data unit is the remainder of a sub-data unit, a portion of the sub-data unit previously inserted in a prior data unit.

13. The method of claim 10, further comprising appending a partial sub-data unit to one or more full sub-data units inserted in the data unit.

14. The method of claim 10, further comprising transmitting the data unit from a first station to a second station.

15. A method for media access control comprising:
receiving, via wireless communication a data unit comprising a pointer, zero or more full sub-data units, and zero or one partial sub-data unit, wherein a pre-selected pointer value indicates that no new sub-data units start in the data unit and that the data unit comprises partial sub-data units, and wherein there is at least one full sub-data unit or at least one partial sub-data unit within the data unit;
extracting one or more full sub-data units, when present, from the data unit at a location identified by the pointer; and
extracting the partial sub-data unit, when present, from the data unit at a predetermined location in the data unit.

16. An apparatus comprising:
means for inserting a pointer into a data unit received or transmitted via wireless communication; and means for inserting zero or more full sub-data units into the data unit, a first new sub-data unit, if any, being inserted at a location in accordance with the pointer, wherein a pre-selected pointer value indicates that no new sub-data units start in the data unit and that the data unit comprises one or more partial sub-data units, wherein there is at least one full sub-data unit or at least one partial sub-data unit within the data unit.

17. An apparatus comprising:
means for receiving a data unit via wireless communication, the data unit comprising a pointer, zero or more full sub-data units, and zero or one partial sub-data unit, wherein a pre-selected pointer value indicates that no new sub-data units start in the data unit and that the data unit comprises partial sub-data units, wherein there is at least one full sub-data unit or at least one partial sub-data unit within the data unit;
means for extracting one or more full sub-data units, when present, from the data unit at a location identified by the pointer; and
means for extracting the partial sub-data unit, when present, from the data unit at a pre-determined location in the data unit.

18. A wireless communication system comprising:
means for inserting a pointer into a data unit received or transmitted via wireless communication; and
means for inserting zero or more full sub-data units into the data unit, a first new sub-data unit, if any, being inserted at a location in accordance with the pointer, wherein a pre-selected pointer value indicates that no new sub-data units start in the data unit and that the data unit comprises one or more partial sub-data units, wherein there is at least one full sub-data unit or at least one partial sub-data unit within the data unit.

19. Non-transitory computer readable media comprising instructions, which when executed by a processor are operable to generate data stored in a memory for media access control by performing the following steps:
inserting a pointer into a data unit received or transmitted via wireless communication; and
inserting zero or more full sub-data units into the data unit, a first new sub-data unit, if any, being inserted at a location in accordance with the pointer, wherein a pre-selected pointer value indicates that no new sub-data units start in the data unit and that the data unit comprises one or more partial sub-data units, wherein there is at least one full sub-data unit or at least one partial sub-data unit within the data unit.

20. Non-transitory computer readable media comprising instructions, which when executed by a processor are operable to process data for media access control by performing the following steps:
receiving a data unit via wireless communication, the data unit comprising a pointer, zero or more full sub-data units, and zero or one partial sub-data unit, wherein a pre-selected pointer value indicates that no new sub-data units start in the data unit and that the data unit comprises one partial sub-data unit, wherein there is at least one full sub-data unit or at least one partial sub-data unit within the data unit;
extracting one or more full sub-data units, when present, from the data unit at a location identified by the pointer; and
extracting the partial sub-data unit, when present, from the data unit at a predetermined location in the data unit.

21. A non-transitory processor-readable memory comprising instructions, which when executed by a processor, are operable to communicate a data unit from a first station to a second station, by performing:
communicating a data unit via wireless communication, wherein the data unit comprises:
two or more sub-data units, a first of the two or more sub-data units comprising all or part of a packet from a first data flow of the plurality of data flows, and a second of the two or more sub-data units comprising all or part of a packet from a second data flow of the plurality of data flows;
a pointer set to one of a range of pointer values, the pointer value identifying the location within the data unit of one of the two or more sub-data units, wherein a pre-selected pointer value indicates that no new sub-data units start in the data unit and that the data unit comprises partial sub-data units.

22. An apparatus comprising:
a control processor for forming a data unit comprising two or more sub-data units and a pointer, a first of the two or more sub-data units comprising all or part of a packet from a first data flow of the plurality of data flows, and a second of the two or more sub-data units comprising all or part of a packet from a second data flow of the plurality of data flows, the pointer being set to one of a range of pointer values, the pointer value identifying the location within the data unit of one of the two or more sub-data units, wherein a pre-selected pointer value indicates that no new sub-data units start in the data unit and that the data unit comprises partial sub-data units; and
a transmitter for transmitting the data unit to a remote station via wireless communication.

23. An apparatus comprising:
a receiver for receiving a data unit via wireless communication, the data unit comprising two or more sub-data units and a pointer, a first of the two or more sub-data units comprising all or part of a packet from a first data flow of the plurality of data flows, and a second of the two or more sub-data units comprising all or part of a packet from a second data flow of the plurality of data flows, the pointer being set to one of a range of pointer values, the pointer value identifying the location within the data unit of the one of the two, or more sub-data units, wherein a pre-selected pointer value indicates that no new sub-data units start in the data unit and that the data unit comprises partial sub-data units; and
a control processor for:
extracting the first sub-data unit and delivering the first sub-data unit to the source of the first data flow; and
extracting the second sub-data unit and delivering the second sub-data unit to the source of the second data flow.

24. A wireless communication system comprising:
a control processor for forming a data unit comprising two or more sub-data units, a first of the two or more sub-data units comprising all or part of a packet from a first data flow of the plurality of data flows, and a second of the two or more sub-data units comprising all or part of a packet from a second data flow of the plurality of data flows, wherein the control processor also forms a pointer set to one of a range of pointer values, the pointer value identifying the location within the data unit of the one of the two or more sub-data units, and wherein a pre-selected pointer value indicates that no new sub-data units start in the data unit and that the data unit comprises partial sub-data units; and
a transmitter for transmitting the data unit to a remote station via wireless communication.

25. A method for media access control comprising:
receiving a plurality of data flows via wireless communication, each data flow comprising one or more packets;
forming a data unit comprising two or more sub-data units, a first of the two or more sub-data units comprising all or part of a packet from a first data flow of the plurality of data flows, and a second of the two or more sub-data units comprising all or part of a packet from a second data flow of the plurality of data flows; and
adding a pointer set to one of a range of pointer values, the pointer value identifying the location within the data unit of one of the two or more sub-data units, wherein a pre-selected pointer value indicates that no new sub-data units start in the data unit and that the data unit comprises partial sub-data units.

26. The method of claim 25, further comprising storing packets from the plurality of data flows in one or more queues.

27. The method of claim 26, wherein the packets are stored in two or more queues according to classification of their respective data flows.

28. The method of claim 26, wherein packets from a first subset of the plurality of data flows are stored in a first queue, and packets from the remaining subset of the plurality of data flows are stored in a second queue.

29. The method of claim 28, wherein the first subset of the plurality of data flows are selected according to a first Quality of Service (QoS) level and the remaining subset of the plurality of data flows are selected according to a second QoS level.

30. The method of claim 26, further comprising selecting packets or portions thereof from the one or more queues for inclusion in the data unit with a mux function.

31. The method of claim 25, wherein one or more packets from the plurality of data flows are segmented.

32. The method of claim 25, wherein one or more packets from the plurality of data flows are identified with a logical link classification.

33. The method of claim 25, further comprising transmitting the data unit to a remote station.

34. A method for media access control comprising:
receiving a data unit via wireless communication, the data unit comprising two or more sub-data units and a pointer set to one of a range of pointer values, the pointer value identifying the location within the data unit of one of the two or more sub-data units, wherein a pre-selected pointer value indicates that no new sub-data units start in the data unit and that the data unit comprises partial sub-data units;
delivering a first of the two or more sub-data units to the source of a first data flow; and
delivering a second of the two or more sub-data units to the source of a second data flow.

35. An apparatus comprising:
means for receiving a plurality of data flows via wireless communication, each data flow comprising one or more packets;
means for forming a data unit comprising two or more sub-data units, a first of the two or more sub-data units comprising all or part of a packet from a first data flow of the plurality of data flows, and a second of the two or more sub-data units comprising all or part of a packet from a second data flow of the plurality of data flows; and
means for adding a pointer set to one of a range of pointer values, the pointer value identifying the location within the data unit of one of the two or more sub-data units, wherein a pre-selected pointer value indicates that no new sub-data units start in the data unit and that the data unit comprises partial sub-data units.

36. An apparatus comprising:
means for receiving a data unit via wireless communication, the data unit comprising two or more sub-data units and a pointer set to one of a range of pointer values, the pointer value identifying the location within the data unit of the one of the two or more sub-data units, wherein a pre-selected pointer value indicates that no new sub-data units start in the data unit and that the data unit comprises partial sub-data units;
means for delivering a first of the two or more sub-data units to the source of a first data flow; and
means for delivering a second of the two or more sub-data units to the source of a second data flow.

37. A wireless communication system comprising:
means for receiving a plurality of data flows via wireless communication, each data flow comprising one or more packets;
means for forming a data unit comprising two or more sub-data units, a first of the two or more sub-data units comprising all or part of a packet from a first data flow of the plurality of data flows, and a second of the two or more sub-data units comprising all or part of a packet from a second data flow of the plurality of data flows; and
means for forming a pointer set to one of a range of pointer values, the pointer value identifying the location within the data unit of one of the two or more sub-data units, wherein a pre-selected pointer value indicates that no new sub-data units start in the data unit and that the data unit comprises partial sub-data units.

38. Non-transitory computer readable media comprising instructions, which when executed by a processor are operable to cause the processor to perform the following steps:
receiving a plurality of data flows via wireless communication, each data flow comprising one or more packets;
forming a data unit comprising two or more sub-data units, a first of the two or more sub-data units comprising all or part of a packet from a first data flow of the plurality of data flows, and a second of the two or mote sub-data units comprising all or part of a packet from a second data flow of the plurality of data flows; and
forming a pointer set to one of a range of pointer values, the pointer value identifying the location within the data unit of one of the two or more sub-data units, wherein a pre-selected pointer value indicates that no new sub-data units start in the data unit and that the data unit comprises partial sub-data units.

39. Non-transitory computer readable media comprising instructions, which when executed by a processor are operable to cause the processor to perform the following steps:
receiving a data unit via wireless communication, the data unit comprising two or more sub-data units and a pointer set to one of a range of pointer values, the pointer value identifying the location within the data unit of one of the two or more sub-data units, wherein a pre-selected pointer value indicates that no new sub-data units start in the data unit and that the data unit comprises partial sub-data units;
delivering a first of the two or more sub-data units to the source of a first data flow; and
delivering a second of the two or more sub-data units to the source of a second data flow.

* * * * *